United States Patent [19]
Yuen et al.

[11] Patent Number: 5,488,409
[45] Date of Patent: Jan. 30, 1996

[54] APPARATUS AND METHOD FOR TRACKING THE PLAYING OF VCR PROGRAMS

[76] Inventors: Henry C. Yuen, P.O. Box 1159, Redondo Beach, Calif. 90278; Daniel S. Kwoh, 3975 Hampstead Rd., La Canada, Flintridge, Calif. 91011

[21] Appl. No.: 122,794

[22] Filed: Sep. 16, 1993

Related U.S. Application Data

[63] Continuation-in-part of Ser. No. 66,666, May 27, 1993, which is a continuation-in-part of Ser. No. 14,541, Feb. 8, 1993, which is a continuation-in-part of Ser. No. 1,125, Jan. 5, 1993, which is a continuation-in-part of Ser. No. 883,607, May 7, 1992, abandoned, which is a continuation-in-part of Ser. No. 817,723, Jan. 7, 1992, abandoned, which is a continuation-in-part of Ser. No. 805,844, Dec. 5, 1991, abandoned, which is a continuation-in-part of Ser. No. 747,127, Aug. 19, 1991, abandoned.

[51] Int. Cl.[6] .............................. H04N 5/782; H04N 5/91
[52] U.S. Cl. .................. 348/5; 455/2; 358/335; 360/27; 360/72.2; 348/2
[58] Field of Search .............................. 348/1, 5, 2, 906; 455/2; 360/27, 69, 72.2; 358/335; H04N 5/782, 5/91

[56] References Cited

U.S. PATENT DOCUMENTS

| | | | |
|---|---|---|---|
| 4,574,304 | 3/1986 | Watanabe et al. | 348/5 |
| 4,622,583 | 11/1986 | Watanabe et al. | 348/5 |
| 4,677,466 | 6/1987 | Lert, Jr. et al. | 348/5 |
| 4,792,864 | 12/1988 | Watanabe et al. | 358/335 |
| 4,864,432 | 9/1989 | Freer | 360/27 |
| 4,885,632 | 12/1989 | Mabey et al. | 348/5 |
| 5,047,867 | 9/1991 | Strubbe et al. | 358/335 |
| 5,165,069 | 11/1992 | Vitt et al. | 358/335 |
| 5,293,357 | 3/1994 | Hallenbeck | 348/784 |
| 5,319,453 | 6/1994 | Copriuza et al. | 455/2 |

Primary Examiner—James J. Groody
Assistant Examiner—Glenton B. Burgess
Attorney, Agent, or Firm—Christie, Parker & Hale

[57] ABSTRACT

A video tape player monitors the selection habits of a viewer selecting from a plurality of video tapes. Each video tape contains a plurality of programs. A first type of video tape has a title information symbol contained in a predetermined interval of the tape, e.g. the vertical blanking interval, for each program on the tape. A clock provides the time of occurrence of commands. A detector receives user inputted commands for controlling the movement of the video tape such as play, record, stop. The user inputted commands comprise a start play command to start moving, in a longitudinal direction, the video tape proximate to a magnetic head so that the magnetic head can detect the programs on the video tape and a stop command to stop moving the tape. A controller is coupled to the detector for commanding the motor in response to the detected user inputted commands and for reading the time of occurrence of the commands. A first memory stores a title information symbol for each program on a second type of video tape. A second memory stores the title information symbol and the time of occurrence of the detected user inputted commands. The contents of the second memory is provided to an external analyzer.

14 Claims, 59 Drawing Sheets

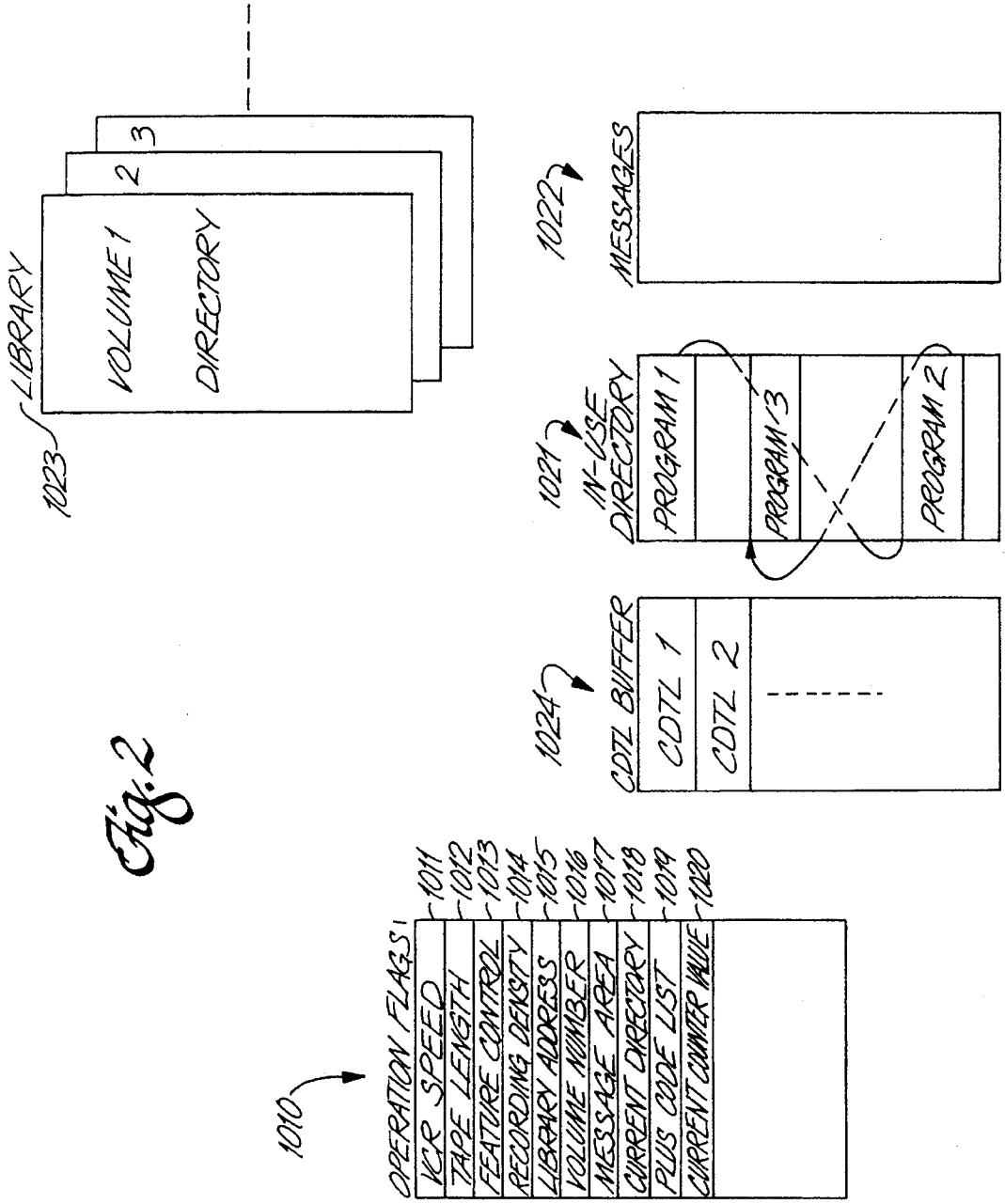

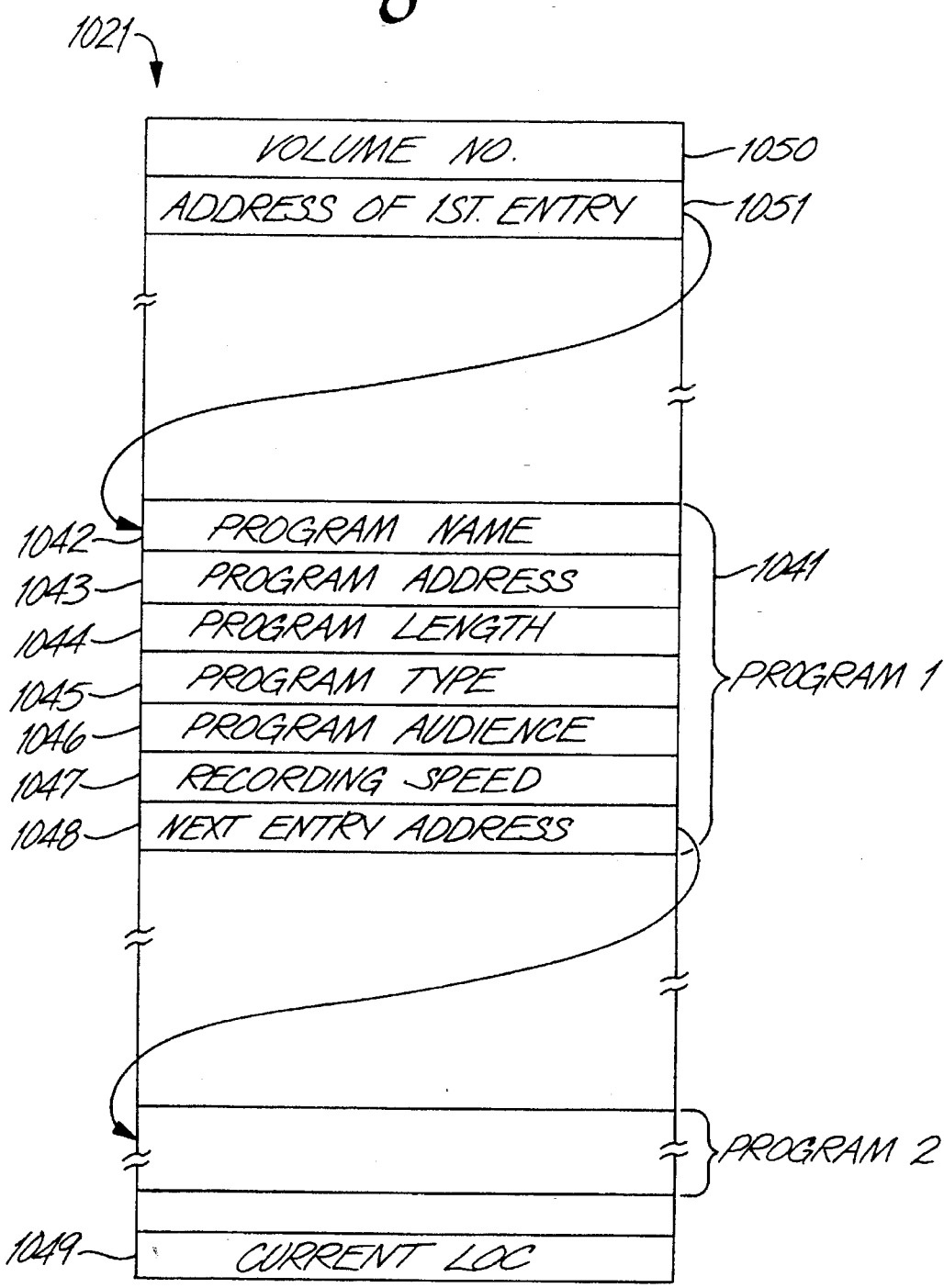

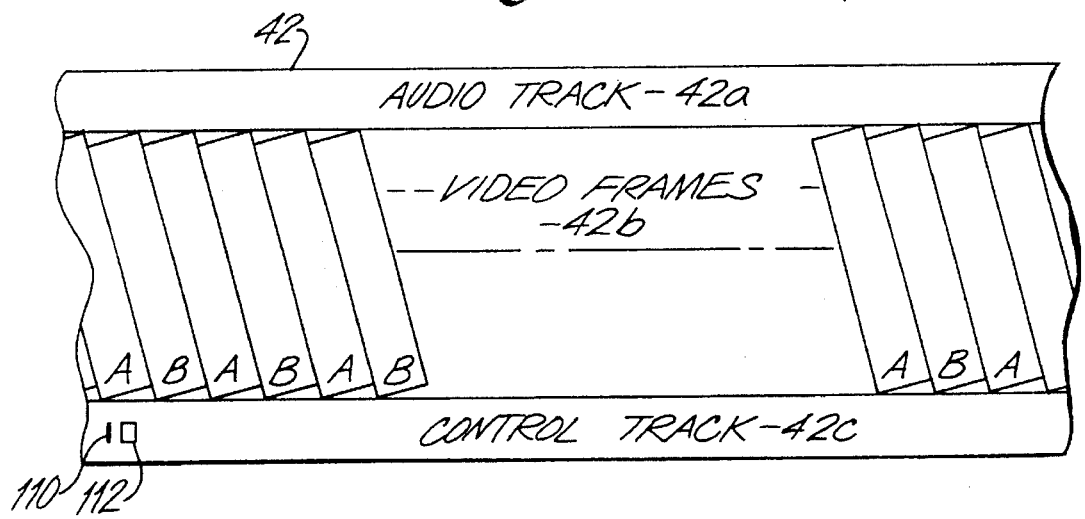
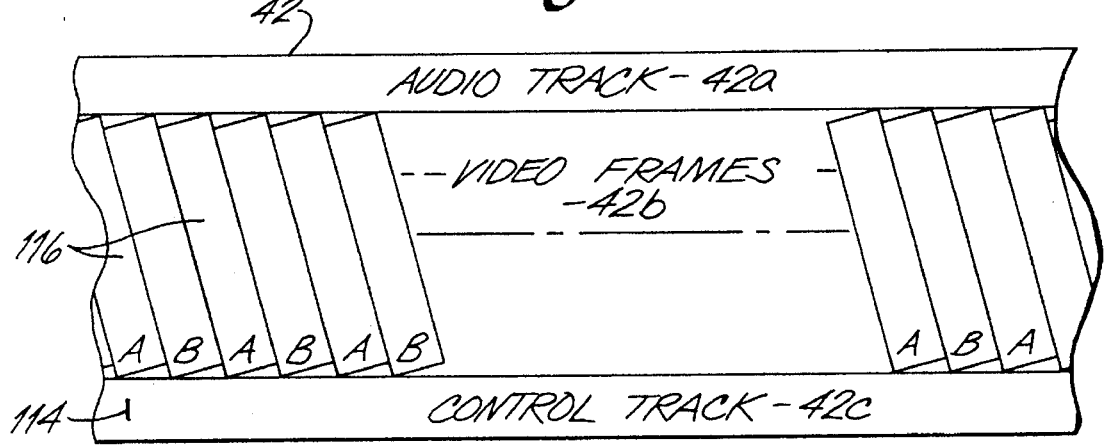

Fig. 8

| HR TAPES | START OF PROGRAM 1 | | START OF PROGRAM 2 | START OF PROGRAM 5 | | START OF PROGRAM 3 | START OF PROGRAM 4 |
|---|---|---|---|---|---|---|---|
| CT | VISS | | VISS | VISS | | VISS | VISS |
| VBI LINE 19 | TP(1) TP(1) TP(1) TP(1) | TP(2) | TP(5) TP(5) TP(5) TP(5) | | TP(3) | TP(4) | |
| SRAM DIRECTORY | | | | | | | |

Fig. 10

D(N) PACKET ON THE VBI  /* 2601 */

| START CODE | TYPE | N | START ADDRESS | STOP ADDRESS | RECORD SPEED | PC | PC EXTENSION | VERSION | LANGUAGE | TITLE TEXT | EXPAND | STOP CODE | CHECKSUM |
|---|---|---|---|---|---|---|---|---|---|---|---|---|---|
| 1 | 1 | 2 | 3 | 3 | 1 | 1 | 1 | 1 | 1 | m | n | 1 | 2 |

NUMBER OF BYTES

Fig. 11

D(0) PACKET FOR TAPE TITLE  /* 2602 */

| START CODE | TYPE | N | LENGTH | RESERVE | REEL DIAMETER | RESERVED | VERSION | LANGUAGE | TITLE TEXT | EXPAND | STOP CODE | CHECKSUM |
|---|---|---|---|---|---|---|---|---|---|---|---|---|
| 1 | 1 | 2 | 3 | 3 | 2 | 1 | 1 | 1 | m | n | 1 | 2 |

NUMBER OF BYTES

Fig. 12

TP PACKET ON VBI — 2603

| START CODE | TYPE | TID | RESERVED | N | STOP CODE | CHECKSUM |
|---|---|---|---|---|---|---|
| 1 | 1 | 10 | 1 | 3 | 1 | 1 |

NUMBER OF BYTES

Fig. 13

HR TAPE — 2604

| 0 | 0 | 0 | 0 | MACHINE ID | TAPE NUMBER |
|---|---|---|---|---|---|
| 39 | 38 | 37 | 31 | 30 — 16 | 15 — 0 |

BIT

Fig. 14

PR TAPE — 2605

| 1 | UPC |
|---|---|
| 39 | 38 — 0 |

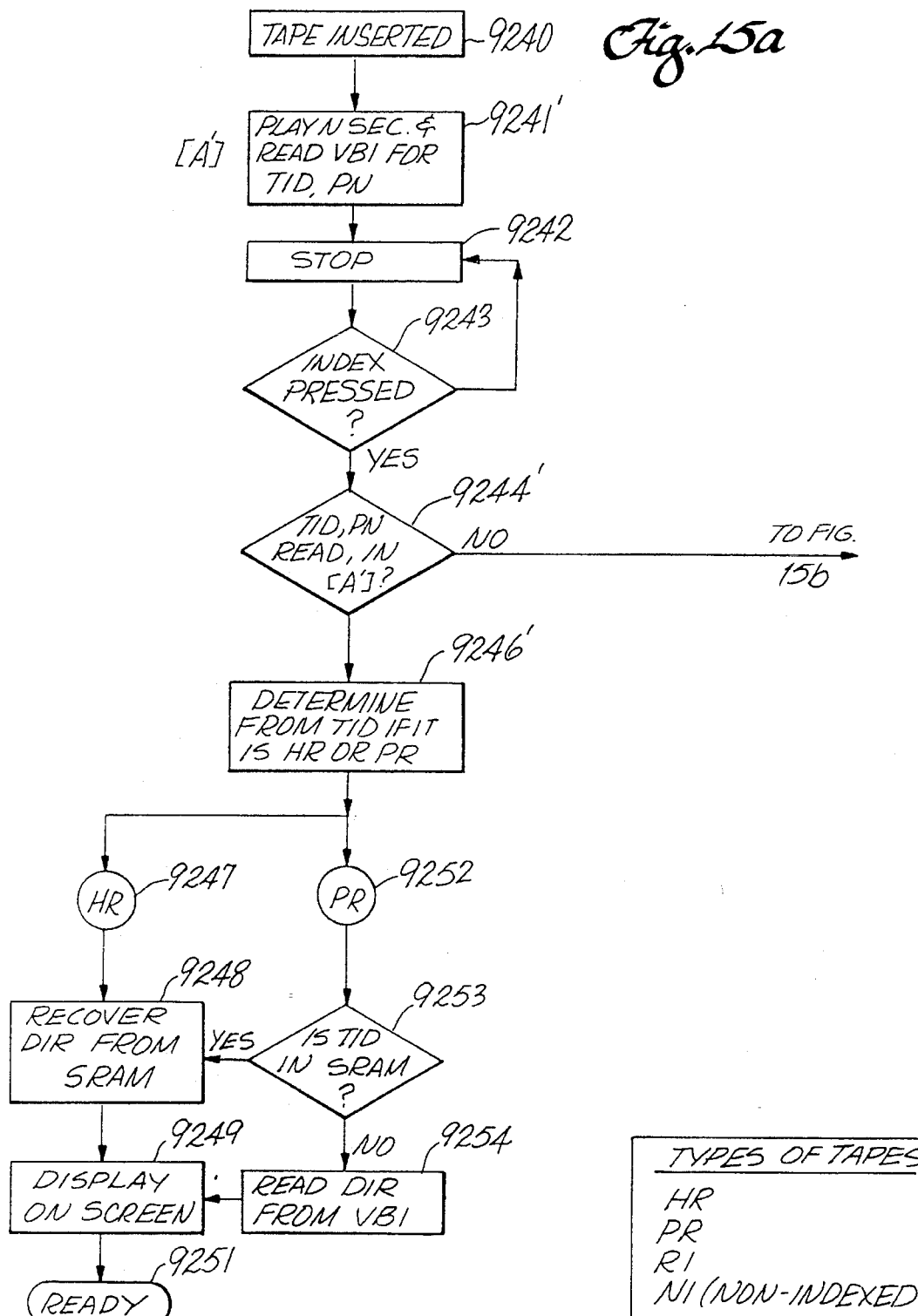

Fig. 20

```
                    STORED
    PR1 B:   VCR PLUS™ PROGRAMMER COUPON
    PR1 D:   LOSE WEIGHT FAST BY THIN JIM
                   TEMPORARY
    PR1 E:   FRUGAL GOURMET RECIPE
 →  PR1 F:   WINNING LOTTERY NUMBERS
    PR1 G:   GM REBATES FOR CADILLAC
    PR1 H:   ABC MOVIE OF THE WEEK
```

Fig. 24

| PROG. NUMBER | LENGTH |
|---|---|
| PROGRAM 1 | 10 |
| PROGRAM 2 | 12 |
| HBO MOVIE PROGRAM GUIDE 5/15/93 | 35 |
| PROGRAM 4 | 20 |

Fig. 25

| PROG. NUMBER | LENGTH |
|---|---|
| PROGRAM 1 | 10 |
| PROGRAM 2 | 12 |
| HBO MOVIE GUIDE 5/15/93 (VM) | 35 |
|     7:30 FANTASIA (120 MIN) | |
|     9:30 TERMINATOR II (135 MIN) | |
|     11:45 BATMAN (115) | |
| PROGRAM 4 | 20 |

Fig. 30

| POINTER DATA | START CODE | TYPE | ADDITIONAL ID | POINTER DES-CRIPTION (1) | POINTER (1) | | POINTER DESCRIP-TION (M) | POINTER (M) | STOP CODE | CHECKSUM |
|---|---|---|---|---|---|---|---|---|---|---|
| NUMBER OF BYTES | 1 | 1 | 2 | 1 | 1 | | 1 | 1 | 1 | 2 |

CJPG/PRI DATE PACKET — 2606

| START CODE | TYPE | USAGE | INFORMATION | STOP CODE | CHECKSUM |
|---|---|---|---|---|---|
| 1 | 1 | 2 | 2-128 | 1 | 2 |

NUMBER OF BYTES

| START CODE | TYPE | PID | STOP CODE | CHECKSUM |
|---|---|---|---|---|
| 1 | 1 | 1 | 1 | 2 |

NUMBER OF BYTES

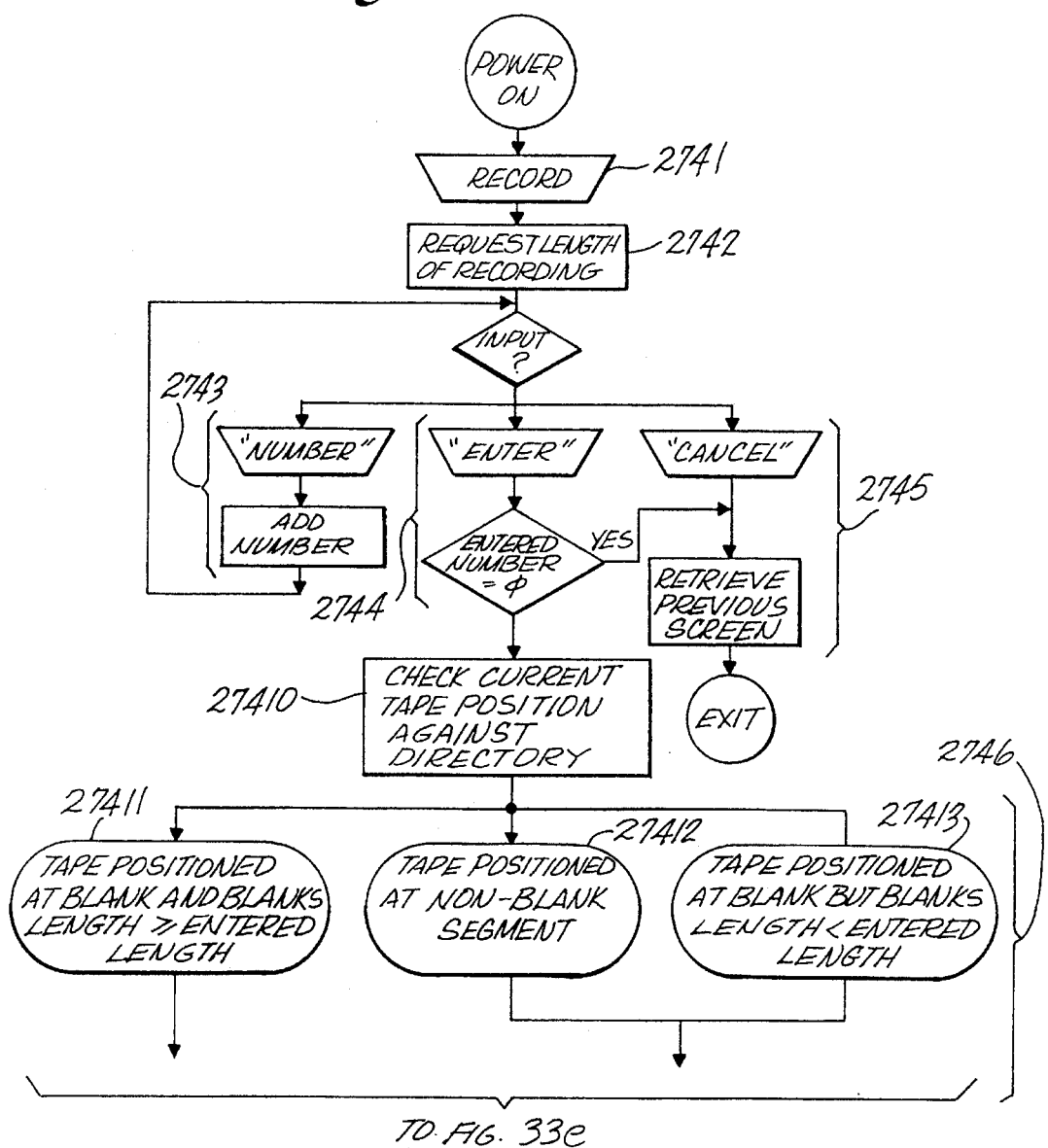

FROM FIG. 33d

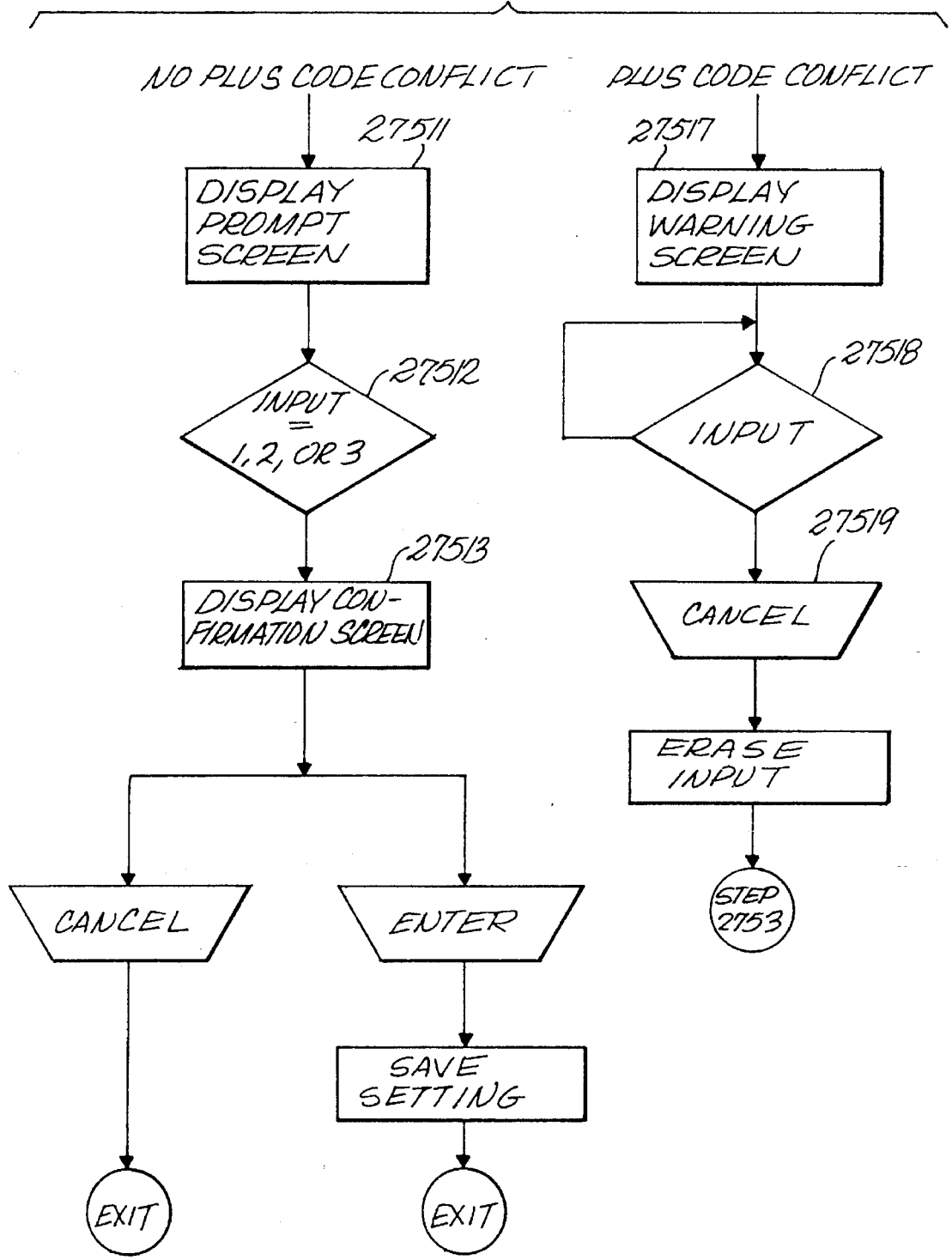

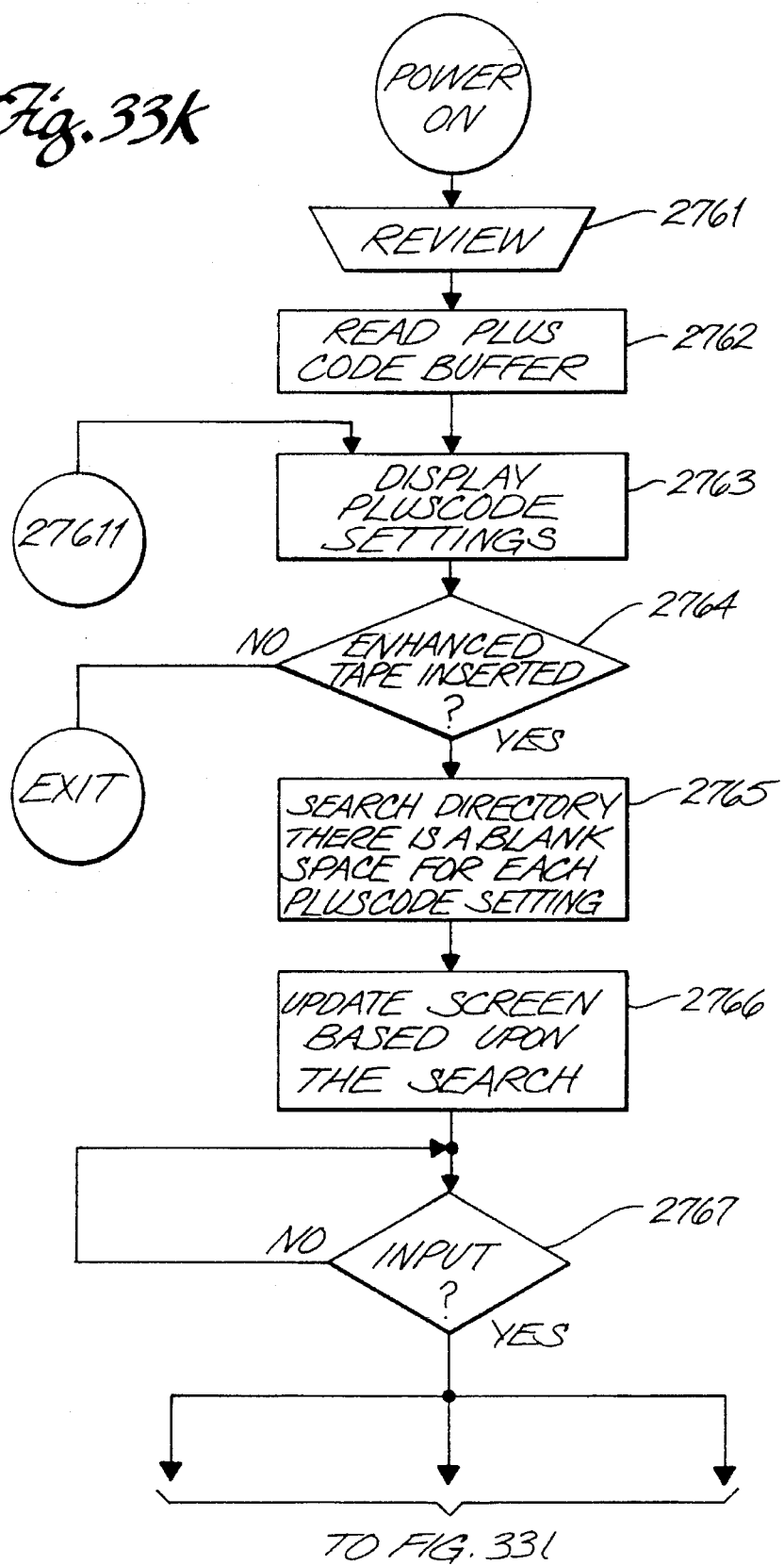

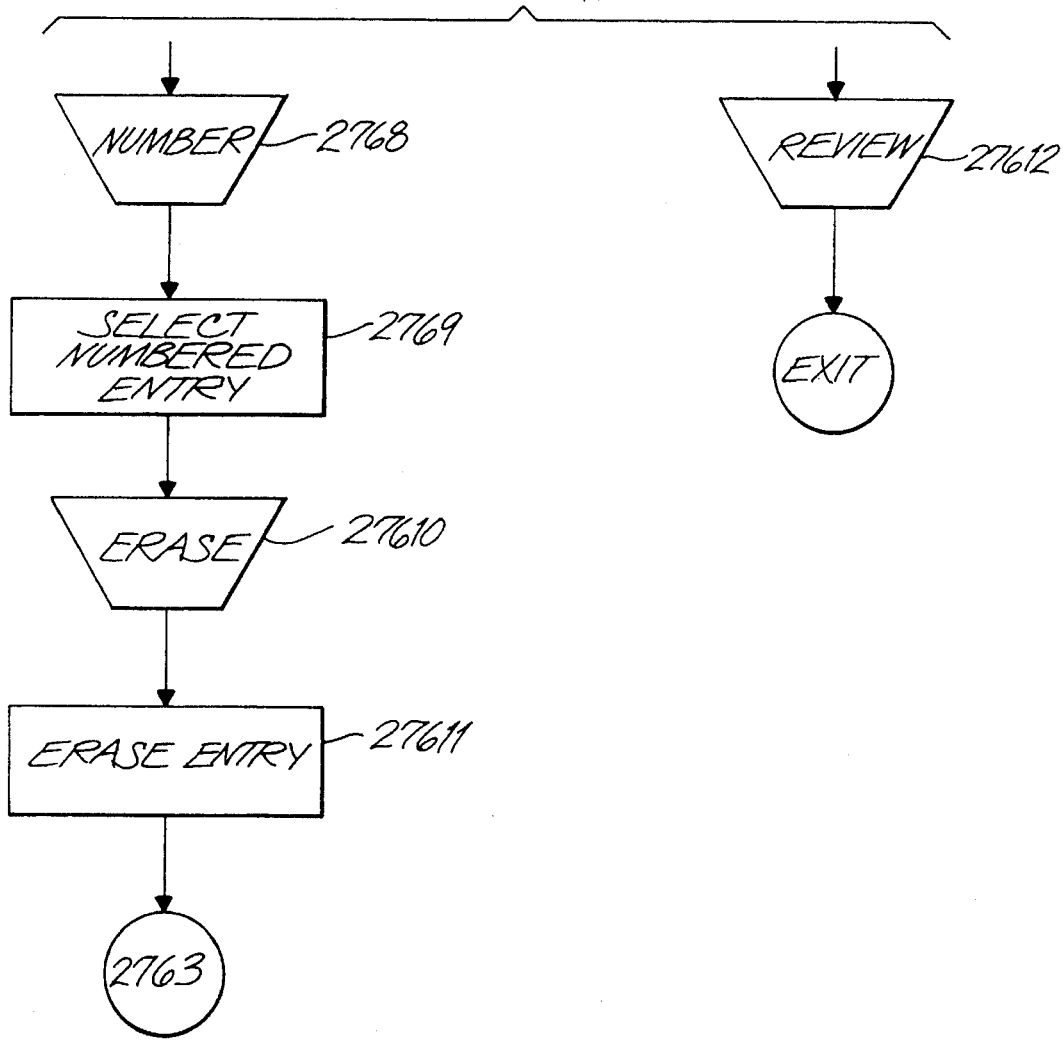

INDEX PLUS+

| | MIN | MODE |
|---|---|---|
| 1 STAR TREK PART 2 | 30 | SP |
| 2 (BLANK) | 19 | |
| 3 JOHN'S GRADUATION | 36 | SP |
| 4 8:30 PM, DEC. 12, 1992 | 18 | LP |
| 5 (END) | 24 | |

SPEED: SP
COMMAND:

*Fig. 34b*

```
                    INDEX PLUS +

MIN

1  STAR TREK                           30
    2  RODEO                               17
    3  BEYOND 2000                         26
    4  CHIP AND DALE                       18
    5  (END)                               24

MOVING TO 4
    COMMAND: 4 RECORD
```

Fig. 34c

```
                    INDEX PLUS +

MIN
    → 1    STAR TREK                           30
      2    RODEO                               17
      3    BEYOND 2000                         26
      4    CHIP AND DALE                       18
      5    (END)                               24

→ → →  PROGRAM 03
    COMMAND: 3 PLAY
```

Fig. 34d

ENTER LENGTH IN MINUTES

PRESS [ENTER] TO RECORD
OR [CANCEL] TO QUIT

Fig. 34e

```
            WARNING !!!
  RECORDING WILL OVERWRITE THE
  FOLLOWING PROGRAMS:
         CHIP AND DALE

PRESS [5] TO RECORD AS PROGRAM #5
  OR [CANCEL] TO EXIT
  OR [RECORD] TO OVERWRITE
```

Fig. 34f

```
                 INDEX PLUS +

MIN

1   STAR TREK PART 2                   30
        2   (BLANK)                            19
        3   BEYOND 2000                        26
        4   (BLANK)                           120
        5   CHIP AND DALE                      18
        6   (END)                              24
```

Fig. 34g

```
                 INDEX PLUS +

PLEASE ENTER PLUS CODE™ NUMBER
        OF DESIRED PROGRAM
        ------------------------------

PRESS [CANCEL] TO EXIT
              [ENTER] TO SAVE
              [ERASE] TO ERASE INPUT
```

Fig. 34h

```
                    INDEX PLUS +

INPUT IS AN INVALID PLUS CODE^TM NUMBER
        PLEASE CHECK LISTING AND RE-ENTER
        ---------------------------------

PRESS [CANCEL] TO EXIT
              [ENTER] TO SAVE
              [ERASE] TO ERASE INPUT
```

Fig. 34i

```
                    INDEX PLUS +

PLUS CODE^TM NUMBER SAVED

PRESS [1] FOR RECORDING ONCE ONLY
              [2] FOR RECORDING WEEKLY
              [3] FOR RECORDING EVERY WEEKDAY
```

Fig. 34j

```
                    INDEX

PLUS CODE™ NUMBER BUFFER FULL
     CANNOT PERFORM VCR PLUS+™
     PROGRAMMING

PRESS [CANCEL] TO EXIT
           [REVIEW] TO REVIEW PLUS CODE
                           BUFFER
```

Fig. 34k

PROGRAM TO RECORD

| # | CH | DATE | TIME | LEN | ST |
|---|----|------|------|-----|----|
| 1 | 3 | 12-01 | 3:00 | 5 | OK |
| 2 | 2 | 12-03D | 2:00 | 10 | OK |
| 3 | 5 | 12-04 | 19:00 | 15 | OK |
| 4 | 3 | 12-05 | 18:00 | 20 | OK |

TO ERASE A PROGRAM:
PRESS PROG # AND [ERASE]

Fig. 34l

```
                    INDEX

WARNING: THE PROGRAM YOU JUST SET
         CONFLICTS WITH PREVIOUSLY SET
         PROGRAM

CH    DATE    START    STOP
PREVIOUS      4     12-01   12:00    14:00
NEW           5     12-01   13:00    15:30

PRESS [CANCEL] TO CANCEL
      [REVIEW] TO REVIEW PLUS CODES
```

Fig. 34m

```
                    INDEX
                                        MIN
        → 1    STAR TREK                30
          2    RODEO                    17
          3    BEYOND 2000              26
          4    CHIP AND DALE            18
          5    (END)                    24

COMMAND: 2 ERASE
```

Fig. 34n

```
                 WARNING !!!

DO YOU REALLY WANT TO
            ERASE PROGRAM #02?

PRESS [ENTER] TO ERASE
            OR [CANCEL] TO EXIT
```

Fig. 34o

```
                    INDEX
                LIBRARY OPTIONS
        1. ADD TAPE VOLUME TO LIBRARY
        2. ACCESS LIBRARY
        3. CANCEL
           PRESS SELECTION AND [ENTER]
```

Fig. 34p

```
                    INDEX
              ACCESS LIBRARY OPTIONS

1. SEARCH PROGRAMS BY PROGRAM TITLES
        2. SEARCH PROGRAMS BY PROGRAM TYPES
        3. DISPLAY A TAPE DIRECTORY

PRESS NUMBER OF OPTIONS AND
        [ENTER] TO CONTINUE A PREVIOUS SEARCH
        PRESS "C" BEFORE SELECTING AN
        OPTION
```

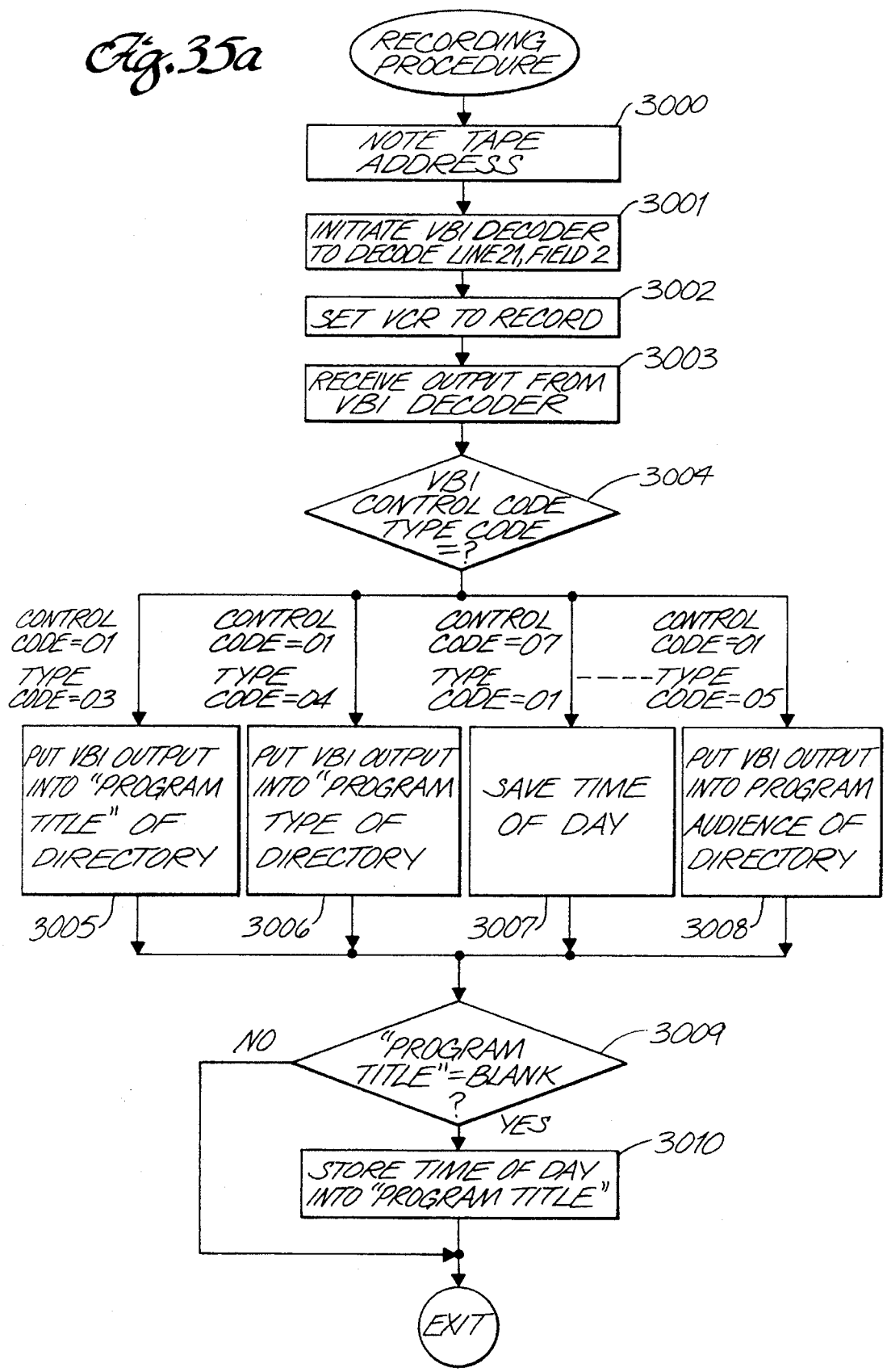

Fig. 35b
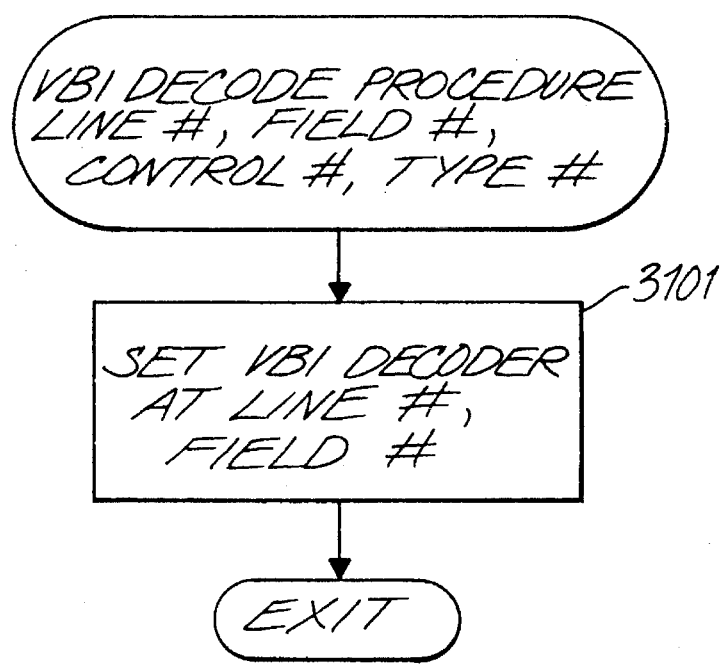
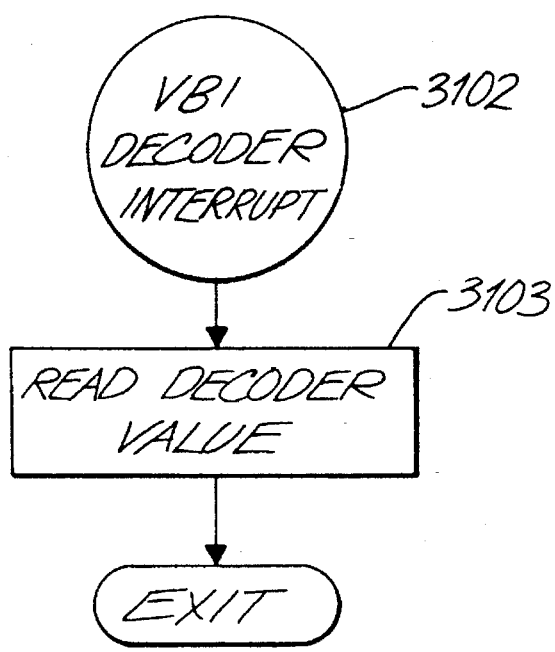

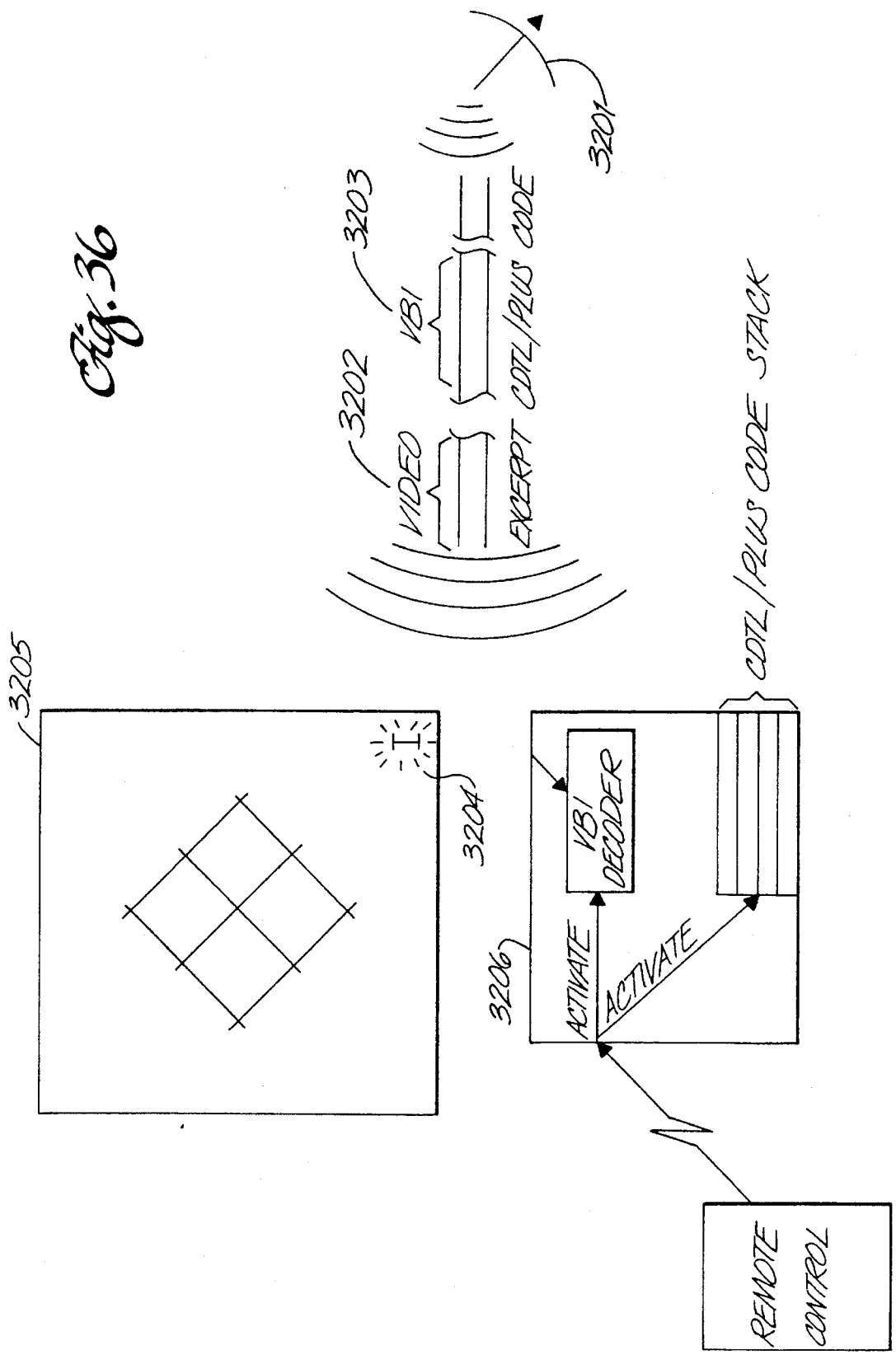

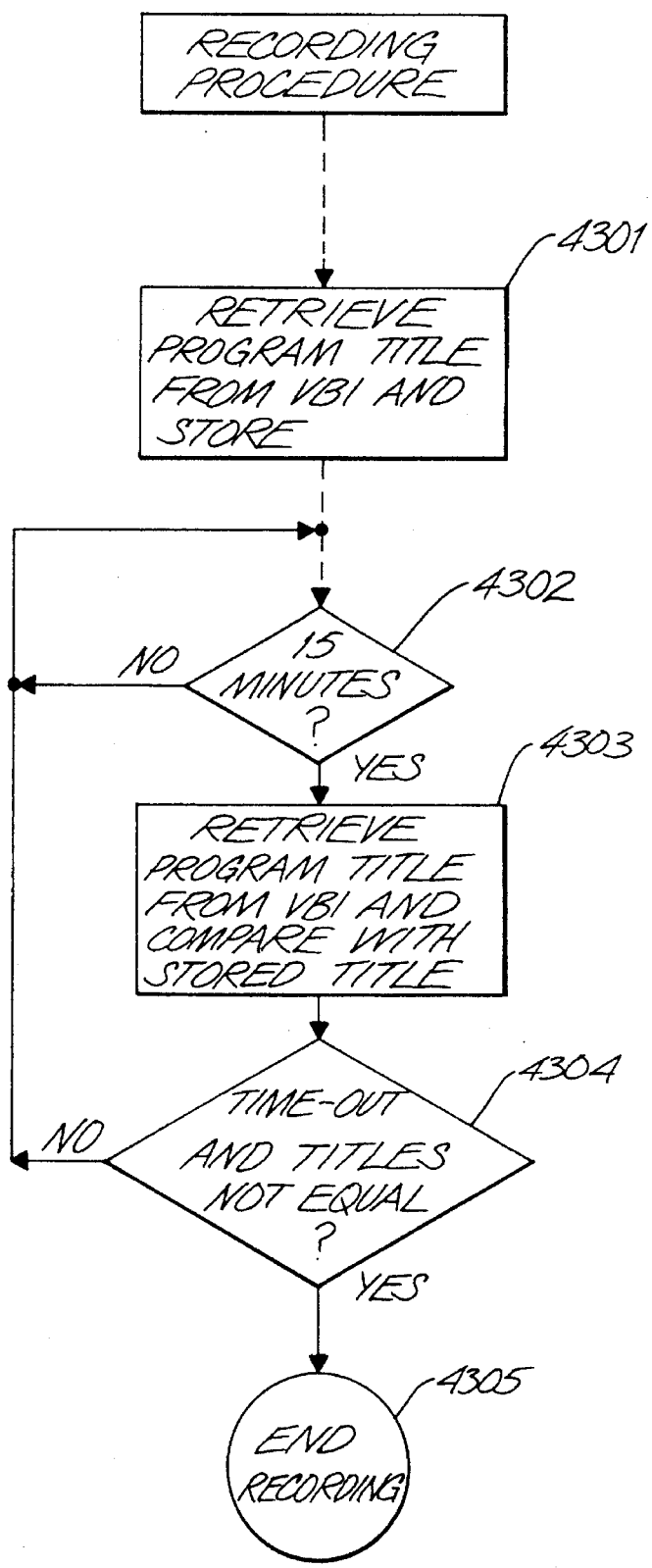

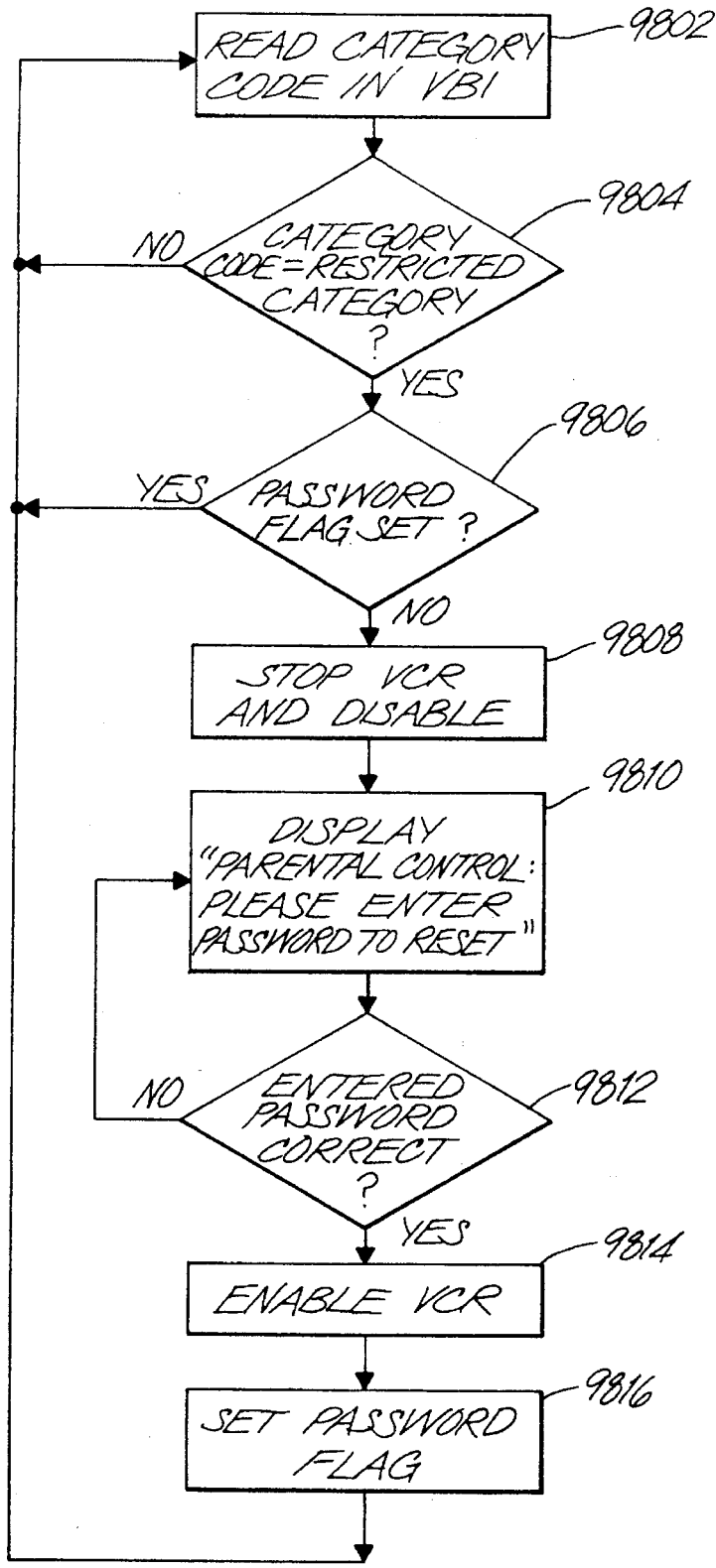

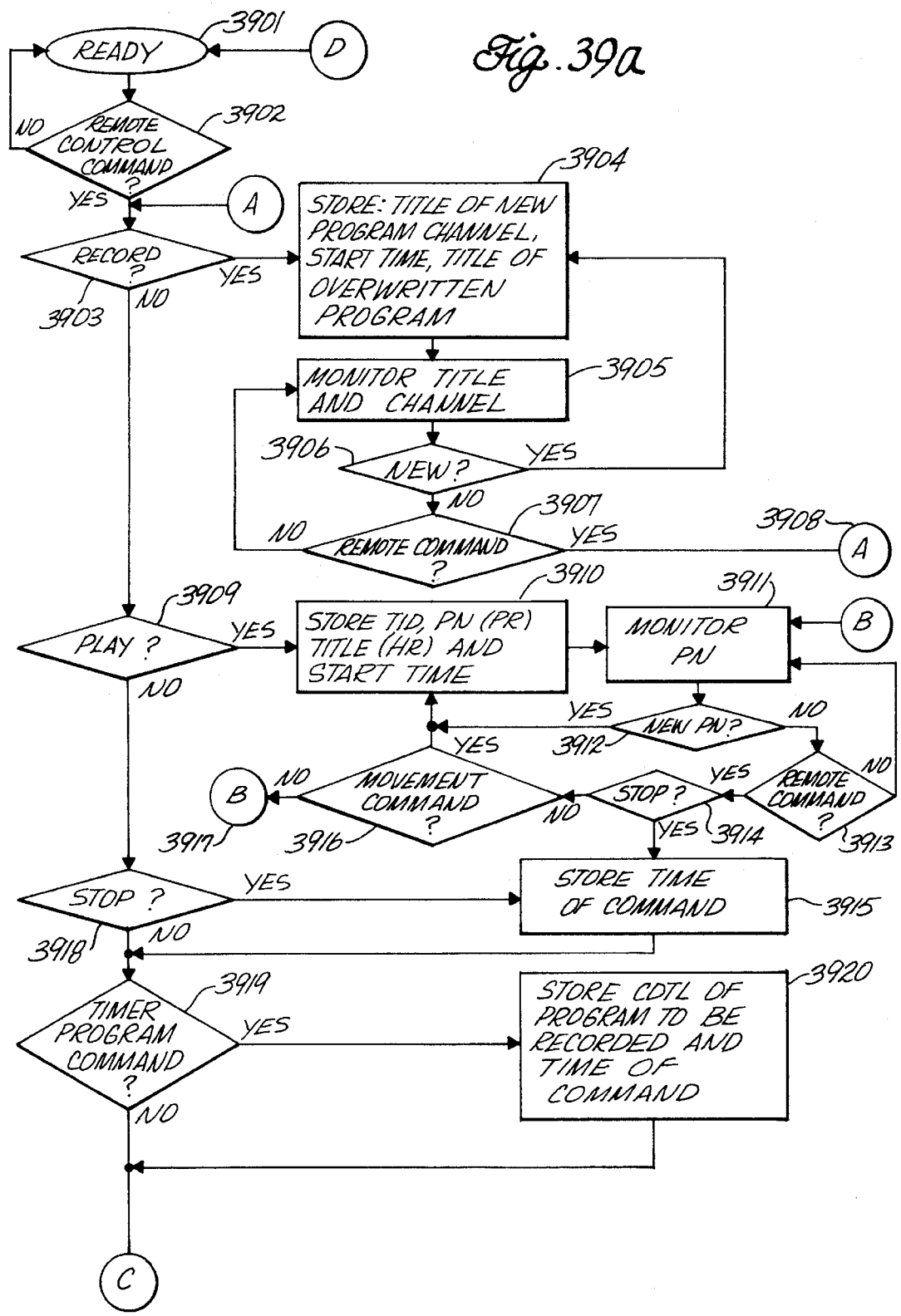

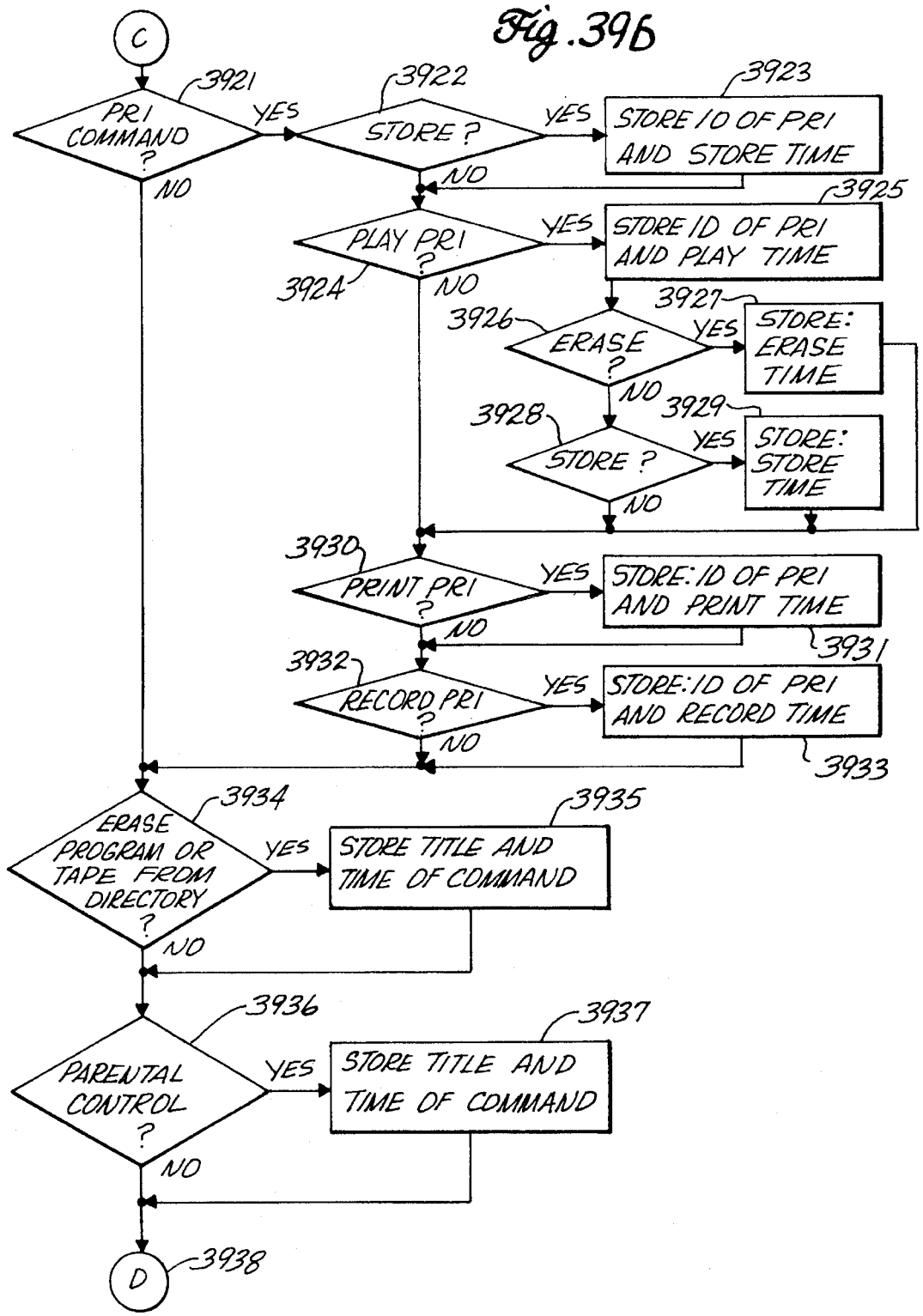

APPARATUS AND METHOD FOR TRACKING THE PLAYING OF VCR PROGRAMS

CROSS REFERENCE TO RELATED APPLICATION

This is a continuation-in-part of patent application Ser. No. 08/066,666, filed May 27, 1993, which is a continuation-in-part of application Ser. No. 08/014,541, filed Feb. 8, 1993, which is a continuation-in-part of application Ser. No. 08/001,125, filed Jan. 5, 1993, which is a continuation-in-part of application Ser. No. 07/883,607, filed May 7, 1992, now abandoned, which is a continuation-in-part of application Ser. No. 07/817,723, filed Jan. 7, 1992, now abandoned, which is a continuation-in-part of application Ser. No. 07/805,844, filed Dec. 5, 1991, now abandoned, which is a continuation-in-part of application Ser. No. 07/747,127, filed Aug. 19, 1991, now abandoned, the subject matter of which is incorporated herein by this reference.

FIELD OF THE INVENTION

This invention relates to apparatus and methods for facilitating and monitoring the management, storage and retrieval of programs on a cassette of magnetic tape, and, more particularly, for the automatic monitoring of the operation of a video cassette recorder.

BACKGROUND OF THE INVENTION

Advertising rates for commercials of television programs are determined by the expected size of viewer audience for television programs. These expectations are usually determined from the estimated audience sizes of previously broadcast shows. For example, a weekly television series will estimate its audience size for upcoming episodes based on the estimated size of previously broadcasted episodes. In addition, advertising rates may be adjusted based on an after the fact estimation of the market share for the televised program. The present systems for estimating market share involve survey evidence such as the Nielsen ratings. Previous market data was taken by selecting households to record their viewing habits. For example, a selected household might record in a written journal or diary when members of the household turn on and turn off the television, what channels are selected, and the number of viewers in the room. This data may alternatively be collected by providing the user with an electronic device where he pushes a button that indicates the turning on or off of the television and the channel selected. Other systems are connected directly to the television that will monitor power on and off and the channel and time of the selected programs. These monitoring systems are typically wired to a dedicated telephone line, and when instructed, they dump their memory over a phone line to a central computer for analysis.

However, these monitoring systems are inadequate for monitoring when a viewer records a program on a video tape using a video cassette recorder. For recording programs, the VCR may be operated independently of turning the television set on, and thus the systems will not detect the fact that the program was recorded. When the recorded program is subsequently viewed, the systems will note that the television is turned on but the selected channel is typically an uncommon television channel, such as channel 3 or 4, which is selected every time the VCR is operated. Even knowing that the television has been turned on, the monitoring system cannot determine the program that is being played. In addition, an individual may watch a recorded program several times over periods of years. The diary entry system is also erroneous because a viewer may not be inclined to record his entries or may make false entries.

Publishers of video tapes presently have no method for determining the frequency of viewing of their video tapes. In particular, one type of video tape contains a plurality of different video programs. For example, a Jane Fonda workout tape may contain ten different exercises ranging from an initial warmup to segments exercising leg muscles, segments for exercising upper body muscles, and a final cool down segment. While exercising viewers may skip certain strenuous segments on a regular basis. However, the video publisher does not know that such skipping occurs, By knowing that one video segment is not being watched, the publisher can either modify the segment or eliminate it completely. For example, in the Jane Fonda workout video example, the strenuous exercise segment may be reduced to being less strenuous or a separate tape could be generated without the strenuous segment and marketed as a low impact exercise tape.

SUMMARY OF THE INVENTION

A video tape player monitors the selection habits of a viewer selecting from a plurality of video tapes. Each video tape contains a plurality of programs. A first type of video tape has a title information symbol contained in a predetermined interval of the tape, e.g. the vertical blanking interval, for each program on the tape. A clock provides the time of occurrence of commands. A detector receives user inputted commands for controlling the movement of the video tape. The user inputted commands comprise a start play command to start moving, in a longitudinal direction, the video tape proximate to a magnetic head so that the magnetic head can detect said programs on the video tape and a stop command to stop moving the tape.

A controller is coupled to said detector for commanding the motor in response to said detected user inputted commands and for reading the time of occurrence of said detected user inputted commands. A first memory stores a title information symbol for each program on a second type of video tape. A second memory stores the title information symbol and the time of occurrence of said detected user inputted commands. A circuit provides the contents of the second memory to an external analyzer.

In another embodiment, an indexing video tape system has a video tape recorder. A VBI decoder decodes information from the vertical blanking interval of a video signal provided by either a remote broadcaster, the video tape recorder, or another video tape recorder. A VBI encoder encodes information on the vertical blanking interval of a video signal that is provided to the video tape recorder. A first memory stores directory information of a video tape. A display shows the directory information or the decoded information. A circuit receives user selected commands. A controller of the tape system receives the user selected commands and the information and uses the commands and the directory and decoded information to operate the indexing video tape system. A circuit monitors the operations from the controller. A second memory stores the monitored operations.

In one embodiment, the circuit that monitors the operations from the controller also determines the time of the occurrence of the user selected commands.

The system periodically provides the monitoring data to an information analyzer.

In a method for monitoring information for analyzing user selection habits of viewing a plurality of programs recorded on a video tape, record or play commands for either user inputted commands or a microprocessor controller in an indexing VCR are detected. If a play command is detected, a title of one of the plurality of programs recorded on the video tape is read from a directory. The start time of the receipt of the play command is also read.

If a record command is detected, a title of a program being broadcasted that is to be recorded on the tape is read from a video signal. The start time of the receipt of the record command is read. A stop play or stop record command is monitored and detected. The stop time of the receipt of the stop command is read The title, start time, stop time, and either a play flag or a record flag corresponding to whether a play or record command was received are stored in a memory. The contents of the memory are provided to an information analyzer. User selections habits are determined from the contents of the memory.

BRIEF DESCRIPTION OF THE DRAWINGS

The foregoing features of the present invention will be better understood upon consideration of the following detailed description of certain preferred embodiments taken in conjunction with the accompanying drawings in which:

FIG. 2 is a schematic conceptually illustrating a structure of data stored in the RAM of the directory controller of FIG. 1 according to a specific implementation of the present invention;

FIG. 3 is a schematic illustrating a conceptual structure of an in-use directory in the data structure of FIG. 2 according to a specific implementation of the present invention;

FIG. 4 is a graphical representation of the format of the information recorded on the magnetic tape in the cassette of FIG. 1 with markers and directories in the control track;

FIG. 5 is a graphical representation of the format of the information recorded on the magnetic tape in the cassette of FIG. 1 with markers in the control track and the directories in the fields of the video frames;

FIG. 8 is a schematic view of the embodiment of FIG. 7 where a program has been overwritten on the tape;

FIG. 10 is a schematic view showing the format for an embodiment of the directory packet recorded in the VBI for prerecorded tapes;

FIG. 11 is a schematic view showing the format for an embodiment of the directory packet D(0) for the tape title recorded in the VBI for prerecorded tapes;

FIG. 12 is a schematic view showing the format for an embodiment of a TP packet recorded on the VBI for HR tapes and PR tapes;

FIG. 13 is a schematic diagram showing the format for an embodiment of a TID for an HR tape;

FIG. 14 is a schematic diagram showing the format for an embodiment of a TID for a PR tape;

FIGS. 15a–15b are flow charts showing the steps employed in the operation of the indexing VCR, using the VISS PLUS TP addressing system, when a tape is inserted therein;

FIG. 20 is a schematic diagram of the display of the program related information stored in the buffers;

FIG. 24 is a schematic diagram of the display of the directory selected in FIG. 23;

FIG. 25 is a schematic diagram of the display of the directory including the electronic guide selected in FIG. 23;

FIG. 30 is a schematic view showing the format for the pointer packet data broadcasted in the VBI for auxiliary information;

FIG. 31 is a schematic view showing the format for the CSPG/PRI packet data recorded in the VBI as pointed to by the pointer in line 21 of the VBI;

FIG. 32 is a schematic view showing the video magazine (VM) packet used for video magazines;

FIGS. 33b–33n are flow charts showing the steps performed by the controller when different keys are pressed;

FIGS. 34a–34p illustrates the different screens displayed by the VCR embodying the present invention;

FIGS. 35a–35c illustrate the steps of different procedures performed by the VCR embodying the present invention;

FIG. 36 illustrate how instant information is decoded from the VBI and used in the VCR embodying the present invention;

FIG. 37 is a flowchart showing the steps for extending the recording of a broadcasted program;

FIG. 38 is a flowchart showing the steps employed in the operation of the parental control feature of the indexing VCR;

FIG. 39a is a flowchart showing the steps employed in the monitoring of signals representative of user selections of program viewing from the remote controller; and FIG. 39b is a flowchart showing the steps employed in the monitoring of signals representative of user selections of viewing or recording auxiliary information.

DETAILED DESCRIPTION

The Indexing VCR

Figure 1:
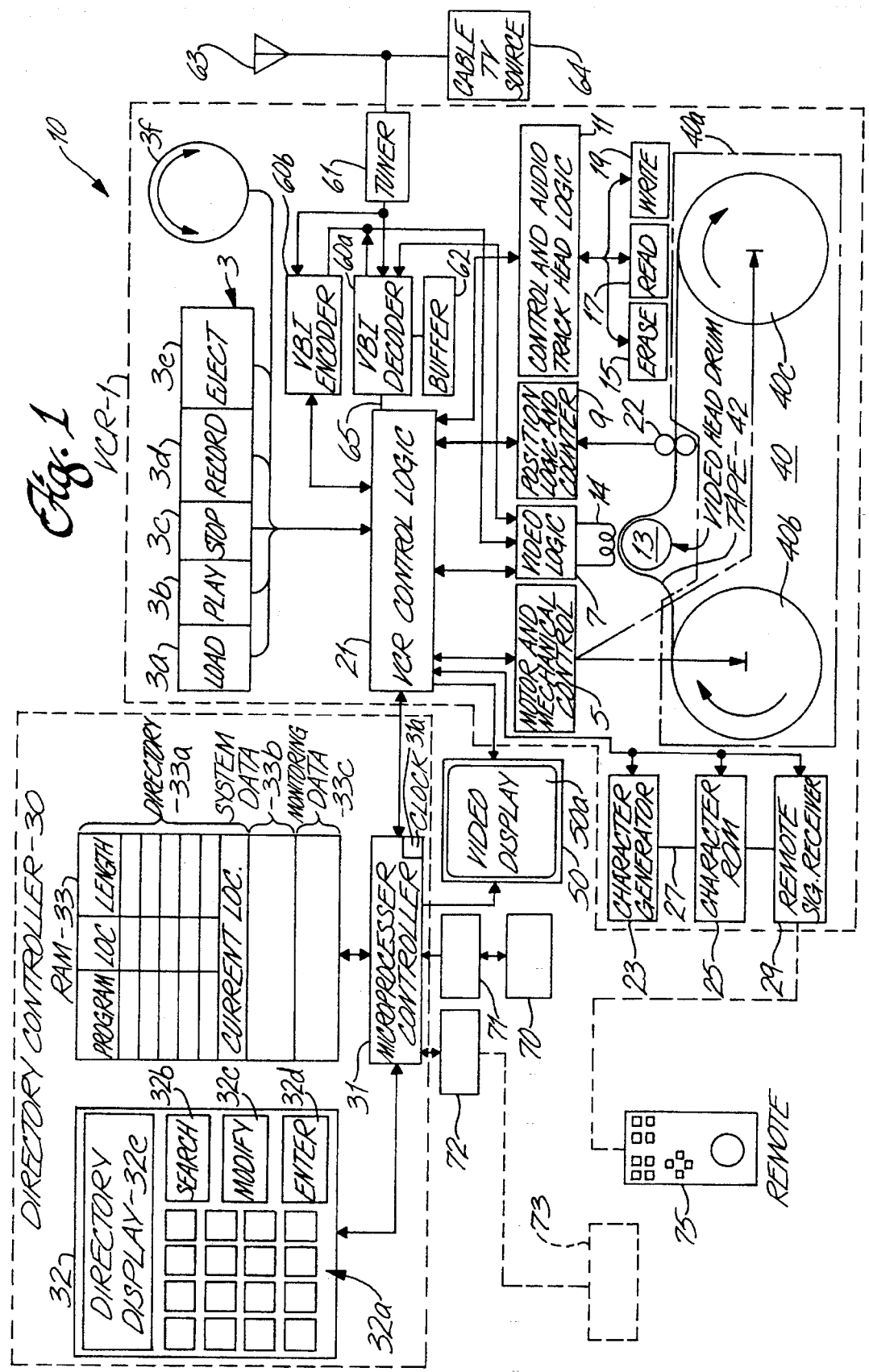
FIG. 1 is a block diagram illustrating an indexing video cassette recorder, using a hybrid indexing system that provides indexing of recorded programs for home recorded tapes, prerecorded tapes, and retroactively indexed tapes, and a standard video cassette format, and that has a directory controller, a bus interface, and an output interface and embodies the invention.

FIG. 1 is a block diagram of an indexing VCR system 10 including a video cassette reader/recorder (VCR) 1 with a conventional video tape cassette 40, a video display 50, and a directory controller 30. The VCR 1 is a video reader/recorder device and uses any one of many different recording technologies such as BETA, VHS, super VHS, 8 mm, VHS-C or any other popular technologies. In particular, VHS-C indexed tapes can be played directly on a VHS indexing VCR with full index functioning. The cassette 40 is a conventional video cassette having a magnetic tape 42 packaged in a cartridge 40a or cassette housing (hereafter called cassette) and transported between a feeding spindle 40b and a takeup spindle 40c. Even though the size and design of the housing is different for different types of recording technology, the basic information that goes on the tape itself is similar. The technology and operation of a VCR are well understood in the art.

The VCR 1 has a button control panel 3 with control buttons, including LOAD 3a, PLAY 3b, STOP 3c, RECORD 3d, and EJECT 3e, for controlling the operation of the VCR 1. The LOAD button 3a is optional and is not used on machines which load automatically. The VCR control logic circuit 21 receives control signals from the button control panel 3 and controls the overall operation of the VCR 1 by sending control signals to a motor and mechanical control logic circuit 5, a video logic circuit 7, a position logic and counter circuit 9, and a control and audio track head logic circuit 11 of the VCR 1, as well as to the video display 50 and the microprocessor controller 31 of the directory controller 30.

The motor and mechanical control logic circuit 5 controls loading and ejecting of the cassette 40 and also controls movement of the video tape 42 within the video cassette 40 during recording, reading (playback), fast forward, and rewind. The video logic circuit 7 controls the operation of a video read/write head drum 13 in reading from or recording video signals to the tape 42. The electrical signals are magnetically coupled between the video logic circuit 7 and the video head drum 13 using a winding 14. The position logic and counter circuit 9 monitors tape movement through a cassette tape movement sensor 22 and generates signals that represent tape position. The control and audio track head logic circuit 11 controls writing, reading, and erasing of signals on the control or audio track of the tape 42 through the write head 19, the read head 17, and the erase head 15.

The directory controller 30 includes a microprocessor controller 31, a random access memory (RAM) 33 and a directory input/output display and control panel 32. Preferably the microprocessor controller 31 comprises an integrated circuit microprocessor, a program store, such as a read-only-memory (ROM), for storing a control program to implement methods of the invention, and a clock 31a for generating a clock signal for timing functions and providing the time. The time may be set using the directory input/output display and control panel 32 in a manner known in the art. The microprocessor controller 31 controls the sequence and operation of the directory controller 30 and interfaces with the VCR control logic circuit 21 to implement the necessary functional capabilities for reading, updating and recording the directory. The microprocessor controller 31 in the indexing VCR 10 performs all indexing functions and human interface, interprets (e.g. tab, indent, screen format, attributes) and processes the auxiliary information display. An exemplary implementation of the microprocessor controller 31 is illustrated in the parent patent application Ser. No. 08/066,666. Alternatively, the VCR 1 may maintain the time. The RAM 33 is a conventional random access semiconductor memory which interfaces directly with the microprocessor controller 31. The RAM 33 is preferably non-volatile. Alternatively, the RAM 33 is battery backed up. A portion of the RAM 33 shown as system data 33b, is also used for storing the system software of the microprocessor controller 31. The RAM 33 is also used for storing the program directory 33a and the monitoring data 33c. The size of the RAM 33 is at the discretion of the manufacturer. However, the RAM 33 preferably can store the directory of at least 100 tapes. Accordingly, the RAM 33 is preferably at least 128k bits. Effective memory size of the RAM 33 may be increased by using well known data compression techniques. Data recorded in the RAM 33 may be encoded or scrambled. An exemplary method of encoding is the secret key data encryption standard (DES) proposed by IBM and adopted by NBS in 1978. An exemplary scrambling method is disclosed in the parent patent application Ser. No. 08/066,666. The encoding and decoding programs are stored in the ROM. The directory input/output display and control panel 32 has an alphanumeric keyboard 32a and special function keys, such as a SEARCH key 32b for commanding searches for data in the directory 33a and on the tape 42, a MODIFY key 32c for modifying or deleting directory information in the RAM 33, and an ENTER key 32d for entering program directory information. Instead of providing special function keys, functions can also be initiated by entering predefined sequences of conventional keys on the alphanumeric keyboard 32a.

A display 32e is a conventional liquid crystal or other type of display for displaying data being entered on the keyboard 32a, and to display the directory or other information stored in the RAM 33. Alternately, as discussed below, an on-screen display 50a can be used. The directory information stored in the RAM 33 is processed by the microprocessor controller 31.

The VCR 1 additionally comprises a character generator circuit 23 coupled to the VCR control logic circuit 21 and to a character generator read-only memory (ROM) 25. Character generators are well-known in the art. Typically, the character generator ROM 25 stores a data table representing pixel or bit patterns of a plurality of alphanumeric characters, such as the Roman alphabet and the Arabic numerals. Upon command by the VCR control logic circuit 21 and the character generator circuit 23, the data in the character generator ROM 25 is read and placed in an output signal to the video display at a position on the display determined by coordinates generated by the microprocessor controller 31. The end result is visual display of a alphanumeric character on the display screen. Character generators are well-known for channel display in television receivers, and for use in professional titling equipment.

The screen 50*a* is preferably 36 characters×15 rows. As will be described below, a broadcaster preferably broadcasts auxiliary information in this format. For displays with a different format, the indexing VCR 10 reformats the information. For example, a VCR with a higher screen display density, such as 36 characters×15 rows, may center the information in the 24 characters×10 rows format. Alternatively, for a higher screen display density, the data may be broadcasted at the higher density. When there are more rows than can be displayed on one page, the indexing VCR 10 displays a message, such as "(MORE)," to inform the user that there is another page of information.

Commercially available decoder circuits well known in the art for decoding the closed caption broadcasting system for the deaf can be optionally connected to the directory controller 30 for automatic generation of the program title for the directory of the program being recorded. Television broadcasts include titles and subtitles transmitted during the Vertical blanking interval (VBI) portion (described below) of the broadcast video signal, which can be decoded and displayed as text subtitles along with the video image by means of special decoding circuitry. Regular TV receivers do not decode nor process the signal, but with special decoder circuitry, the encoded text can be extracted and fed to the directory controller 30 for automatic generation of the title of the program being recorded. The extracted, decoded program title can be edited by a user or saved in the directory. Thus, the extracted program title can serve as an alternate data input source for the program directory, reducing the needed amount of user input. Other auxiliary information described below may also be broadcast during the VBI.

As shown in FIG. 1, caption decoding can be implemented by coupling an input of a VBI signal decoder 60*a* to the output of a tuner 61 which is generally included in the majority of consumer VCR's for off-the-air recording. The tuner 61 receives a broadcast TV signal from an antenna 63 or a cable TV signal source 64. Both the decoder, the tuner, and the interaction of both, are conventional in the art. Examples of commercially available VBI caption decoders include the TeleCaption 4000 Adaptor, commercially available from National Caption Institute, Falls Church, Va., and Teletext Decoder, available from Norpak Corporation, Ottawa, Canada. In a specific embodiment of the present invention, the VBI decoder 60*a* is a circuit from ITT with part number of CCD3000. The CCD3000 decoder may be set to decode a selected field and line of the VBI by setting a control and status register. Field selection is accomplished by selectively setting bit 4 of the IM BUS control register with a RAM address of 02H. Line selection is accomplished by selectively setting the IM Bus control register a with RAM address of 04H. (See "CCD 3000 Closed-Caption Decoder preliminary", table 4.2, page 31, Edition Apr. 22, 1991, ITT Semiconductors.) A decoder signal line 65 is coupled from the decoder to the VCR control logic circuit 21 to carry decoded caption data to the control logic circuit. The VCR control logic circuit 21 is commanded by the microprocessor controller 31 to pass the decoded data to the directory 33*a* under control of a stored program in the RAM 33. The program then causes the caption information to be stored as a program title in the directory and displayed on the display 50. The VBI data is sent to the RAM 33 during or immediately before the display of an on-screen directory at step 1408 described below for FIG. 35*a*, so that when the directory is displayed, the caption data immediately appears in the directory display. A user then can edit the caption to adjust it as desired.

Caption data is placed in a broadcast TV signal by a broadcast TV station in a continuous stream; a user of the VCR 1 cannot stop or slow down the stream without additional hardware. Thus, it is possible that the first caption data received by the antenna 63 is not the program title. This problem can be overcome by coupling a data buffer memory 62 to the decoder. Under control of the decoder, all caption data received by the VBI decoder 60*a* is stored in the caption buffer and serially output to the VCR control logic circuit 21. Each caption data word is displayed in the directory, and the user presses the ENTER button to accept the word and store it as a program title. For a period of time dependent on the size of the buffer and the rate of data received by the VBI decoder 60*a*, received data remains in the buffer from which it can be recalled by a user and saved as a program title. When the buffer 62 fills, any additional data words received will cause overflow, resulting in loss of the earliest received word. If a large enough buffer 62 is used, this overflow effect will not be a problem. The functions of reviewing buffered data and storing saved titles can be controlled by a stored computer program or subroutine in the RAM 33.

Not only can the information (e.g. title, subtitle, program identification) transmitted during the VBI portion be displayed in real time or used to generate program title for the directory, it can be utilized to further facilitate operation of the VCR. For example, by monitoring the transmitted title, the VCR can automatically detect the end of a program and stop recording thereto. Also by monitoring the VBI portion used for transmitting the title, the VCR can filter out (in recording a program) segments that are unrelated to the program (e.g. commercials), by temporarily stopping the VCR if changes in the title portion are detected.

It is disclosed in the preceding paragraphs that the VBI data may be broadcast at a relatively high repetition rate prior to broadcast, enabling a suitable decoder to detect the data. In the system of FIG. 1, the decoder 60*a* can be designed to receive and store in buffer 62 the program identification information from line 21 of field 2 of each frame. Using suitable logic, the program title and other information can be stored automatically in the directory 33*a*, without user intervention.

Caption data decoding is further described in the following specifications, which are hereby incorporated by reference herein: Title 47, Code of Federal Regulations, Part 15 as amended by GEN. Docket No. 91-1; FCC 91-119; "CLOSED CAPTION DECODER REQUIREMENTS FOR THE TELEVISION RECEIVERS"; Title 47, C.F.R., Part 73.682(a)(22), Caption Transmission format; Title 47, C.F.R. Part 73.699FIG. 6; "TELEVISION SYNCHRONIZING WAVEFORM"; Title 47, C.F.R., Part 73.699, FIG. 17A; "LINE 21, FIELD 1 DATA SIGNAL FORMAT"; and PBS Engineering Report No. E-7709-C, "TELEVISION CAPTIONING FOR THE DEAF: SIGNAL AND DISPLAY SPECIFICATIONS".

Memory Structure

Now the memory structure of the RAM 33 is described by referring to FIG. 2 which is a schematic conceptually illustrating a typical structure of the directory stored in the RAM 33 according to one embodiment of the present invention. The RAM 33 can be viewed conceptually as having an area 1010 for storing operation flags. These flags include a mode flag (MODEFLAG) 1011 for indicating the operation speed (e.g. SP, LP, or SLP) of the VCR 1 and which will be changed whenever the operation speed of the VCR 1 is changed. A tape length flag (TAPELNG) 1012 indicates the length (e.g. E-60, E-90, E-1200 ) of an inserted tape 42. A second memory flag 1014 (SECMEM) stores access information of a secondary memory which may be provided on the cassette 40 for storing directory information. For example, if the secondary memory is a magnetic strip on the housing, SECMEM 1014 may store the recording density of a magnetic strip, or if the secondary memory is a semiconductor memory on the cassette housing SECMEM 1014 may store the access time and capacity thereof.

The flags also include a feature control field (FTCNTL) 1013 for specifying the VCR functions that are available to a user. In the simplest case, if a secondary memory is needed on the cassette for storing directory information, FTCNTL 1013 will be set in one way if an inserted cassette has the secondary memory and in another way if the inserted cassette has no secondary memory. FTCNTL 1013 may also specify other functions, and can be set by reading a code carried at a predetermined area of the cassette (e.g. on a magnetic strip on the cassette housing).

Area 1010 also stores a message pointer 1017 pointing to a message area 1022 which stores input and output messages; and a CDTL pointer 1019 pointing to a CDTL buffer 1024 which stores channel-date-time-length (CDTL) data of future recordings.

In a preferred embodiment, a library 1023 is also provided in the RAM 33. The library 1023 stores directories of tapes which users of the VCR 1 have archived. Each directory stored in the library contains substantially the same information as the in-use directory. If a library is present, a library pointer 1015 is provided for pointing to the library 1023.

A directory pointer 1018 is also provided for pointing to an in-use directory 1021 which stores the directory of the currently inserted tape. This directory pointer 1018 may actually point to a location in the library wherein the directory of the tape is located.

In addition, the area 1010 also stores a volume number field (VOLNO) 1016 which stores a counter value representing the number of tape directories already stored in the library 1023. Other flags may be added as needed.

Referring to FIG. 3, which is a schematic illustrating a conceptual structure of the in-use directory 1021 in the data structure of FIG. 2, the in-use directory 1021 stores the directory of the cassette tape currently inserted into the VCR 1. For each program recorded on the cassette tape, a corresponding entry 1041 is set up in the in-use directory 1021. For purposes of illustration, FIG. 3 shows the entry 1041 only for program 1. However, each program similarly has an entry 1041. Each entry 1041 stores a title or program name (PROGRAM) 1042; a program address (LOC) 1043 which stores the absolute tape counter value of the beginning of the program; a program length value (LENGTH) 1044 which stores the length of the recorded program, represented as a function of the difference between its address from the address of the next program or record or a measure of time from a fixed reference point, such as the beginning of the tape; an optional program type field (TYPE) 1045 which stores the category of the recorded program; an optional program audience field (AUDIENCE) 1046 which stores the recommended audience of the program; and an optional recording speed (SPEED) 1047 which stores the speed at which the program is recorded.

A current tape location (CURRENT LOC) 1049 is also stored in the directory for indicating the absolute position from the beginning of the tape 42 in the cassette 40 where the valid directory is located, or the value of the tape counter when the tape is ejected. This field is used for setting the tape counter when the tape is reloaded into the VCR 1. The recording on the tape of the absolute tape position is described below.

A field 1051 is a pointer pointing to the address of the first entry of the directory 1021 represented in FIG. 3 by an arrow pointing to the program name (PROGRAM) 1042. Each entry also has a field 1048 storing the address of the next entry in the directory also represented in FIG. 3 by an arrow pointing to program 2. These fields provide a link from one entry to the next entry and are used for facilitating search, deletion, and addition of entries. In the preferred embodiment, the directory information is not stored on the tape 42, but is retrieved from the library 1023. In this embodiment, a volume label (VOLNO) 1050 is provided in the in-use directory 1021. This field is used for retrieving the directory information of the tape from a library 1023 stored in the RAM 33.

Each item in the directory can be modified through the use of the buttons on the keyboard 32a and the special function keys 32b, 32c, 32d of the directory controller 32, as will be described below.

Tape Format

By way of background, the format of the tape 42 is now described. FIGS. 4 and 5 illustrate the information content of one example of video tape for both BETA and VHS format which both use the same general tape layout. The tape 42 is divided into three areas. A narrow strip running along the upper edge of the tape 42 is an audio track 42a which contains audio signals. A second narrow strip running along the bottom edge of the tape is a control track 42c which contains synchronization ("sync") control signals. The middle area 42b is for video signals which are recorded in pairs of parallel fields going up and down the width of the tape at a slight angle. The markers 110, and 114 indicate the location of the directory on the tape. Directory 112, 116 are recorded in one embodiment on the control track and in the other in the video frames.

The video head drum 13 is fitted with two read/record heads 180 degrees apart, so that even numbered lines make up one field and odd numbered lines make up the other field. To reduce flicker on the video screen, these fields are projected onto the face of the cathode ray tube (CRT) screen 50a of the video display 50 at alternating intervals.

Decoding VBI Information

Video images in cathode ray tube (CRT) type video devices (e.g. television) are generated by scanning a beam along a predefined pattern of lines across a screen. Each time all the lines are scanned, a frame is said to have been produced. Each video frame in the broadcast signal is divided into two fields, referred to as field 1 and field 2.

The VCR control logic circuit 21 scans the beam typically from the top, left hand corner and scans across the screen. After it finishes scanning one line, the beam returns to the left-hand side and repeats along another line which is parallel to but lower than the previous line. The scanning continues along the odd-numbered lines until the beam reaches the center of the bottom part of the screen. These odd-numbered lines form field 1.

From the bottom center of the screen, the beam returns to the top, where it starts scanning from substantially the center of the screen along the even-numbered lines which interlace the lines of field 1. The even-numbered lines form field 2. When the beam reaches the bottom, right-hand corner of the screen, a picture frame is formed. In the NTSC protocol widely used in North America, each field contains 262.5 horizontal lines and a pair of fields constitute a single 525 line video frame and creates one video picture at one instant in time on the video display 50.

During the time in which the beam returns from the bottom to the top of the screen, it carries no video signals because it does not produce any picture element on the screen. This time interval is generally known as the vertical blanking interval (VBI). Its duration is generally about twenty times the time duration that the beam takes to scan across the screen. In other words, the length of the VBI is equal to the time for the beam to scan several lines. Thus, the VBI typically contains a plurality of lines and is identified by the field with which it is associated. Apparatus and methods using these techniques are well known in the art and therefore are not discussed in detail herein.

Since no image element is produced on a television screen during a vertical blanking interval, no information therefore needs to be carried by the broadcast signals. Thus, proposals have made to use the VBI for conveying auxiliary information from a television network or station to the audience. For example, Closed-Caption data associated with a television program are transmitted as encoded composite data signal during VBI line 21, field 1 of the standard NTSC video signal, at a rate of 480 bits per second. In the above-identified Draft EIA-608, information are sent in the VBI as packets. Currently, six classes of packets are proposed, including:

- a "Current" class for describing a program currently being transmitted
- a "Future" class for describing a program to be transmitted later
- a "Channel Information" class for describing non-program specific information about the transmitting channel
- a "Miscellaneous" class for describing other information
- a "Public Service" class for transmitting data or messages of a public service nature such as National Weather Service Warnings and messages and
- a "Reserved" class reserved for future definition.

According to the E.I.A. proposal, a packet is preceded by a Start/Type character pair, followed by information/informational characters pairs until all the informational characters in the packet have been sent.

Table I lists a subset of the control and type codes of various kinds of information to be broadcasted in the VBI according to the E.I.A. proposal. For example, to transmit the program identification number (scheduled start time) of a program, a control code of 01h, a type code of 01h and a packet of four characters (one character specifying the minute, one character specifying the hour, one character specifying the date and one character specifying the month) are sent. Similarly, to transmit the program name, a control code of 01h, a type code of 03h and a packet of between 2 to 32 characters are sent. As another example, the VBI may also be used to transmit a time-of-day value, by sending a control code of 07h, a type code of 01h and a packet of two characters.

TABLE I

| CONTROL CODE | TYPE CODE | |
|---|---|---|
| 01h | 01h | PROGRAM IDENTIFICATION NUMBER (PROGRAM START TIME) |
| (CURRENT CLASS) | 02h | LENGTH/TIME-IN-SHOW |
| | 03h | PROGRAM NAME |
| | 04h | PROGRAM TYPE |
| | 05h | PROGRAM AUDIENCE |
| | 06h | AUDIO SERVICES |
| | 06h | AUDIO SERVICES |
| | 07h | CAPTION SERVICES |
| | 09h | ASPECT RATIO INFORMATION |
| | 0Ch | COMPOSITE PACKET-1 |
| | 0Dh | COMPOSITE PACKET-2 |
| | 10h-17h | PROGRAM DESCRIPTION YOU 1 TO YOU |
| 05h | 01h | NETWORK NAME |
| (CHANNEL INFORMATION CLASS) | 02h | CALL LETTERS (STATION ID) AND NATIVE CHANNEL |
| 07h | 01h | TIME OF DAY |
| (MISCELLANEOUS) | 02h | IMPULSE ID |
| | 03h | SUPPLEMENTAL DATA LOCATION |

As an optional embodiment, a field, hereinafter referred to as a "program category" is also provided. The program category identifies the kind, such as whether the corresponding program is a sport program, a movie, a talk show, and so forth. The availability of this program category field further facilitates selection of recorded programs and operation of the VCR. The program category can be entered in the same way as a title. This is, the program category can be transmitted during the VBI portion of the broadcast video signal, and decoded by means of special decoding circuitry; alternatively, it can be entered by means of a jog shuttle knob as described above.

Indexing Overview

The VCR uses the directory described herein to perform searches of the user's tape library to find the tape that a selected program is on. The directory of a particular tape may be searched using keywords, or title information to locate a program on the tape. The tape may then be advanced to the selected program. Indexing is used herein to describe these searches, the generation of these directories, and all related functions.

The indexing VCR 10 provides a hybrid method for indexing recorded programs, which are recorded on one of three types of tape: home recorded tapes, prerecorded tapes, and retroactively indexed tapes. A home recorded tape (HR tape) is a tape on which the user has made recordings from broadcast or cable by either real time recording, timer programming his VCR, or using a "VCR PLUS+™" programming system. As will be described below, the index is created at the time of recording by the VCR. The second type of tape is a prerecorded tape (PR tape) that is a commercially purchased tape, such as a Raquel Welch work-out tape, a karaoke tape, songs, lectures or speeches, that contains many titles on it or may contain only one program. These tapes are not expected to be overwritten. The index is stored on the tape by the video publisher at the time of the recording. The third type of tape is a retroactively indexed tape (RI tape) which is a previously unindexed recorded tape on which the user retroactively adds an index. For this type of tape, the index is added by the VCR at the time of the retroactive indexing. For the HR tapes and the RI tapes which are both produced by the home VCR, the directories all reside in the RAM 33 of the indexing VCR 10.

As will be described in detail below, HR and PR tapes have tape identification numbers (TID) written at some repetition rate along the whole tape on a VBI line. Alternative tape formats are described in the parent patent application Ser. No. 08/066,666.

If the directory or directories are stored in the video fields, corruption of video signals with directory signals on selected video fields, such as a few odd fields spaced apart by a certain number of fields, has little noticeable visual degradation of the video picture. This is because the human brain retains a visual image for a brief period after the image is removed ("persistence of vision").

The TID's reference the tape to a corresponding directory stored in the RAM 33. When a HR tape is inserted into the VCR, the VCR locates and reads the tape identification and then retrieves the corresponding directory from the RAM 33. This operation is preferably independent of the point of tape insertion to thereby effectively create a random access capability for selections on the tape. On the other hand, for PR tapes which are produced by the video publisher, the directory is stored on the tape preferably by writing it repeatedly on a VBI line. When the PR tape is inserted into an indexing VCR, the indexing VCR 10 independently of the point of tape insertion can quickly locate and read a copy of the directory from the VBI line. Thus, the PR tape can be read by random access also.

In one embodiment, RI tapes are created by only writing VISS marks on the control track and manually entering the program title information into the memory. Because this embodiment does not add TID information to the tape itself, the user must identify the tape to the indexing VCR. Once the tape is identified, the VCR operates as if the RI tape is an HR tape. Consequently, the tape becomes random access at this time and not when the tape is first inserted. In another embodiment, the TID is written on the control track of RI tapes.

The VCR 1 includes a VBI encoder 60b coupled to the video logic circuit 7 which receives digital data, such as tape label (e.g. a volume number), directory, and/or addresses, from the microprocessor controller 31 and encodes such data for recording into the VBI portion of the video signals which are to be recorded on the cassette tape 40. When line 21 field 2 is encountered, the digital data stored in the registers are output so that they can be written on the video track as described above.

VBI encoder 60b can be implemented in a similar manner as one of those already existing in the art, e.g. encoders for encoding closed-caption data into the VBI portions of video signals. An exemplary implementation of the VBI encoder 60b is also illustrated in the parent patent application Ser. No. 08/066,666.

It needs to be noted that although the decoder 60a in the embodiment is used both for decoding broadcast signals and recorded signals, it will be understood that a separate decoder can be provided for each operation. Moreover, although the decoder 60a and the encoder 60b are shown and described as two units, they can be incorporated into a single semiconductor chip or implemented by discrete logic components.

Prerecorded Tape

As described above, prerecorded tapes (PR tape) are manufactured by a tape publisher and contain a plurality of different titled programs thereon. A program directory or directories containing information about the names and locations of each program or record on the tape is stored on the tape. In one of the specific embodiments, the label (e.g. a volume number or a name) for the tape is also recorded.

Either the video frames 42b or the control track 42c (see FIGS. 4–5) may be used for storing the program directory(s). In one embodiment, the program directory is stored, by the VCR control logic circuit 21 under control of the microprocessor controller 31, in the control track 42c and in another embodiment in odd and/or even numbered fields of spaced apart pairs of video fields, either as full video frame or in the VBI.

Using The Control Track

It is well understood that modern video recorders typically have a capstan for pulling the cassette tape past a rotating video head drum. The control track 42c on the tape is normally provided for recording a synchronization pulse for synchronizing the rotation of the capstan with the rotation of the video head drum. The synchronization pulse is conventionally a 30 Hz pulse, with only the leading edge being used for the synchronization. According to the present invention, directory information can be stored on the control track by modifying the control track pulse duty cycle so that the location of the flux reversal on a prerecorded video tape is modified so that these relative locations represent digital data.

An exemplary circuit for modifying the duty cycle of the control track pulse is shown in the parent patent application Ser. No. 08/066,666.

Remote Controller

The VCR 1 also comprises a remote commander unit 75 which communicates through wireless means with a remote signal receiver 29 in the VCR. As is known in the art, the remote commander comprises a plurality of push buttons, switches, and a jog shuttle knob which create output signals. The signals are transmitted by wireless means known in the art, such as infrared transmission or radio-frequency signals, to the remote signal receiver 29. The receiver 29 decodes the received signal and passes the decoded data to the VCR control logic circuit 21.

Figure 6:
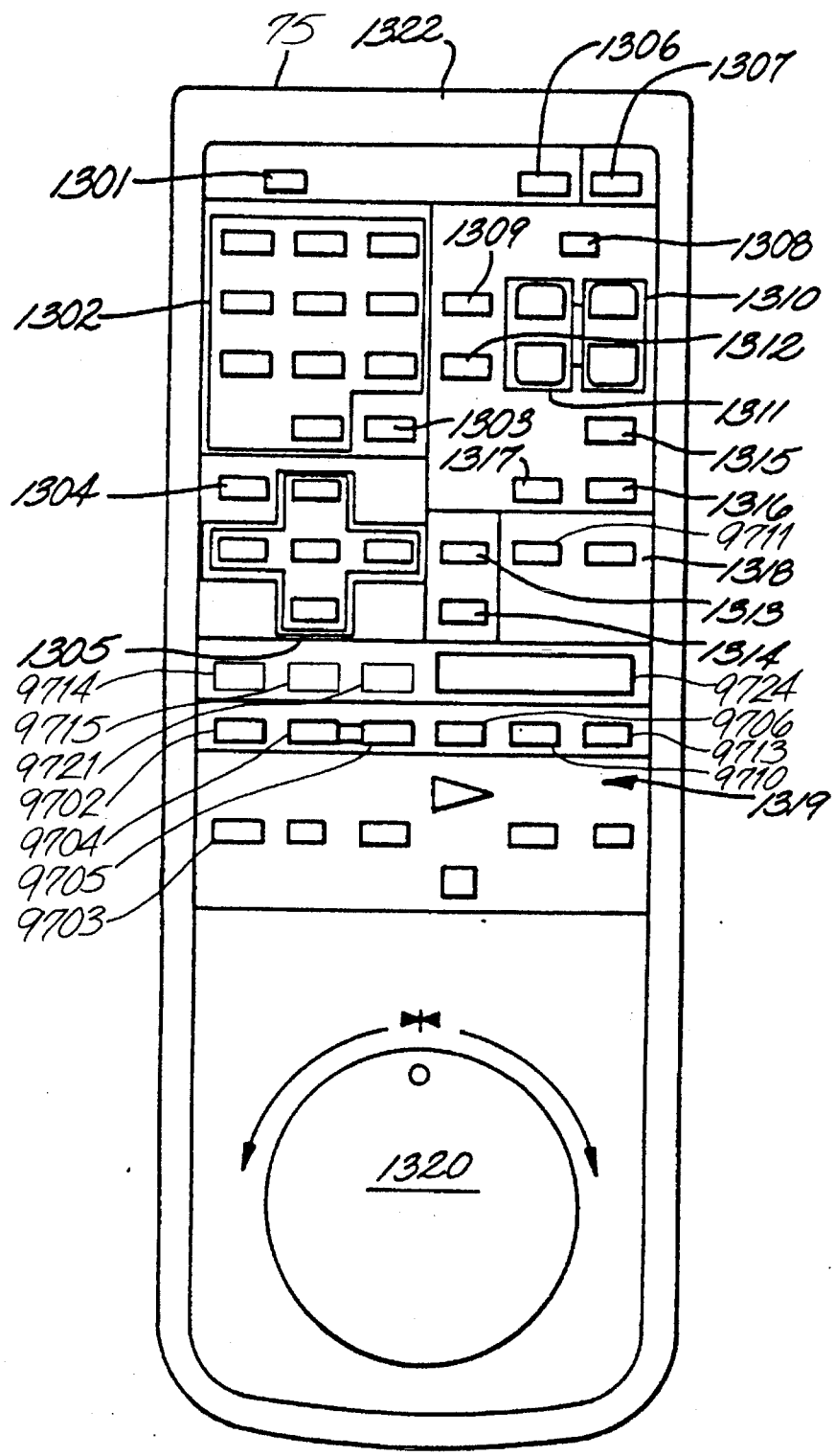
FIG. 6 illustrates an embodiment of a remote control unit for operating the indexing VCR of FIG. 1.

FIG. 6 illustrates an embodiment of a remote control unit 75. The unit 75 comprises a hand-held housing 1322 provided with a plurality of push buttons 1301–1319. A remote jog shuttle knob 1320 is provided for hand-held operation of the jog shuttle feature of the VCR. A command mode selector switch 1301 enables activating the control unit. A plurality of number keypad buttons 1302 enable remote entry of numbers for commands and selections, such as channel numbers. An ENTER button 1303 is used to enter channel numbers and menu options in the methods discussed below. A menu button 1304 is used to display a menu of user options, as discussed below. A plurality of cursor movement buttons 1305, each marked with an arrow, is used to move an on-screen cursor in various menu operations. An antenna TV/VTR button 1306 is used to command the video display 50 to display a signal coming either from an antenna or the output of the VCR 1. A power switch 1307 enables turning power to the VCR 1 on and off. A TV/VTR switch 1308 enables selectively using the remote control unit to control the VCR 1 or the video display 50. An input select button 1309 enables selection of the source to be recorded. Channel change buttons 1310 enable toggling the channel selection up and down. Similarly, volume buttons 1311 enable toggling the volume louder or softer. A record mode button 1312 enables selection of recording tape speed. A timer clear button 1313 is used to clear timer settings of the VCR. A timer record button 1314 is used to enter a timer recording mode. An index button 1315 is used to enter an index mode. Other buttons 1316–1319 can be used to control various functions on the VCR, including the direction, speed, and mode of the tape transport. These buttons include rewind, play, stop, and fast forward and whose functions and implementation are well known in the art.

A print button 9702 allows the user to print on hard copy or to disk the directory or other information in the RAM 33. An eject button 9703 is used to eject the cassette 40 from the VCR. A page up button 9704 and a page down button 9705 are used to move up or down pages on the screen. A cancel button 9706 is used to cancel selections made. A library button 9710 is used to retrieve directories. A VCRPlus+™ button 9711 is used to enter "PLUSCODE™" numbers.

An edit button 9713 is used to edit selections on the screen. A review button 9714 is used to review stored selections. An erase button 9715 is used to erase selections. An info ("i") button 9721 is used to request or store auxiliary information as described below such as to store "PLUSCODE™" numbers or channel-date-time-length data associated with a separate broadcast that provides additional information related to the program or commercial being viewed. A program identification (PGM ID) button 9724 is used to display the program title and other information of the program being viewed either direct from cable or airwaves or from tape.

Alternatively, the VCR 1 or the display controller 30 may include these buttons.

Alternatively, the remote controller 75 may be included in a television remote controller or a universal remote controller which control a television or a plurality of electronic devices respectively.

Various methods of combining steps of key strokes may be used. For example, pressing the "i" button twice in rapid succession may be used to review information stored. Pressing the "i" button three times in rapid succession may be used to cancel a selection.

Directory

For HR and RI tapes, the directories are stored in the RAM 33 and referenced either by the TIDs which are written repeatedly on line 19 of the VBI for HR tapes or by a tape number inputted by the user, which the indexing VCR 10 uses to cross reference to a TID for RI tapes. For PR tapes, the directory is written repeatedly, preferably as often as space allows, on line 20 of both fields of the VBI. Alternatively, the directory is written repeatedly on a line pointed to by a pointer in line 21, field 2. As a default, if the indexing VCR 10 cannot find a pointer in line 21, it looks for the directory in line 20. The recording format is per the E.I.A. specifications on Extended Data Services. The directory is stored as D(N) data packets, defined below in conjunction with FIG. 10, which contains all the information that relates to a program entry in the directory. Alternatively, the D(N) packet may be written in two or more lines to speed up the read process. Also, the D(N) packet may be written at a faster rate, such as two to four times faster, than the E.I.A. specification. The D(N) data packet contains a program entry where N ranges from 1 to the maximum program numbers in the directory. For PR tapes, the TID and the program number are repeatedly written on both fields of line 19 of the VBI.

For RI tapes, the RAM 33 is capable of storing the program number and up to 32 characters per title.

When a PR tape is inserted into an indexing VCR 10, the indexing VCR 10 reads the VBI line 19 to quickly determine the TID and program number and then stops. When the user presses the Index button, the indexing VCR 10 determines from the TID that the tape is not a HR tape. The indexing VCR 10 then goes into PLAY mode and reads the directory from VBI line 20 and displays it on-screen.

Addressing System

Figure 7:
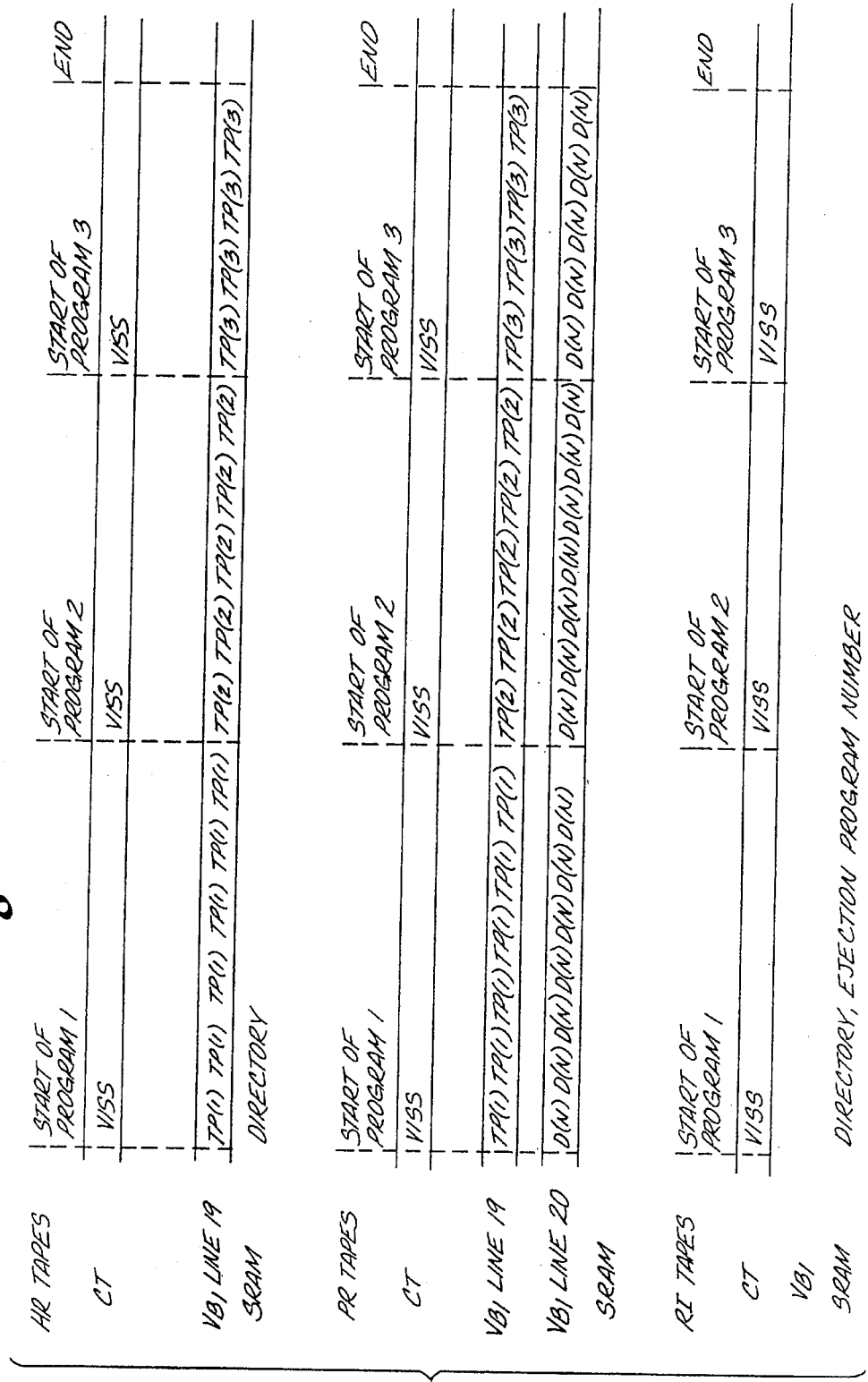
FIG. 7 is a schematic view of an embodiment for storing tape identification numbers and program numbers using a VISS PLUS TP data packet address system.

FIG. 7 is a schematic view of an embodiment for storing tape identification numbers and program numbers using a VISS PLUS TP data packet address system. In this embodiment, the system writes a TP data packet, which comprises a TID and a program number in line 19 of the VBI. As will be described below, the TP data packet may be written on other lines of the VBI where a pointer on VBI line 21 points to these other lines. However, the default mode uses line 19. The program number represents the order in which the program was recorded. For example, program 3 is the third program written on the tape. If program 3 is the last program written on the tape, the next program that is written has a program number of 4, even if the program is physically written on the tape before program 3. The format of the TP packet is described below in conjunction with FIGS. 12–14. The recording format for the TP data packet conforms with the E.I.A. specifications on Extended Data Services. As will be described below in conjunction with FIGS. 13–14, the TID is constant for a tape. The program number is constant within a program, but changes from program to program.

As a subset of the VISS PLUS TP system, the indexing VCR 10 uses a VISS system to write a VISS mark on the control track 42c at the beginning of each program on the tape. RI tapes use only the VISS system. The VISS marks serve as "file marks" for searching for the starting points of programs.

For HR and PR tapes, the VISS PLUS TP system is used. In this system, the TID and program number are written in TP data packets at a high repetition rate, e.g., about once every ¹⁄₁₂ seconds, on line 19 of both fields of the VBI. The VISS marks on the control track serve as file marks for searching for the starting points of the programs. The TP data packets serve as road marks so that upon insertion of the cassette into the indexing VCR 10, the current tape location can be quickly determined. In addition, the address system provides a method for determining the length of programs as they are recorded or modified, as will be described below.

As an overview, when an HR or PR tape is inserted into the indexing VCR 10, the indexing VCR 10 scans the VBI for a predetermined time, e.g., two seconds, and quickly determines from surrounding TP data packets the TID of the tape and the current program number. When the user presses the Index button, the indexing VCR 10 retrieves the directory from the RAM 33 and displays it. When the user requests the indexing VCR 10 to move to the starting point of another program, the indexing VCR 10 executes a search by either fast forwarding or rewinding the tape while counting the number of VISS marks in the control track to the destination location.

For an RI tape, because the TP data packet is not written on the VBI or elsewhere on the tape, a different method is employed. Instead, when a RI tape is ejected from the indexing VCR 10, the current program number at the time of ejection (also referred to as an ejection program number) is stored in the RAM 33. The next time that the RI tape is inserted into the indexing VCR 10, the indexing VCR 10 attempts to find a TP packet in the VBI. Because no TP packet is found, the indexing VCR 10 prompts the user to enter the assigned tape number, when the user presses the Index button. Using this number, the indexing VCR 10 determines the corresponding TID, recovers from the RAM 33 the ejection program number and uses it as the current program number, and displays the directory. At this time, the indexing VCR 10 may search using the search process described above for HR and PR tapes.

In summary, Table II shows the directory and address systems for the 3 types of tapes.

TABLE II

| Tape Type | Directory | Address System |
|---|---|---|
| HR | RAM 33 in indexing VCR 10 | VISS + TP |
| PR | VBI on tape | VISS + TP |
| RI | RAM 33 in indexing VCR 10 | VISS |

In an alternate embodiment to the VISS+TP system, the indexing VCR 10 also uses an absolute address system (also called VISS+TP+AA). Several absolute address systems are described in detail in conjunction in the parent patent application Ser. No. 08/066,666. The absolute address system provides faster searches. The address serves as "road marks" so that the current tape location can be quickly determined. In some indexing VCRs, the VISS marks cannot be monitored during high speed fast forward or rewind, but only at moderate search speed (semi-load condition). In contrast, the reel ratio can be measured at very high speed fast forward or rewind (unloaded condition). Using the absolute address calculated from the reel ratio, the indexing VCR 10 can search the tape. The absolute address system also provides a more accurate determination of locations on the tape, and consequently a more accurate calculation for the length of programs and blank spaces on the tape. For example, referring now to FIG. 8, a program five is recorded on a previously recorded HR tape starting in the middle of a previously recorded program two and ending after the beginning of a previously recorded program three. As seen in FIG. 8, when program five is recorded, the indexing VCR 10 writes a VISS mark at the beginning of program five and writes a TP packet (shown as TP(5) corresponding to program five in line 19 of the VBI. Upon reaching the start of program three, the indexing VCR 10 erases the VISS mark corresponding to the start of program three and writes a new mark at the end of program five which becomes the start of the remaining portion of program three. The absolute address is a measure of the distance from the beginning of the tape. For example, an address with a value of 1120 may represent a distance from the beginning of the tape after the take-up spool spindle has made 140 revolutions (with 8 counts per revolution). This information may be written once every few seconds. Alternatively, the absolute address may represent the time from the beginning of the tape. Because the play time depends on the recording speed of the tape, the time from the beginning of the tape should also account for the different tape speeds. With an absolute address system, the indexing VCR 10 can automatically calculate the length of programs two and three and correspondingly update the directory. Without an absolute address system, the indexing VCR 10 can flag the length of programs two and three as being unknown and when the tape is played, measure the length of the programs for a later updating of the directory. Alternatively, in an indexing VCR 10 without an absolute address system, the indexing VCR 10 may force new programs to be written at the starting point of an old program to avoid programs of unknown length.

Interconnected VCRs

Multiple indexing VCRs in the same household create a special problem. The user wants to use an indexed tape interchangeably between all of his indexing VCRs. However, since the directory of HR and RI tapes resides in the VCR and does not travel with the tape, the consequence may seem to be that tapes can only be used in the VCR in which they are created. To solve this problem, the different indexing VCRs in the same household are able to communicate.

Figure 9:
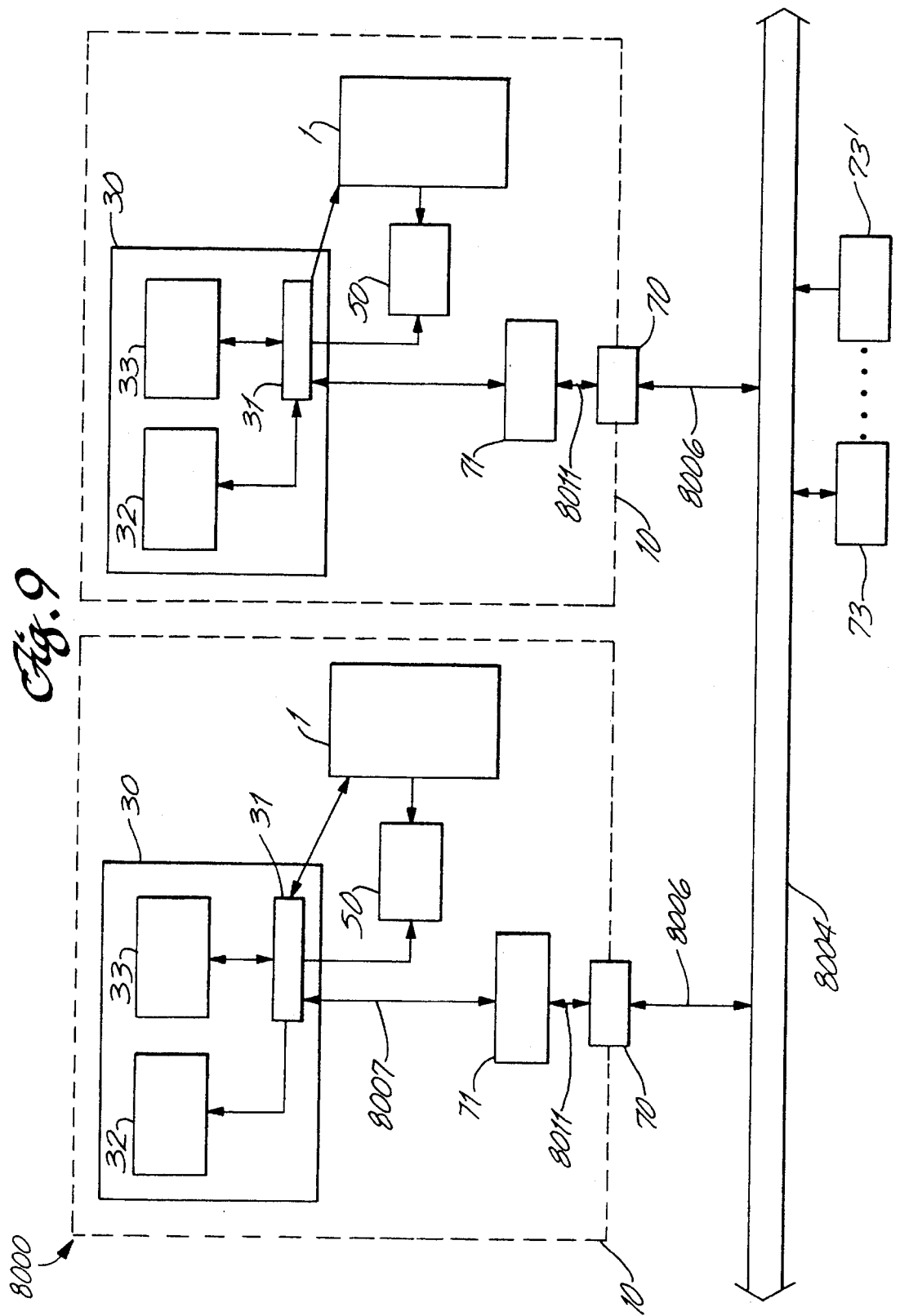
FIG. 9 is a functional block diagram showing a multiple VCR system for transferring directory data between the VCRs over a communication bus.

Referring now to FIGS. 1 and 9, a multiple VCR system 8000 comprises a plurality of indexing VCR systems 10 connected by a bus cable 8006 to a bi-directional bus 8004. The microprocessor controller 31 transmits and receives data and commands over a line 8007 to a bus interface circuit 71 which processes data to communicate between the microprocessor controller 31 and the bus 8004.

Bus Embodiment

Bus Description

In one embodiment of the bus system, the bus 8004 is a bi-directional bus. An external device 73, such as an external RAM, is coupled to the bus 8004. A description of the external device 73 is described below. The bus interface circuit 71 comprises a transmitter (not shown) for driving signals on the bus and a receiver (not shown) for receiving signals from the bus. Within the bus interface circuit 71, a transmitter (not shown) is a TTL open collector driver preferably capable of sinking 16 milliamps. A driver (not shown) is preferably pulled up to +5 V by an internal 1.0 kiliohm resistor. The receiver provides a maximum load to the bus of one standard TTL load. The bus 8004 is preferably active low. When there are no bus activities, the bus 8004 stays at the high state. The driver drives the bus by pulling the bus 8004 low. Preferably, the indexing VCR 10 is the master of the bus 8004 and initiates all transactions on the bus.

The data on the bus 8004 is preferably transmitted serially. The data is defined by data cells where each data cell is defined to be the time slot between two successive high to low transitions. The bit length is preferably from 0.2 milliseconds to 2 milliseconds. The data is preferably encoded by 7 bits with an odd parity LSB bit providing a total length of 8 bits first Manchester coding method. The separation between bytes preferably is 1 to 10 milliseconds. The communication is reset, if no data is transmitted for longer than 10 milliseconds, to avoid bus lock ups. The bus interface circuit 71 communicates over a line 8011 through a connector 8008 to the line 8006. The connector 8008 is preferably an RCA phono female connector.

Bus control protocol and command packet format

The indexing VCR 10 sends over the bus 8004 a bus command packet to the external device 73 to request data. The command packet has a format:

| Command | [ data ] |
|---|---|
| 1 byte | N byte |

The command symbol is one byte long and ranges in value from 00 hex to 7F hex. A data symbol follows the command symbol and ranges in length from 0 to N bytes of data. N can be sufficiently large so that the data byte includes the entire directory of a tape. In response to the command packet, the external device 73 sends back either a return code or data based on the command issued by the indexing VCR 10. Table III lists the commands for the bus.

TABLE III

| Command | Data | Description |
|---|---|---|
| 01hex | — | Check if external device is ready. |
| 02hex | PRI | Print PRI data. |
| 03hex | | Send directory to RAM 33. |
| 04hex | — | Request for the first TID stored in RAM 33. |
| 05hex | — | Request for the next TID stored in Ram 33. |
| 06hex | — | Request for the previous TID stored in RAM 33. |
| 07hex | TID and number X | Request external device 73 to send the Xth entry of the specified tape. |
| 08hex | TID | Request external device 73 to send copy version number of the tape specified. |
| 09hex | TID | Request external device 73 to send program number for next recording for the specified tape. |
| Others | | Reserved for later expansion. |

The indexing VCR 10 issues a 01hex command on the bus 004 to check if the external device 73 is ready. This command is preferably issued before other commands to check the device. After issuing the command, the indexing VCR 10 waits for the return code. If 00hex is returned on the bus, the external device 73 is ready. If 7F hex is returned, the external device 73 is busy. If no response is received on the bus, the commanded external device 73 may be non-existent. The indexing VCR 10 retransmits the command to again check status. The indexing VCR 10 stops further commands to the external device 73, if the device is not ready.

The indexing VCR 10 issues a 02hex command on the bus to command the external device 73 to print PRI data. After issuing the command packet, the indexing VCR 10 issues the PRI packet to the external device 73. If the external device 73 accepts the packet, it returns a 00hex code. Otherwise, it returns a 7F hex code.

The indexing VCR 10 issues a 03hex command to save the directory of one tape to the external RAM 33. Before transmitting the directory, the indexing VCR 10 reformats the information into the D(N) and TP packet format described below in connection with FIGS. 25 and 27, respectively. The first packet includes the TID and the copy version number (described below) in the same format as the TP packet. The next packet is the D(0) packet which describes the tape parameters, including tape length and reel diameter. The remaining directory entries are transmitted in the D(N) packet format in the order of their location from the beginning of the tape. A TP packet is sent after the last D(N) packet to indicate the end of transmission. This TP packet includes the TID and the program number for the next recording. The external device 73 returns a 00hex code, if it receives all packets. Otherwise, it returns a 7F hex code. In response thereto, the indexing VCR 10 may resend the data.

The indexing VCR 10 issues a 04hex command to request the first TID stored in the external RAM 73. In response thereto, the external device 73 returns the first TID stored therein. In combination with the 05hex and 06hex commands (to be described below), the indexing VCR 10 can use the 04hex command to read out all the TIDs in the external RAM 73. The external device 73 returns a 7F hex code, if there is no TID inside the device 73.

The indexing VCR 10 issues a 05hex command to request the next TID stored in the external RAM 73. In response thereto, the external RAM 73 returns the next TID in the RAM 73. After the last TID is returned, the external RAM 73 returns a 7F hex code.

The indexing VCR 10 issues a 06hex command to request the previous TID stored in the external RAM 73. In response thereto, the external RAM 73 returns the previous TID in the RAM 73. This allows the indexing VCR 10 to read the TID in reverse order. After the first TID is returned, the external RAM 73 returns a 7F hex code.

The indexing VCR 10 issues a 07hex command and a TP like packet, which includes the TID and a number x, to request the xth directory entry of the specified tape. In response thereto, the external device 73 returns the xth directory entry of the tape in a D(N) packet format. If, however, the TID is not in the external RAM 73, it returns a 7F hex code.

The indexing VCR 10 issues a 08hex command and the TID in TP packet format with PN set to 0 to request the copy version number. In response thereto, the external device 73 returns a TP line packet which includes the TID and the copy version number. If, however, the TID is not inside the external RAM 73, it returns a 7F hex code.

The indexing VCR 10 issues a 09hex command and the TID in TP packet with PN set to 0 to request the program number for the next recording. In response thereto, the external device 73 returns a TP like packet which includes the TID and the program number for the next recording. If, however, the TID is not in the external RAM 73, it returns a 7F hex code.

The copy version number is a 12 bit number used to check the updated status of the directory in the external RAM 73. The indexing VCR 10 stores a copy version number for each tape in the RAM 33. When a new tape is created, this number is set to zero. Every time the directory content is changed, the indexing VCR 10 increments the number by one. When a copy of a directory having the same TID is found in both the external RAM 73 and the internal RAM 33, the indexing VCR 10 uses the more updated version which is identified by comparing the copy version number and using the higher number. In this embodiment, the copy version number ranges from 0 to 4095.

In alternate embodiments, the bus interface 71 may be packaged external to the VCRs. In these embodiments, the microprocessor controller 31 communicates over the line 8007 directly to the connector 8011. The bus interface 71 is connected external to the indexing VCR 10 to the connector 8011 and to the bus 8004.

In yet other embodiments, the method of communication may be either radio transmission at UHF or modulation on an AC power line.

One method for transmitting signals on AC power lines is disclosed in U.S. Pat. No. 4,418,333 to Schwarzbach, et al., issued Nov. 29, 1983, the subject matter of which is incorporated herein by reference.

INTERFACE PORT

Referring again to FIG. 1, the VCR system 10 has an interface connector 72 which is coupled to the microprocessor controller 31 and allows communication between the microprocessor controller 31 and an external device 73. The connector 72 is preferably an RCA phono female connector. The external device 73 may be a memory, a printer, a computer, a telephone line or a specialized machine for communicating with the microprocessor controller 31.

The interface connector 72 preferably comprises a phone line terminal for connecting to a conventional telephone line (not shown). The interface connector 72 also preferably comprises a dual tone multi-frequency (DTMF) generator, an optional modem, and an optional DTMF decoder, each of which are coupled to the phone line terminal and are not shown in the drawings. The microprocessor controller 31 provides a control signal to the DTMF generator for sending standard DTMF telephone tones which are well known to those skilled in the art. The microprocessor controller 31 also has a bidirectional interface to the modem for sending and receiving conventional telephone signals. The DTMF decoder converts received DTMF tones from the phone line and sends them to the microprocessor controller 31.

In a specific implementation, the microprocessor controller 31 communicates with a printer to print coupons captured using the Auxiliary Information feature described below.

In another specific implementation, the microprocessor controller 31 may print the tape identification number labels for marking the cassette housing. For example, instead of the step 9263 described below in FIG. 15 in which the microprocessor controller 31 displays the TID assigned to the tape that is about to be ejected, the microprocessor controller 31 commands the printer to print a label with the assigned TID and prompts the user on the display to affix the label to the cassette housing.

In yet another specific implementation, the microprocessor controller 31 prints upon user command the directory of any specified tapes stored in the RAM 33.

In an alternate embodiment, in place of the interface connector, an IR detector/emitter in the VCR functions as a data port which can be used to both receive remote control commands and to transmit the directory or other information from the RAM 33 to a printer or a second machine. For example, some VCRs can control cable boxes by transmitting commands to the cable box. These VCRs may also transmit directory data or other information to an external device 73 that can receive IR commands. Alternatively, the IR detector may also be used to receive directory information downloaded from the second machine.

In an alternate embodiment to FIG. 1, as shown in FIG. 9, the interface connector 72 may be the same connector as the bus interface connector 71. In this embodiment, a plurality of external devices 73, 73' may be connected to the bus 8004. The directory may be downloaded from the RAM 33 through a bus transfer to any or all of the plurality of external devices.

In a specific implementation, the directory is downloaded either over the bus 8004 or through the interface connector 72 for backup storage. For example, backup storage may be either a tape in a second VCR or a floppy disk in a disk drive.

In another specific implementation, the external device 73 is a nonvolatile memory such as a battery supported RAM. The external RAM 73 contains sufficient memory, e.g. one megabit, for storing the entire program directory of a plurality of indexing VCRs. The external RAM 73 provides a backup to the RAM 33 in each of the user's indexing VCRs 10 to avoid loss of data during power interruptions. Further, the external RAM 73 combines the libraries of all indexing VCRs connected to the bus 8004. Consequently, each indexing VCR 10 provides indexing capability for each of the user's index tapes. The user may transfer directories between the indexing VCRs. The external RAM 73 also includes communication electronics for communicating with each device on the bus. In yet another embodiment, the external device 73 might also include a processor and a character generator. The indexing VCR 10 provides the electronic guide data over the I/O port. The external device 73 captures the data, formats it and stores it within the external RAM. At the appropriate times, the data is outputted via the character generator over the bus 8004 to the indexing VCR 10 for display on the television.

Alternatively, the bus may be an infrared link where the external device 73 has IR emitters and detectors for transmitting and receiving infrared codes to the indexing VCR 10 and television using the infrared detectors and emitters described above.

Similar to the bus interface, communication from the interface port may be either direct cable, radio transmission at UHF, infrared transmission, or modulation on an AC power line, or other memory or communication devices.

Data Format

For the data packets described below in conjunction with FIGS. 10–14, a byte refers to a seven bit data symbol plus an eighth bit which is reserved for a parity bit.

FIG. 10 is a schematic view showing the format for the directory packet recorded in the VBI for prerecorded tapes. The directory preferably provides up to 32 characters per table. A D(N) packet 2601 has the following symbols: start code, type, N, start address, stop address, record speed, program category, version, language, title text, expand byte, stop code and checksum. Table IV shows the length in bytes and the value for each symbol. The N symbol represents the program number in the directory when N is greater than 0. Each byte is a coded text number from 30 hex to 3F hex which equates to 0 hex to F hex (when N equals 0, the packet described below in conjunction with FIG. 11 is used to represent the title of the tape). The start address symbol represents the number of minutes measured in the SLP mode from the beginning of the tape to the beginning of the program. The stop address symbol represents the number of minutes measured in the SLP mode from the beginning of the tape to the end of the program. Each byte of the start address and stop address symbols is a coded hexadecimal number from 30 hex to 3F hex which form a number having the largest possible value of FFF hex. A record speed symbol defines the recording speed of the program. The recording speed symbol represents the optimal tape speed at which the indexing VCR 10 should record the program. For example, a super long play speed may be transmitted for programs, such as sports or nature programs, where the user may want to use the freeze frame feature. As another example, a standard play speed may be transmitted for recording long programs so as to conserve tape. If the recording speed is defined to be blank, the length is defined based on SLP for better resolution. An "undefined" recording speed is used when the recording speed changes during a program. Undefined values are reserved for further expansion. A program category (PC) symbol is defined per the E.I.A. definition. The version symbol identifies the version of the program titled format. For versions other than 20 hex, the indexing VCR 10 ignores the following bytes up to a terminator code (which is preferably 1E hex) and displays the titled text as a blank line. A language symbol represents different languages. The title text symbol has a length of M bytes where M is a variable even number, preferably not greater than 40, including the 1E hex terminator code. The title text symbol represents the program title in ASCII and is terminated by the character 1E hex. If the character number is odd, one more null character is added before the terminator code. In addition, an attribute character can be added to the title text to enhance the indexing display. The attribute character starts with a value of 1 D hex which is followed by a character in the range 20 hex to 7F hex. Attribute codes are defined below in conjunction with FIG. 31. The expand byte symbol has a length of N bytes where N is a variable even number from 0 to 6. The expand bytes are used for expansion code for the indexing VCR 10. The checksum symbol is defined as the modulo 128 sum of the packet from the start code to the stop code. As will be described below, the D(N) data packet 2601 is encrypted and must be decrypted by an algorithm in the microprocessor controller 31 (FIG. 1).

TABLE IV

| Symbol | Length (Bytes) | Value |
| --- | --- | --- |
| Start Code | 1 | 07 hex |
| Type | 1 | 7E hex |
| N | 3 | Each byte coded hex number. 30 - 3F hex |
| Start address | 3 | Each byte coded hex number. 30 3F hex |
| Stop address | 3 | Each byte coded hex number 30 - 3F hex |
| Record Speed | 1 | 20 hex: Long Play (LP) 21 hex: Standard Play (SP) 22 hex: Super Long Play (SLP) 23 hex: blank 24 hex: undefined Others: Reserved |
| Program category (PC) | 1 | Per E.I.A. definition. |
| PC Extension | 1 | 20 hex: non-broadcast indexed material. 21 hex: video magazine. 22 hex: sales catalog. 23 hex: classified ads. 24 hex: 7F hex: reserved. |
| Version | 1 | 20 hex: first version |
| Language | 1 | 20 hex to 7F hex, 20 hex: English |
| Title text | m | Terminator code: 1E hex |
| Expand Byte | n | Even number 0 to 6; each byte 20 hex - 7F hex. |
| Stop Code | 1 | 0F hex. |
| Checksum | 2 | 00 hex - 7F hex |

FIG. 11 is a schematic view showing the format for the directory packet D(0) for the tape title recorded in the VBI for prerecorded tapes. A D(0) data packet 2602 has the following symbols in order: start code, type, N, length, reserve, reel diameter, reserved, version, language, title text, expand byte, stop code and checksum.

Table V shows the length in bytes and the value of each symbol. The D(0) data packet 2602 is similar to the D(N) data packet 2601 described above in FIG. 10 where the parameters, start address, stop address, PC, and record speed are redefined to denote the length of tape and the reel diameter. The D(0) data packet 2602 is predefined as the tape parameter packet for both HR and PR tapes. The length symbol indicates the length of the tape in minutes at the SLP speed. Each byte is a coded hexadecimal number which provides a value in the range of 000 hex to FFF hex. The reel diameter symbol indicates the physical diameter of the tape reel in millimeters. The version symbol indicates the version of the tape title format. For versions other than 20 hex (the first version), the indexing VCR 10 ignores the following bytes up to the terminator code contained within the title text symbol and displays the text title as a blank line. The language symbol represents the different languages around the world. Other values for the language symbol may be defined by the manufacturer of the indexing VCR 10. The length of the title text is in bytes where M is a variable even number including the terminator code. The title text symbol represents the tape title in ASCII and is terminated by the character 1E hex. If the character number is odd, one null character is added before the terminator code 1E hex. An attribute character can be added to the text at a later stage. The expand byte symbol has a length of N bytes where N is a variable odd number ranging from zero to five. The value of the check sum is the modulo 128 sum of the packet from the start code to the stop code.

TABLE V

| Symbol | Length (Bytes) | Value |
| --- | --- | --- |
| Start Code | 1 | 07 hex |
| Type | 1 | 7E hex |
| N | 3 | Byte 1, 2, 3: 30 hex, 30 hex, 30 hex |
| Length | 3 | Each byte coded hex number 03 hex to 3F hex |
| Reserve | 3 | 30 hex, 30 hex, 30 hex |
| Reel Diameter | 2 | Each byte coded hex number, 30 hex - 3F hex |
| Reserved | 1 | 30 hex. |
| Version | 1 | 20 hex: first version |
| Language | 1 | 20 hex to 7F hex, 20 hex: English |
| Title text | m | Terminator code: 1E hex |
| Expand Byte | n | Odd number 0 to 5; each byte 20 hex -7F hex. |
| Stop Code | 1 | 0F hex. |
| Checksum | 2 | 00 hex - 7F hex |

FIG. 12 is a schematic view showing the format for a TP packet recorded on the VBI for HR tapes and PR tapes. A TP packet 2603 contains both the TID 2604 and the program number. The TP packet has the following symbols: start code, type, TID, reserved, N, stop code and check sum.

Table VI shows the length in bytes and the value for each symbol. The TID symbol contains 10 bytes where each byte represents 4 bits, as will be described for the TID described in FIG. 13 for an HR tape and in FIG. 14 for a PR tape. The N symbol is defined to be the program number with each byte representing four bits for a total length of twelve bits. For communication between the indexing VCR 10 and the external device 73, the 12 bit item N may be used for other purposes. The checksum is the modulo 128 sum of the packet from the start code to the stop code.

TABLE VI

| TP Packet on VBI | | |
|---|---|---|
| Symbol | Length (Bytes) | Value |
| Start code | 1 | 07 hex |
| Type | 1 | 7D hex |
| TID | 10 | Each byte is coded hex number 30 hex - 3F hex |
| Reserved | 1 | 30 hex |
| N | 3 | Each byte is coded hex number 30 hex - 3F hex |
| Stop Code | 1 | 0F hex |
| Checksum | 2 | 00 - 7F hex |

FIG. 13 is a schematic diagram showing the TID for an HR tape. The TID 2604 is a 5 byte number. Bit 39 and bits 38-31 are 0. Bits 30-16 are the machine ID. Bits 15-0 are the tape number. The 16 bit machine I.D. is created as a random number which is seeded by some condition that will most likely be different between users. In a first implementation the 16 bits is broken into two eight bit numbers. At the first power up of the VCR, the counter is initialized with counting pulses of less than 0.25 milliseconds duration. The counter is stopped by the user's first and second key pressing on the remote controller. These two eight bit random numbers are then combined to form the machine identification. Because the counter is very fast and the key pressed by the user is very random, the machine identification should be sufficiently random so that two VCR's will have a 1 in 32,768 probability that two indexing VCRs have identical machine IDs. A 16 bit tape number allows each indexing VCR 10 to have 65,536 tapes stored in the RAM 33. Alternatively, the tape number may be composed of a different number of bits.

In an alternate embodiment, the machine identification portion of the 40 bits of the tape I.D. 2604 may be the Julien day, hour, and minute when the VCR is first put into use.

FIG. 14 is a schematic diagram showing the TID for a PR tape. As with the TID for an HR tape, the TID for a PR tape is a 5 byte number. Bit 39 is one, bits 38-0 are the eleven digit UPC number represented in binary form without the parity digit. By using the UPC number, businesses, such as libraries, tape rental stores, and retail outlets, can adopt the TID. Accordingly, usage of PR tapes can be monitored and analyzed. When the TID is stored into the RAM 33, 5 bytes is preferred. However, if only 4 bytes are recorded, bits 0-30 and bit 39 are stored in the RAM 33.

Operation of Identifying Tape and Recovering Directory

Figure 15B:
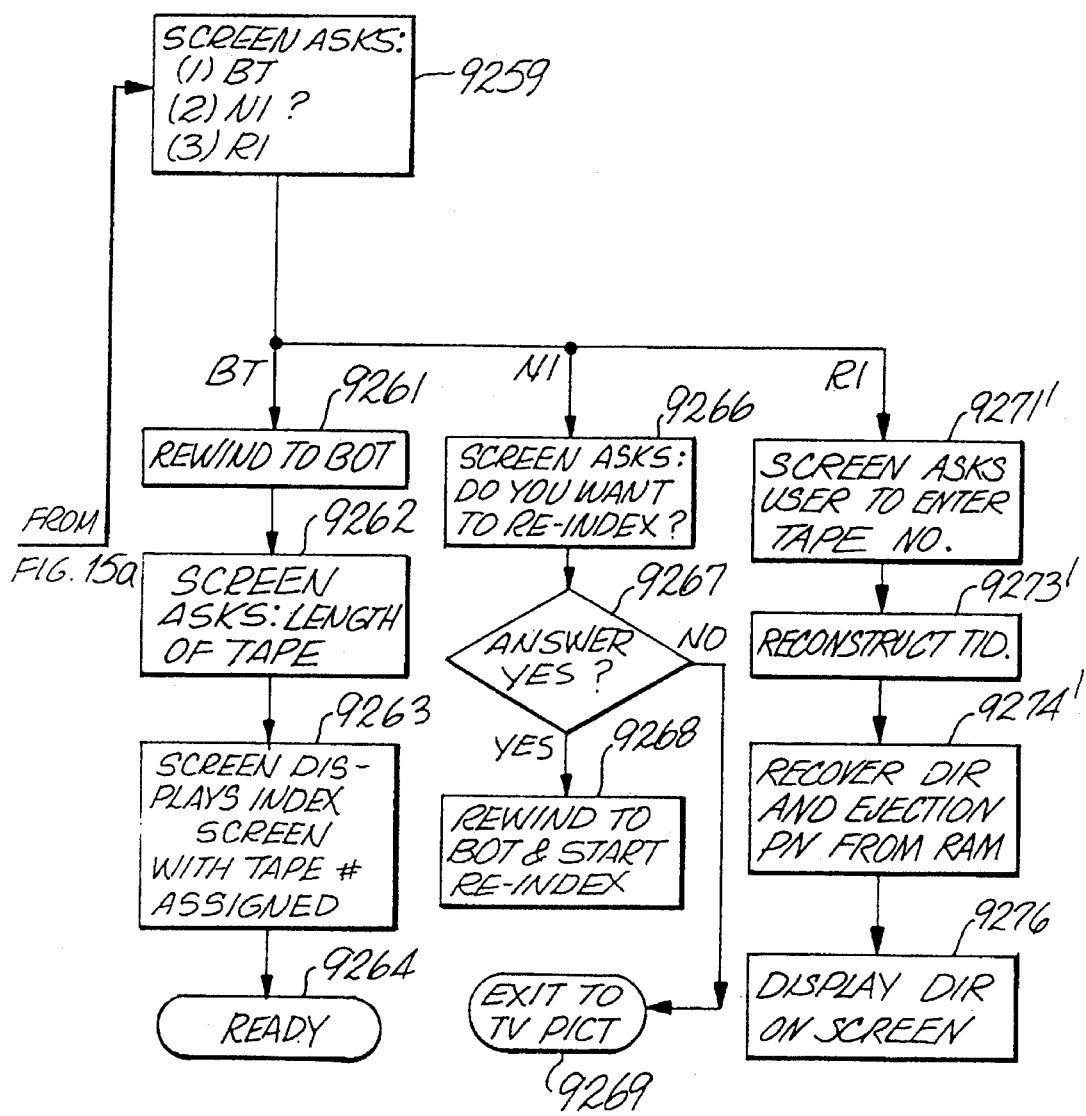

FIGS. 15a–15b are flow charts showing the steps employed in the operation of the indexing VCR, using the VISS PLUS TP addressing system, when a tape is inserted therein. Insertion of the cassette, as used herein, includes the manual insertion of the cassette into any mechanical tape carriage in the VCR as well as any movement by the VCR of the cassette on the carriage into an operational position adjacent heads 13, 15, 17, and 19. When a tape is inserted into the VCR (step 9240), the microprocessor controller 31 commands the VCR control logic circuit 21 to play the tape for N seconds and read the VBI for a TID and program number (step 9241': this step is referred to as step [A'] in subsequent steps of FIGS. 15a–15b). The time N is preferably between 2 to 5 seconds. In an indexing VCR using a VISS PLUS TP addressing system and an absolute addressing system, the VCR also determines the absolute address. After reading a TID and program number from the tape, the microprocessor controller 31 commands the VCR control logic circuit 21 to stop playing the tape (step 9242). After waiting for the INDEX button on the remote controller to be pressed (step 9243), if a TID and a program number were read at step 9241', the microprocessor controller 31 determines from the TID whether the tape is a home recorded tape (HR) or a prerecorded tape (PR)(step 9246').

If at step 9246' the tape is a HR tape (step 9247), the microprocessor controller 31 recovers the directory 33a corresponding to the tape with that TID from the RAM 33 (step 9248). The microprocessor controller 31 then displays the recovered directory on the video display 58a (step 9249) and then enters a ready mode (step 9251). The ready mode is a mode in which the microprocessor controller 31 knows the current address and the TID.

If at step 9246' it is determined that the tape is a prerecorded tape (step 9252), the microprocessor controller 31 reads the directory to determine if the TID is stored in the RAM 33 (step 9253). If it is in the RAM 33, the microprocessor controller 31 recovers the directory from RAM 33 as described above in step 9248. On the other hand, if the TID is not in the RAM 33, the microprocessor controller 31 commands the VCR control logic circuit 21 to play the tape so that the microprocessor controller 31 can read the directory from the VBI on the tape (step 9254) and then displays the read directory on the screen at step 9249.

On the other hand, if at step 9244' the indexing VCR 10 had not read a TID and program number at step 9241', and referring now to FIG. 15b, the microprocessor controller 31 displays on the screen a query as to whether the tape is a blank tape, (BT), a non-indexed tape (NI), or a retroactively indexed tape (RI) (step 9259). If at step 9259 the tape is a blank tape, the microprocessor controller 31 commands the VCR control logic circuit 21 to rewind the tape to the beginning of tape (BOT) (step 9261) and display on the screen 50a a question asking the user to enter the length of the tape (step 9262). Alternatively, the microprocessor controller 31 may automatically determine the length of the tape using one of the length determination methods described below. The microprocessor controller 31 generates a new tape identification number for the blank tape in a manner described above in FIG. 13 and displays an index screen with the assigned TID so that the user can mark the housing of the tape (step 9263). The microprocessor controller also creates a directory in the RAM 33 for the new tape. The microprocessor controller 31 then enters a ready mode (step 9264).

On the other hand, if at step 9259 the tape is a non-indexed tape, the microprocessor controller 31 displays on the screen 50a the question "Do you want to re-index?" (step 9266). If the user answers yes (Step 9267), the microprocessor controller 31 commands the VCR to rewind the tape to the beginning of the tape and start re-indexing the tape by asking the user to advance the tape to the beginning of each program and entering the title. (Step 9268) If, however, the user does not want to re-index the tape, (Step 9267) the microprocessor controller 31 removes the screen and commands the VCR control logic circuit 21 to display the TV picture read from the videotape. (Step 9269)

If, however, the tape is a retroactively indexed tape at step 9259, the microprocessor controller 31 displays on the screen 50a a prompt to the user to enter the tape number of the inserted tape (step 9271'). From this number, the microprocessor controller 31 reconstructs the TID of the tape (step 9273') and recovers from the RAM 33 the directory of the tape associated with the TID (Step 9274') and displays the recovered directory on the screen 50a (Step 9276).

When a RI tape is inserted into the VCR, the program number calculated from the ejection program number may be verified and recalibrated in an indexing VCR having an absolute addressing system. At step 9241', the indexing VCR calculates the absolute address. At step 9274' after recovering the directory, the microprocessor controller 31 determines the program number related to the measured absolute address. If the tape has been played in a non-indexing VCR or in an indexing VCR that is not coupled to the user's VCR, the ejection program number will differ from the calculated program number. The VCR then recalibrates itself by using the calculated program number instead of the ejection program number.

Figure 16:
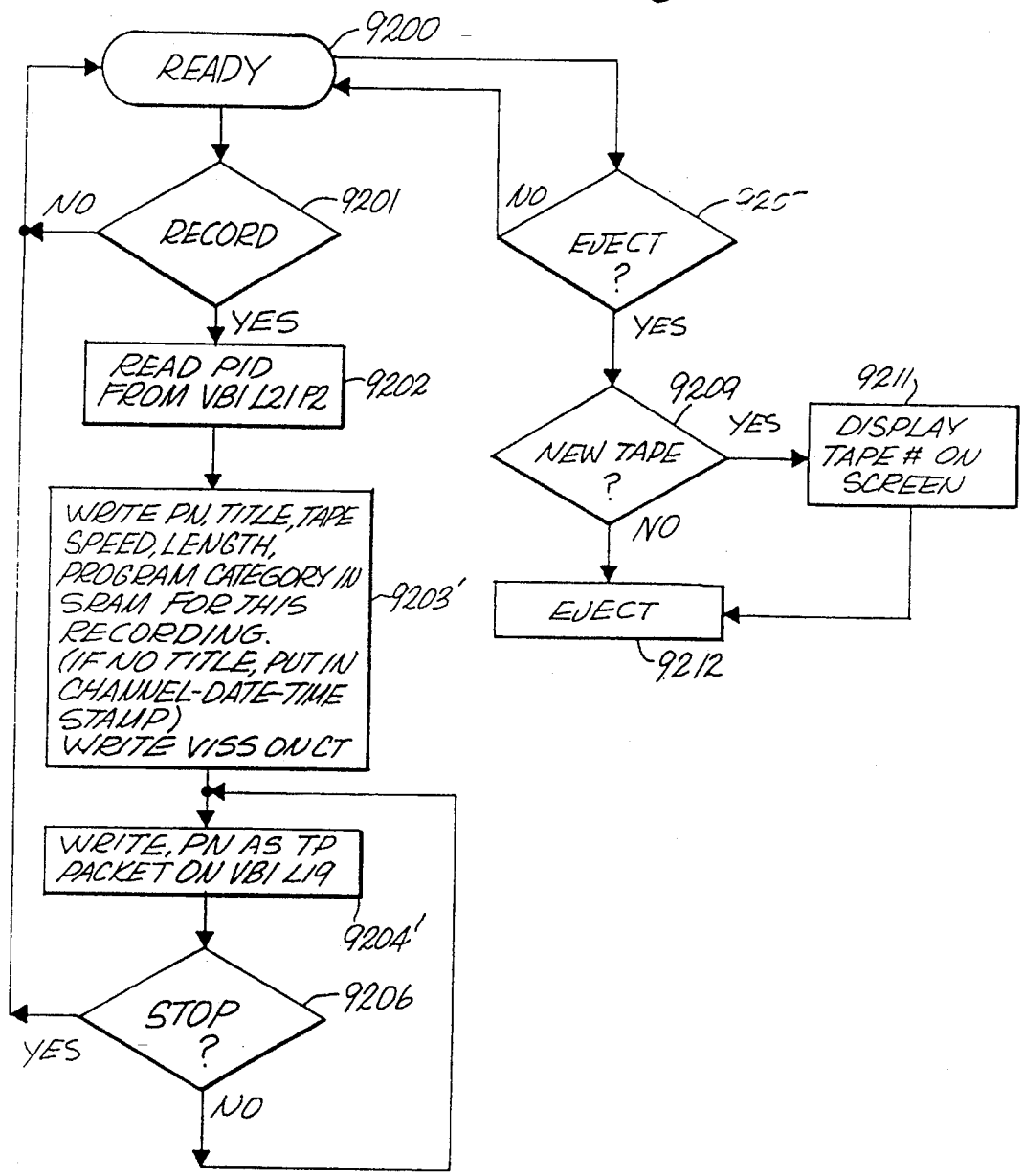
FIG. 16 is a flow chart showing the steps employed in the operation of an indexing VCR using a VISS PLUS TP addressing system of writing a tape identification and a program number to a home recorded tape (HR tape) during recording.

FIG. 16 is a flow chart showing the steps employed in the operation of an indexing VCR using a VISS PLUS TP addressing system of writing a tape identification and a program number to a home recorded tape (HR tape) during recording. When a tape is in the VCR and the directory controller 30 knows the present tape identification and the current program number, the indexing VCR 10 is ready for recording on the tape or ejecting the tape (step 9200). The microprocessor controller 31 reads the TID and the program number from the VBI. For a new blank tape, the microprocessor controller 31 assigns a TID to the tape and resets the program number to one. The microprocessor controller 31 waits for either a record signal or an eject command.

When a record signal is received (step 9201), the microprocessor controller 31 reads the program identification (Program I.D.) from line 21, field 2 of the VBI of the signal that is to be recorded (step 9202). It is assumed that the microprocessor controller 31 has already retrieved the directory for the inserted tape if the inserted tape is an existing HR tape. For a new blank tape, the microprocessor controller 31 creates a new directory in the RAM 33. For this recording, the microprocessor controller 31 initializes the program number (and address in VCRs having an absolute address system), the title, the tape speed, length, and the program category in the RAM 33. If no title is read from the VBI (step 9202), the microprocessor controller 31 uses a date-time stamp as the title. (Step 9203') As described below, the microprocessor controller 31 writes the title and the time of the rewind command into the monitoring data 33c portion of the RAM 33. The microprocessor 31 then commands the VCR control logic circuit 21 and subsequently the control and audio track head logic circuit 11 to continuously write the TID and the program number as a TP data packet on line 19 of the VBI (Step 9204'), until a command to stop recording is received. (Step 9206) As described below, the microprocessor controller 31 writes the time of the stop recording command into monitoring data 33c portion of the RAM 33. The microprocessor control 31 then returns to a ready state where it awaits a further command at step 9200.

On the other hand, when a command to eject the tape is received (Step 9207), if the tape is a new blank tape (Step 9209), the microprocessor controller 31 displays on the video display 50a the tape number of the tape, so that the user can then mark the housing of the cassette 40 with this new number for subsequent identification. The VCR control logic circuit 21 then commands the motor and mechanical control circuit 5 to eject the tape (Step 9212).

After the indexing VCR 10 has started a recording, it reads line 21 field 2 to find the title of the show and write it into the directory in the RAM 33. If the clock of the indexing VCR 10 has not been set correctly or if the program starts slightly later than scheduled, the retrieved title may be that of the previous program. In one embodiment, the indexing VCR 10 waits a predetermined time, such as 30 seconds, after the recording starts before reading and storing the title. On the other hand, for the recording of broadcasted video magazines, the indexing VCR 10 may read and store the title right after receiving the VM packet, because the VM packet and the new section title are synchronized.

Searching Tape for Selected Program

Figure 17:
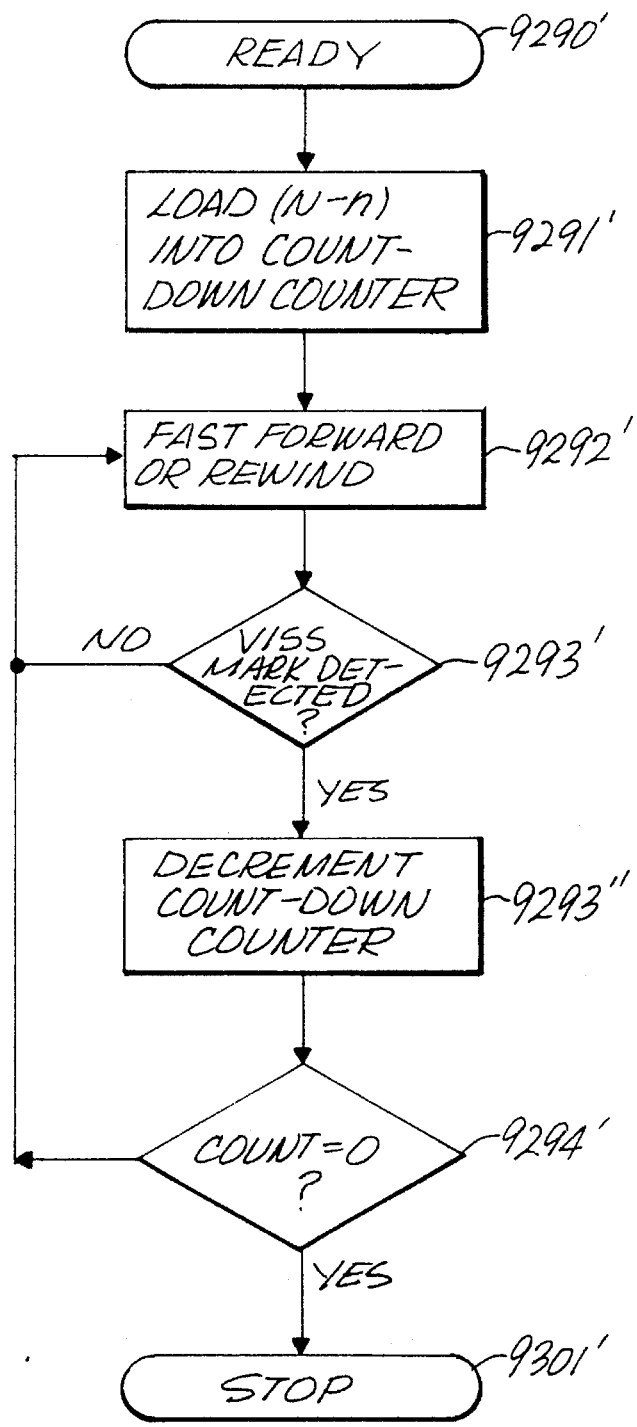
FIG. 17 is a flow chart showing the steps employed in the search for a program on an indexed tape using a VISS PLUS TP addressing system.

FIG. 17 is a flow chart showing the steps employed in the search for a program on an indexed tape using a VISS PLUS TP addressing system. The microprocessor controller 31 is in a ready mode by knowing the current program number (n in FIG. 17) of the tape and the destination program number (N in FIG. 17) of a user selected program entry from the directory. (Step 9290'). The microprocessor controller 31 loads into a count down counter the value of the number of VISS marks between the current position and the destination position (N-n) (Step 9291'). Based on the direction to the destination address, the microprocessor controller 31 commands the VCR to either fast forward or rewind the tape (step 9292'), and during the fast forward or rewind, monitors the read VISS marks on the control track 42c (Step 9393') and counts down from the N-n value loaded at step 9291' (Step 9293"). The fast forward or rewind continues until the count equals zero. (Step 9294'). The VCR then stops (Step 9301').

Figure 18:
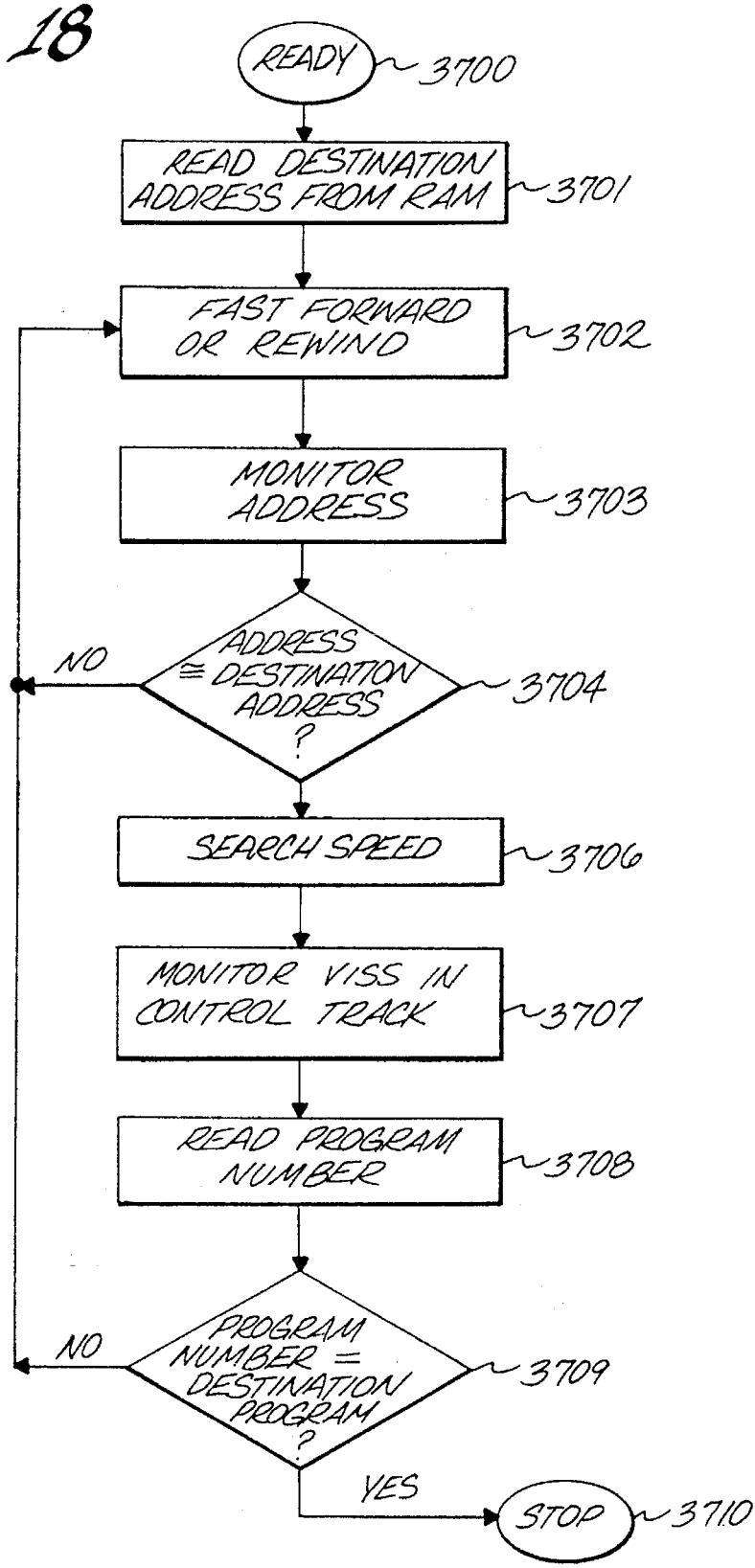
FIG. 18 is a flow chart showing the steps employed in the search for a program on an indexed tape using a VISS PLUS TP addressing system and an absolute addressing system.

FIG. 18 is a flow chart showing the steps employed in the search for a program on an indexed tape using a VISS PLUS TP addressing system and an absolute addressing system. As in FIG. 17, the microprocessor controller 31 is in a ready mode by knowing the current program number (n in FIG. 18) of the tape and the destination program number (N in FIG. 18) of a user selected program entry from the directory. (Step 3700). The microprocessor controller 31 first enters a fast search stage. The microprocessor controller reads the absolute address of the destination program from the RAM 33 (Step 3701). Based on the direction to the destination address, the microprocessor controller 31 commands the VCR to either fast forward or rewind the tape (step 3702), and during the fast forward or rewind, using the absolute addressing system, monitors the address of the tape (Step 3703). By using an absolute address system such as the reel ratio system, the fast search can be conducted at high speed. The fast forward or rewind continues until the present address equals to the destination address. (Step 3704) The microprocessor controller 31 now enters a soft landing stage in which the VCR is commanded to a search speed (Step 3706) and searches for the VISS marks on the control track 42c (Step 3707). Upon detection of the VISS mark (Step 3708), the VCR confirms the program number by reading the VBI (Step 3708) and when the program number equals the destination program (Step 3709), the VCR stops (Step 3710). Otherwise, the VCR reenters the first search at step 3702.

The addressing system used in FIG. 18 may use one of many location determination methods, such as those disclosed in the parent patent application Ser. No. 08/066,666, including counting the number of control track pulses between the current address and the destination address, counting the take-up spool spindle revolution counts and using reel ratios, or a biasing roller revolution counter.

Auxiliary Information Display

Auxiliary information is information related to the program being broadcast. A part of such information is broadcast in temporal proximity to said program. In some forms, the auxiliary information allows the user to obtain additional information on products and services offered in television programs or commercials.

Referring back to FIG. 1, as described above, by using the VBI decoder and the RAM 33, the indexing VCR 10 can capture data broadcast on the VBI and display it either concurrently with or at a later time than the data transmission. The broadcast data may be transmitted on a plurality of lines of the VBI including line 21. Per the E.I.A. specifications, Extended Data Services provide for pointers on line 21 (supplemental data location) to point to lines other than line 21. By using data on these other lines in the same format as data on line 21, the VBI decoder 60a can decode the other line data. The auxiliary information is preferably broadcast in a 35 characters ×15 rows format to match the display 50a (see FIG. 1) format. In the preferred embodiment, three types of auxiliary information data are transmitted: program identification (program ID or PID), channel specific program guide (CSPG), and program related information (PRI).

The viewer is alerted to the existence of the auxiliary information in several ways. In a first method, before the program is transmitted, the indexing VCR 10 displays on the screen a prompt to the user that the information is forthcoming. The prompt may be a flashing icon, such as the letter "i," or a new screen, such as a blue background with white text. The indexing VCR 10 requests the user to enter a command, for example by pressing the "i" button, to store in the RAM 33 the auxiliary information, or in some embodiments, to record in the record stack the "PLUS-CODE™" number corresponding to the program that is to be recorded. As will be described below, the user may later recall this information. To indicate that the command was received, the indexing VCR 10 may either stop flashing the icon display, display an acknowledgement, such as "stored" or "saved," or display a separate screen. The user may request the information before, during, or after the broadcast. Alternatively, the auxiliary information may be transmitted and stored in a temporary buffer in the RAM 33 before the viewer is prompted to enter a command. In this embodiment, the indexing VCR 10 transfers the auxiliary information from the temporary buffer to a permanent buffer in response to the user's commands.

Alternatively, in a second method, the indexing VCR 10 may provide the prompt after the program is viewed. In this embodiment, the auxiliary information may be transmitted before the program, during the program, or after the prompt. In a third method, the prompt is displayed concurrently with the program.

For each method, the user has a predetermined amount of time after the prompt to request the auxiliary information. When the auxiliary information is requested, the indexing VCR 10 displays it for either a predetermined time, until the user cancels it (for example, by pressing the program ID button a second time), until the next auxiliary information is requested, or until the broadcaster transmits a cancel command in the VBI.

Because the auxiliary information is normally used for advertising, it is desirable to not alert the user to stop recording a program when a commercial occurs. Thus, the time that the auxiliary information is transmitted is preferably adjusted so that the user cannot generate in response to the auxiliary information a signal for shutting off the VCR. For example, if the auxiliary information is always transmitted 30 seconds before the commercial (i.e. 30 seconds is always the lead time), the user may program his VCR to stop recording 30 seconds after the detection of the auxiliary information and start recording again 60 seconds after the VCR stops recording. But if, the lead time is variable, the user misses recording a portion of the program. For example, if the next commercial uses a 60 second lead time, the viewer shuts off the VCR 30 seconds early if the user is using a 30 second lead time. Furthermore, the auxiliary information may also be transmitted after the commercial so that the viewer cannot shut off the VCR in advance.

Alternatively, the prompt may be a number that the user enters to indicate which group of auxiliary information is to be recorded.

Describing the program ID first, the broadcast station preferably broadcasts the program identification information on line 21, field 2 of the VBI according to EIA specifications.

This information may include:

Title of program

Program length in minutes

Today's day and date (when viewing TV broadcasts) or day and date of recording (when viewing taped shows)

Station call letters (e.g. KCET or KCAL) or 4-letter abbreviation of station name (e.g.

SHOW for Showtime)

Channel number

In a preferred mode of operation, when the user changes the channel or when recording or playback of a tape begins, the program ID is automatically displayed for a predetermined length of time, e.g., five seconds, and then disappears. Alternatively, when the user presses a program ID button on the remote controller 75, the indexing VCR 10 displays the program ID.

When a program is recorded, the program title is stored in the directory and also inserted in the VBI portion of the recorded program. A viewer can access the title of the program being shown by pressing the "Program ID" key. When the key is pressed, the microprocessor controller 31 sets the VBI decoder to decode selected field and lines of the VBI either from the broadcasted signals or from the reproduced signals depending upon its mode of operation.

The program I.D. information for a plurality of viewed channels is stored in the RAM 33. Although some of the program I.D. information changes with the program (e.g., program title, start time, length, program category), this information is quickly retrievable from the memory when the user switches channels and requests the program I.D. to be displayed. Using the start time and length of the program, the indexing VCR 10 checks, periodically or in response to a Program I.D. command, whether the information is still within the valid time before displaying it on screen.

The channel specific program guide is the combination of the program IDs for a plurality of programs that will be broadcasted in an upcoming predetermined time. In addition to the information included in the program ID, the channel specific program guide may also include the start times, the titles, the "PLUSCODE™" numbers and a description of the programs. In addition, the information that is displayed may be controlled by attribute codes, which are described below in conjunction with FIG. 31 contained within the program guide. For example, the "PLUSCODE™" numbers may be printable on screen, but if it is preceded by a "non-print" attribute, the indexing VCR 10 does not display it. As a second example, special events may be highlighted by using a character attribute.

A broadcasting station broadcasts on a periodic basis, the channel specific program guide in the VBI of the broadcast. The VBI decoder in the indexing VCR 10 continuously decodes the channel specific program guide from the VBI and stores it in the RAM 33. Because of unexpected events, such as sport programs that overrun their scheduled broadcast time or news breaks that shift programs, the broadcaster may update the program guide and transmit the new guide. Accordingly, as the new guide is read, the indexing VCR 10 stores it in the RAM 33.

The program guide may also include a video program guide of special programs such as video magazines, video sales catalogs, video classified ads, and infomercials. The program guide allows the user access to a television program listing for those who do not have a periodical listing or newspaper listing, or those who misplaced their listings.

The format of the channel specific program guide data packet is described below in conjunction with FIG. 31. As the data is decoded, the data stored in the RAM 33 is updated by each subsequent CSPG data packet. The quantity of information supplied in the CSPG data packet is determined by the broadcaster. For example, the broadcaster may provide program schedules for the subsequent eight hours but provide only the description of the programs for the first two hours. In addition, the guide may also include special events for the upcoming few days. By viewing the listing before the viewer goes to work or goes to sleep, the user may program his indexing VCR 10 using the program guide for recording shows during his absence or sleep.

When the viewer switches to a different channel, the indexing VCR 10 will begin reading and storing the CSPG data for the new channel. However, because many viewers switch between channels, sufficient memory may be provided so that the program guides for at least two channels may be stored in the RAM 33.

The stored program guide may be used to implement timer programming of the VCR. The user programs the indexing VCR 10 to record the desired program by moving the cursor to this program pressing the Record button. In embodiments in which the "PLUSCODE™" numbers are displayed on the screen, the viewer may also program the indexing VCR 10 by entering on the remote controller 75 the "PLUSCODE™" number for the program he would like to record. In response thereto, the indexing VCR 10 stores the "PLUSCODE™" number into its programming stack for execution as described above.

Figure 19:
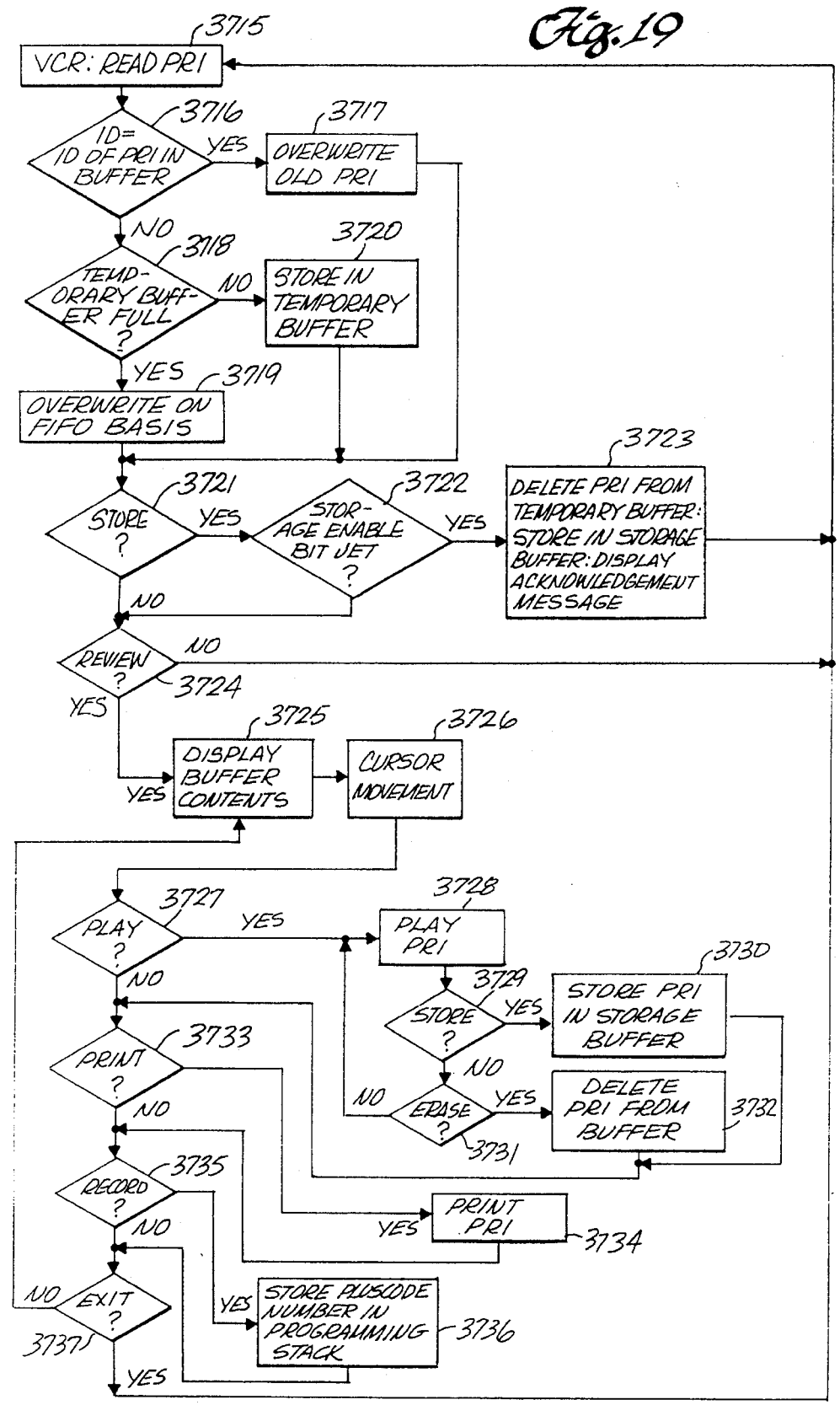
FIG. 19 is a flow chart showing the steps employed in the processing of program related information.

FIG. 19 is a flow chart showing the steps employed in the processing of program related information. Program related information (PRI) is information broadcasted in the VBI that is related to a program being aired which is available upon user command either concurrently with the program or at a later time. The use of PRI extends the time of an advertisement because the viewer is able to view the information at a later time at a pace selected by the viewer. Examples of PRI include statistics of baseball players during a baseball game, recipes given out during a cooking lesson, and problem assignments and answers after an educational program. In other examples, many commercials have a message during the program urging the viewer to call a toll free number to get further information or to place an order or giving details about an upcoming sales event or promotion. Under existing systems, such information which is conveyed in the video is fleeting because most viewers are either not disposed to take any action on the spur of the moment or are unprepared to take such action. The information transmitted as part of the PRI in the VBI may be captured and displayed on screen at the command of the user. Thus, the information may repeat the information provided during the commercial or program or may contain additional information. For example, the commercial may be a promotion about an upcoming movie while the PRI for this commercial may provide additional details of the cast or plot of the movie. Further, a "PLUSCODE™" number may be provided so that at the press of a single button the "PLUSCODE™" number is used to program the indexing VCR 10 to record the requested program. Alternatively, the commercial may be a short commercial which is a promotion for a long commercial such as an infomercial aired in the middle of the night. In yet another embodiment, the PRI may be an electronic coupon that is outputted through the serial data link to a printer or other devices to print or store the coupon which may then be later redeemed at participating retailers or stores for the promoted discounts. In another embodiment, a prerecorded tape may have a PRI recorded thereon.

Referring now in particular to FIG. 19, the broadcast station broadcasts the PRI in a time window during which it is related to the program or commercial being broadcasted. Alternatively, the PRI may be broadcast offset in time from the program or commercial. The PRI is typically repeated throughout the time window. For example, the PRI for a 30 second commercial is broadcasted during the commercial. For a PRI message that is 8 seconds long, the PRI is transmitted four times wherein the first three times are the complete PRI and the fourth time is an incomplete message. The PRI is preferably sent on one or more VBI lines referenced by pointers on line 21, field 2, as described below. The indexing VCR 10 continuously reads the VBI for the PRIs (Step 3715). Each PRI has a ID number so that the indexing VCR 10 may recognize when the PRI is repeated during a commercial or in a rerun of the commercial. When the ID number of the present PRI equals the ID number of a PRI in either the temporary or the storage buffers (Step 3716), the indexing VCR 10 overwrites the old PRI in the buffer (Step 3717). Otherwise, if there is not a match of ID numbers, the indexing VCR 10 determines whether the temporary buffer is full (Step 3718). If it is full, it overwrites previously stored PRIs on a first-in-first-out (FIFO) basis (Step 3719). Otherwise, the indexing VCR 10 stores the new PRI in the temporary buffer (Step 3720). In addition to monitoring the VBI for detected PRIs, the indexing VCR 10 also monitors for user selected commands. As described below, data can be collected for monitoring the viewing habits of the viewer watching PRI. If a store command is detected (Step 3721), the indexing VCR 10 determines whether a storage enable bit is set (Step 3722), which if it is not set during the broadcast then the PRI is not storable (i.e., the PRI can be stored only in the temporary buffer and not in the storage buffer). If the storage enable bit is set, the indexing VCR 10 deletes the PRI from the temporary buffer and stores it in a storage buffer. The indexing VCR 10 then displays an acknowledgement message such as "stored" on the TV screen, if an acknowledgement bit is set (Step 3723).

As described below, the time of the store command is recorded in the RAM 33. The indexing VCR 10 then continues monitoring the PRI at step 3715.

If, however, a store command has not been set or the storage enable bit is not set, if a review command is not detected (Step 3724) the indexing VCR 10 returns to reading the PRI. Otherwise, the indexing VCR 10 displays the titles of the PRIs (the first line of the PRI) stored in the buffers in a display such as that shown in FIG. 20 (Step 3725). The viewer is able to move through the displayed PRIs using the cursor keys on the remote controller (Step 3726). The PRI that is pointed to is highlighted by reverse video or by other methods well known in the art. If a play command is sent (Step 3727), the indexing VCR 10 plays the PRI (Step 3728). The time of the play command is stored in the RAM 33. If the PRI is being read from a recorded tape, the VCR enters a pause mode and suspends motion of the tape when the PRI is displayed. After the PRI is displayed, the VCR resumes playing the tape. When the PRI is displayed, the user must either store the PRI in the storage buffer, by pressing the store button (Steps 3729–3730), or delete the PRI from either temporary or storage buffer by pressing the erase button (Steps 3731–3732). The time of the store or erase command is stored in the RAM 33. By pressing the print button (Step 3733), the user can print the PRI (Step 3734). Printing may be done either to a printer or another device connected to the serial port by pressing the record or send button. The time of the print command is stored in the RAM 33. As shown in FIG. 20, PRI B and PRI D are stored from earlier broadcasts. The PRIs E, F, G, H are from later broadcasts and are stored in the temporary buffer. At a later time when the user presses the Review button again, the PRIs E, F, G, H may be replaced by new PRIs, while PRIs B and D remain in the storage buffer. Alternatively, the displayed PRI, in FIG. 20 may be in a single list with a notation of which PRI's are stored.

For PRIs that contain "PLUSCODE™" numbers referring to other related programs that are to be broadcasted later, when the user presses the record button (Step 3735) the indexing VCR 10 stores the "PLUSCODE™" number in its programming stack for subsequent recording (Step 3736). The time of the record command is stored in the RAM 33. The indexing VCR 10 continues to display the buffer content until the user presses the exit key (Step 3737).

The embodiment discussed above uses the STORE button and the REVIEW button for storing and reviewing PRIs. Alternatively, these functions may be done by a single button, such as the i button. Pressing the i button one time may invoke the storage function while pressing it twice in a row may invoke the review function.

Video Publishing Through Broadcast

As described above, a PR tape has a directory recorded on the VBI throughout the tape. However, a single video program that is being broadcasted may similarly have a plurality of video segments that are each separate video programs. For example, one airing of the television show "60 Minutes" typically has three news segments and one segment with commentary by Andy Rooney. Other examples include video magazines, video sales catalogs and video classified ads. Another example are video books such as karaoke or how to books, e.g. on exercise or cooking. The user normally wants to watch portions of the video magazine at later times. Under the standard recording method described above, the indexing VCR 10 reads only one program title in the VBI of the broadcasted program, since the recording is in one continuous session. (The resultant recording will have a single constant program number in the TP packet on line 19. In addition, only one VISS mark is recorded which is at the beginning of the recording.) However, many users want each video segment to be indexed. Accordingly, extra control signals are broadcast to provide additional indexing to each individual section.

A pointer, described below in conjunction with FIG. 30, in line 21 points to a VBI line which contains a video magazine (VM) packet. The VM packet is broadcast in the VBI line at the starting point of the second section and of each section thereafter. As described below in conjunction with FIG. 32, the VM packet contains the encrypted title of the section. At the same time, the directory is broadcasted repeatedly on line 20 of the VBI. The format of the directory is identical to the format of directories for prerecorded tapes.

Figure 21:
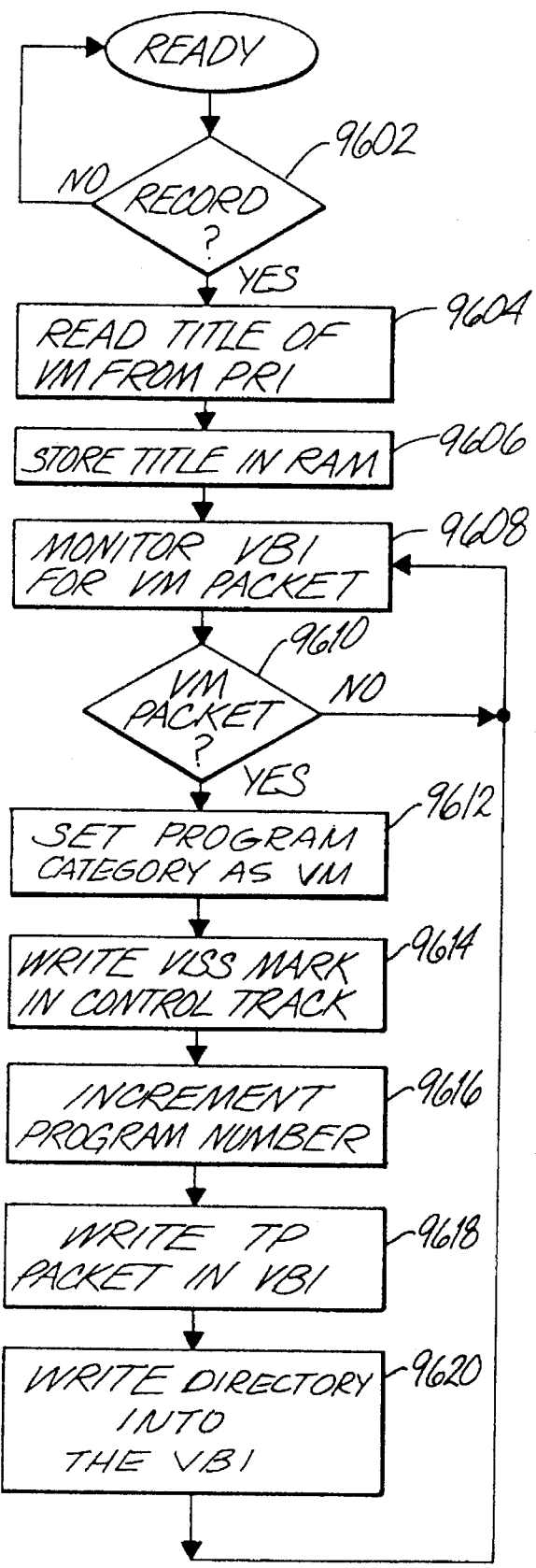
FIG. 21 is a flow chart showing the steps employed in the operation of the indexing VCR 10 for video magazines.

FIG. 21 is a flow chart showing the steps employed in the operation of the indexing VCR 10 for video magazines. FIG. 21 is discussed in light of an illustrative example in which a tape has two regular programs and one video magazine, which is recorded after the two programs, on the tape. After the user presses the Record button, (Step 9602), the indexing VCR 10 reads the title of the video magazine from the PRI (step 9604) and stores it in the RAM 33 (step 9606). (When recording is started, the indexing VCR 10 uses the existing TID if the tape has one, or otherwise, the indexing VCR 10 creates a TID if the tape is a blank tape.) In the illustrative example, the title is stored as the third program. The indexing VCR 10 monitors the VBI for VM packets (step 9608). Upon detection of a VM packet in the VBI (step 9610), the microprocessor controller 31 sets the program category in the directory to indicate that the program is a video magazine (step 9612). In an embodiment where a pointer is used to note the line on the VBI, upon detection of the pointer, the indexing VCR 10 monitors the designated line of the VBI for the occurrence of a VM packet.

In response to receiving the VM packet, The microprocessor controller 31 writes a VISS mark on the control track 42c to identify the start of the next section (Step 9614). The microprocessor controller 31 then increments the previous program number by one (step 9616) and writes it as the program number in the TP packet on line 19 of the VBI (Step 9618). The indexing VCR 10 reads and decrypts the directory from line 20 of the VBI of the broadcast signal and writes it onto the VBI of the tape (step 9620).

For the illustrative example, if the tape is somewhere in a program, such as program 2, other than the video magazine when the user later inserts the tape, the directory will appear as:

| Program | Length |
|---|---|
| Cheers | 60 |
| → Eyewitness news | 30 |
| Entertainment Week (VM) | 60 |

The sectional titles of the video magazine "Entertainment Week" do not appear. When the user is in program 3 and presses the Index button, because the indexing VCR 10 reads the VM flag indicating that the current tape location is a video magazine, it reads the directory of the magazine from line 20 of the VBI. The VCR then displays a directory as follows:

| Program | Length |
| --- | --- |
| Cheers | 60 |
| Eyewitness news | 30 |
| → Entertainment Week (VM) | 60 |
| Dining out | |
| Music | |
| Plays, musicals | |
| Sports | |
| Chess | |
| Museums | |
| Life entertainment | |
| Special events | |

This directory does not show the length of the individual sections of the magazine. In other illustrations, the individual lengths may be shown. A section of the video magazine may have subsections, such as illustrated where chess is a subsection of sports.

The VM packet and subsequently the directory recorded on the tape for the video magazine includes the program numbers, the start address, and the stop address of the video magazine. In a first embodiment, the first program of the magazine has a program number 1. As in the illustrative example, "Entertainment Week" has a program number 1, "Dining out" has a program number 2, and so forth. The start address of "Entertainment Week" is 0. The microprocessor controller 31 adjusts these numbers to reflect the relative position of the video magazine in the index. As per the illustration, "Entertainment Week" is adjusted to be program 3 with a start address corresponding to the end of program 2.

In an alternate embodiment, the directory of the video magazine is stored in the RAM 33 instead of the tape. By storing the directory in the VBI, less RAM memory space is used for storage.

The created tape is structurally the same as an HR tape with VISS marks on the control track, and TP packets written on the VBI of the tape and directory packets for the video magazine written on the VBI and section titles stored in the RAM 33.

Electronic Program Guide With Video Clips

In another implementation of the video magazine, an electronic program guide having a plurality of video clips is broadcast as a video magazine. The electronic program guide may include video clips for the following day or several days. The guide may also include shows and other broadcasted programs such as movies and sports. Each video clip represents an upcoming show and includes a teaser for that show. Each video clip corresponds to a chapter or segment in the video magazine. The corresponding video data packet includes the title of the magazine which is the channel number/name, the date and the words "program guide". The subtitle of each chapter is the name of the show and the time and date of the broadcast. In addition, the "PLUSCODE™" number for each show is also broadcast in the VM data packet.

Figure 22:
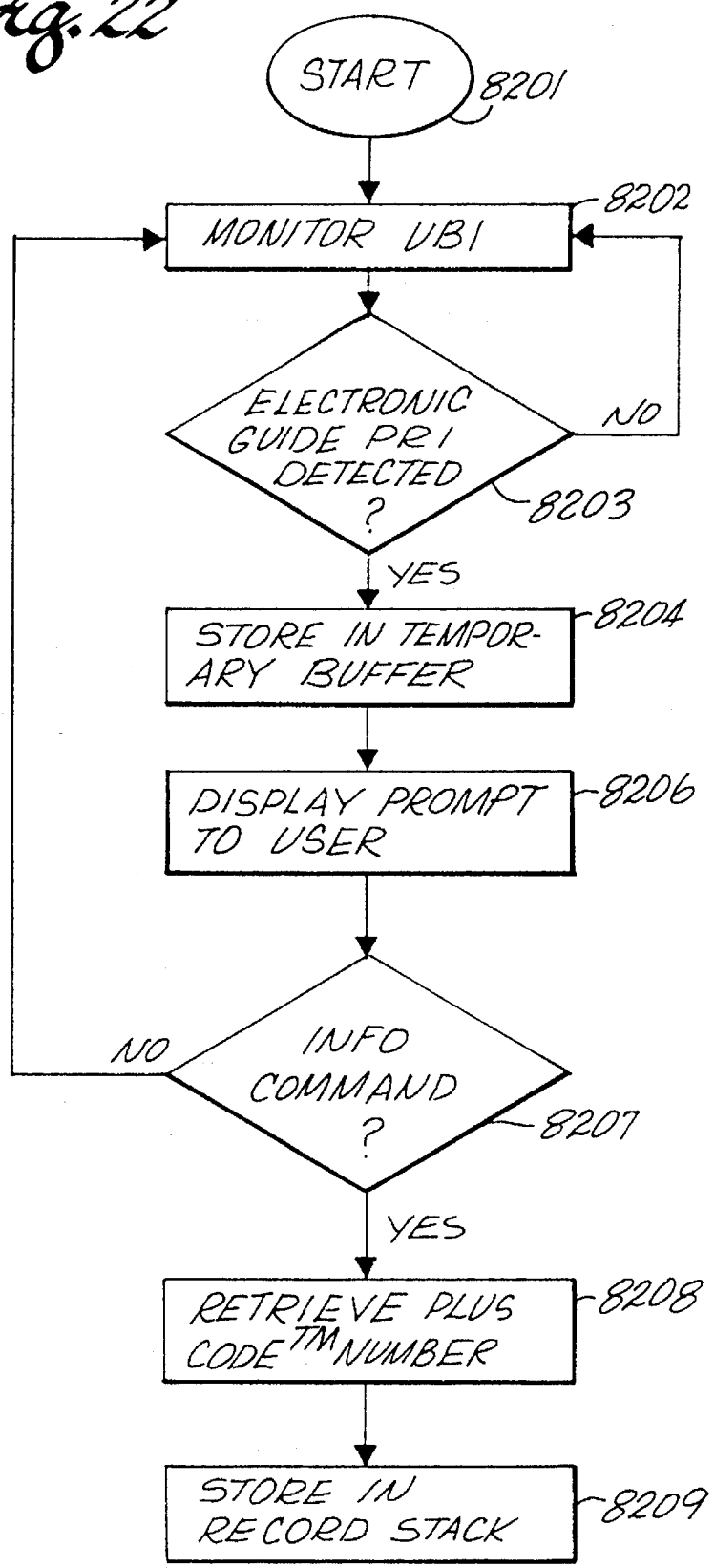
FIG. 22 is a flow chart showing the steps employed in the operation of recording an electronic program guide.

FIG. 22 is a flow chart showing the steps employed in the operation of recording an electronic program guide. At the start of normal system operations (step 8201), the indexing VCR 10 monitors the VBI for the program related information (PRI) (step 8202) until a program guide PRI is detected (step 8203). The microprocessor controller 31 stores the program guide PRI, which includes the "PLUSCODE™" number corresponding to the electronic guide which is broadcasted at a later time, and, in some implementations, on a different channel, in the temporary buffer (step 8204). The indexing VCR 10 displays a prompt to the user to alert him that he may capture the "PLUSCODE™" number to record the electronic program guide at a later time (8026). If the info button is pressed (step 8207), the microprocessor controller 31 retrieves the "PLUSCODE™" number from the temporary buffer (step 8208) and decodes it to generate the channel-date-time-length information which is stored in the VCR record stack as described above (step 8209).

Figure 23:
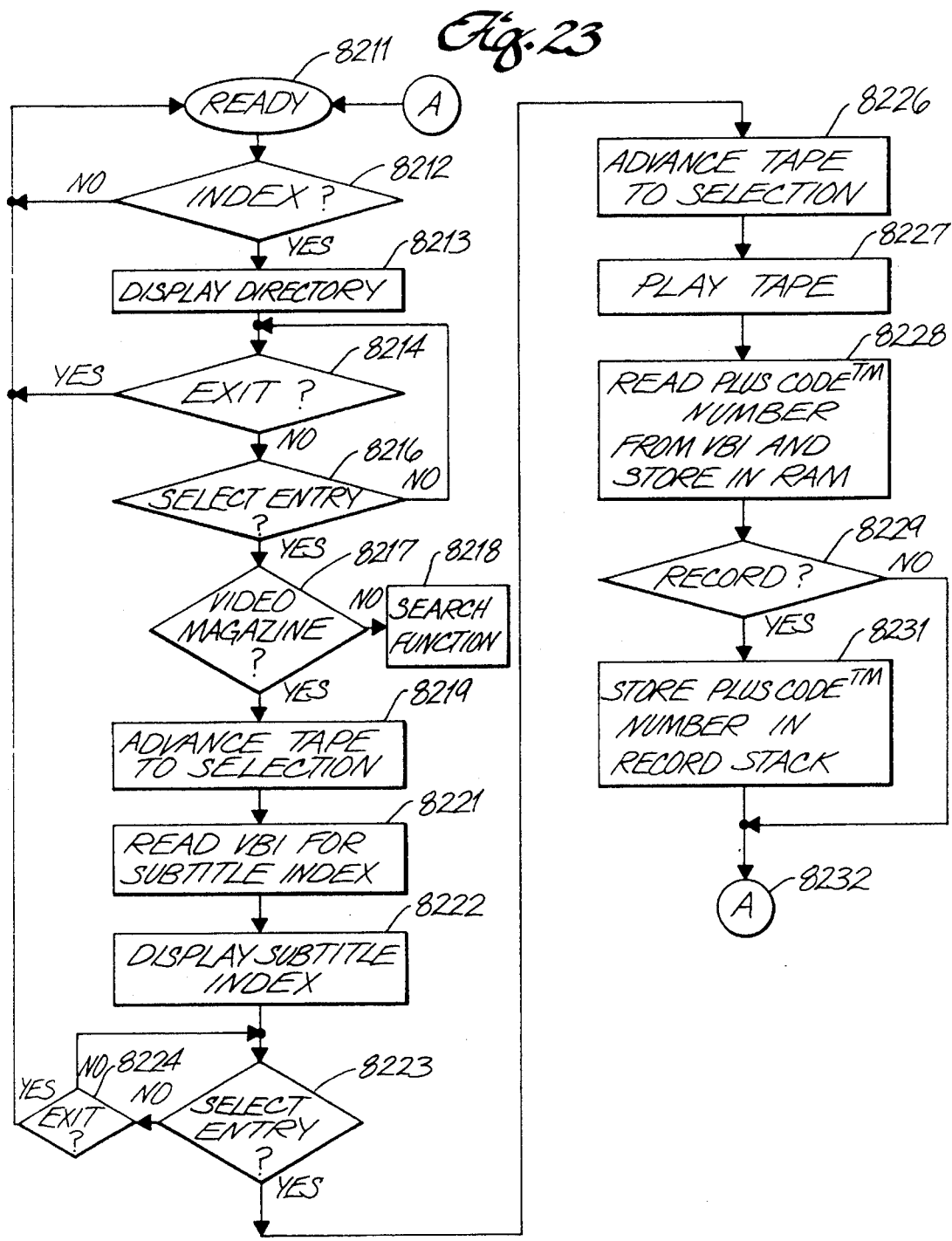
FIG. 23 is a flow chart showing the steps employed in the operation of the index functions for an electronic guide using the indexing VCR.

FIG. 23 is a flow chart showing the steps employed in the operation of the index functions for an electronic guide using the indexing VCR. While the indexing VCR is in a ready mode (step 8211), it monitors whether an index command has been transmitted (step 8212). When it has, the indexing VCR 10 displays a directory as shown in FIG. 24 (step 8213). If an exit command has been sent (step 8214), the VCR enters a ready mode at step 8211. Otherwise, the VCR waits for the user to exit or select an entry from the displayed index (step 8216). If the selected entry is not "video magazine" (step 8217), the indexing VCR 10 performs a search function in accordance to that described above in conjunction with FIG. 17 or 18 (step 8218). The count of VISS marks for programs on the tape after the video magazine is adjusted to include the number of VISS marks within the video magazine. On the other hand, if video magazine has been selected at step 8217, the indexing VCR 10 advances the tape to the selected video magazine (step 8219) and reads the subtitle index from the VBI (step 8221). The indexing VCR 10 then displays the subtitle index as shown in FIG. 25 (step 8222). The indexing VCR then waits for either the user to select an entry (step 8223) or for the user to exit (step 8224). If the user has entered a selection from the subtitle index, the indexing VCR 10 advances the tape to the selection (step 8226) and begins playing the tape (step 8227). The VCR then reads the "PLUSCODE™" number from the VBI and stores it in the RAM 33 (step 8228). If the user presses the record button (step 8229), the indexing VCR 10 decodes the "PLUSCODE™" number and stores the corresponding channel-date-time-length information in the record stack for timer programming of the VCR (Step 8231) and returns to the ready mode at step 8211 (step 8232). The time of the record command is stored in the monitor data 33c of the RAM 33.

In an alternate embodiment to FIG. 23, at step 8221, the indexing VCR 10 also reads the "PLUSCODE™" numbers associated with the programs and stores them in the RAM 33 when the subtitle index information is transferred from the VBI to the RAM for display. Further, at step 8223 the user can record an entry while looking at the display subtitle index of FIG. 25 by pressing the record button on the remote controller. The indexing VCR 10 then retrieves the "PLUSCODE™" number from the RAM, decodes it into the channel, date, time and length information and stores it in the record stack at step 8231. This embodiment allows the user the option of selecting shows from the directory screen for recording without viewing the corresponding video clip.

Electronic Program Guide With A Video Grid And Video Clips

In yet another embodiment of the video magazine, the broadcaster broadcasts an electronic program guide wherein the electronic guide includes the program title, channel, date, and time of upcoming programs as well as an associated video clip which is identical to the video clips previously described above in the Electronic Program Guide With Video Clips embodiment. In that embodiment, the electronic guide is transmitted in the form of VBI text data. Unlike that embodiment, this electronic program guide transmits both the menus and the video clips as full frame video. Accordingly, all the information displayed on the screen is transmitted as video. The display is not limited by the character generator in the VCR.

To produce an electronic guide, the broadcaster or guide producer creates graphics by computer or other electronic devices or by hand. The broadcaster then generates video images of the graphics by filming or recording. The video images are then broadcasted as a video magazine. Along with the video images, the broadcaster transmits addressing information for correlating the images on the screen with other video images, "PLUSCODE™" number or channel-date-length-time corresponding to a program depicted in the guide with a future broadcast, and position information for correlating positions on the screen with the program and the other information broadcasted in the VBI.

Figure 26:
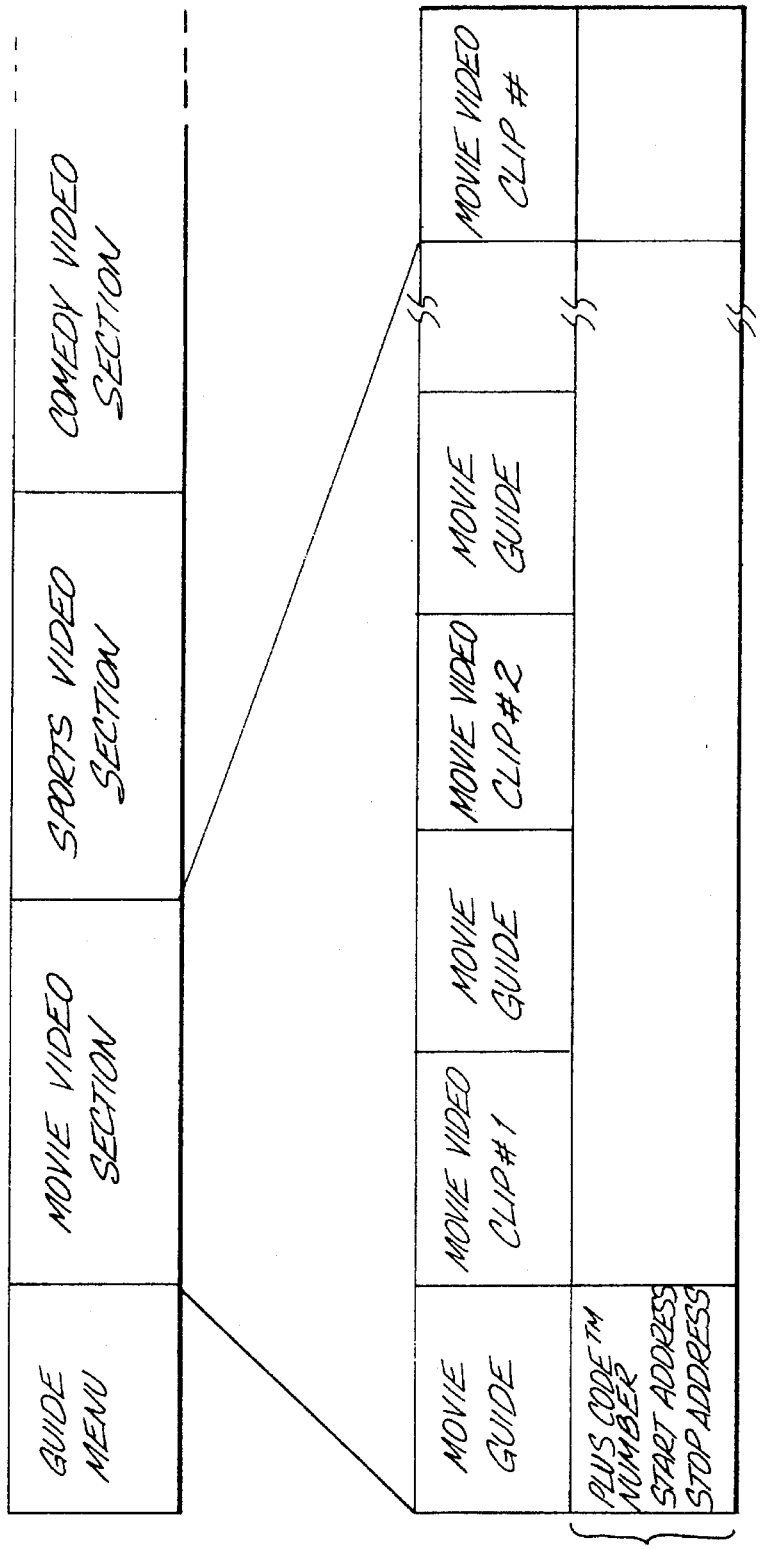
FIG. 26 is a schematic diagram illustrating the electronic program guide with a video grid and video clips with an exploded view of a movie guide portion of the guide.

FIG. 26 is a schematic diagram illustrating the electronic program guide with a video grid and video clips with an exploded view of a movie guide portion of the guide. An electronic program guide 3740 has a guide menu and a plurality of video sections (also called video chapters). The guide menu contains information for the title and descriptions of the video sections displayed in locations (or cells) arranged in a grid pattern on the screen. Along with the guide menu, the broadcaster transmits in the VBI the location of each cell of the grid and the start address and the stop address for the corresponding video section. Each video section represents the program listings for one of a plurality of categories of programs, such as movies, sports or comedy. Furthermore, each video section has a plurality of chapter menus spaced apart in time in the broadcasted guide or along the tape after recording and a plurality of video clip sections between the video menus. As part of the video menu, part of the information related to the upcoming programs for the associated broadcaster is transmitted or recorded as a video image. This information is arranged so that when the associated video is displayed, the information for each program of the menu is displayed in cells arranged in a grid on the screen. This information may be in different fonts and colors. It may also include pictures of actors or scenes of the show or advertiser or show logos. Information relating to the position of each cell, the start and stop addresses, and the "PLUSCODE™" numbers for the corresponding video clip is transmitted in the VBI of the first video menu of the video section. The addresses may be timed at a particular tape speed or length.

Within each grid, a plurality of programs and associated information is displayed in a respective location on the grid. The character generator in the VCR provides a cursor which is superimposed over the video grid displayed on the screen. The user controls the position of the cursor using the remote controller 75. The microprocessor controller 31 tracks the cursor position and correlates it to the associated program and video clip for that position stored in the VBI.

Although shown pictorially in FIG. 26 as being along side the movie guide, the information associated with each cell in the grid is transmitted in the vertical blanking interval along with each of the video sections. After reading the VBI, the microprocessor controller 31 stores this information in the RAM 33. Alternatively, the information in the VBI may be broadcasted with each subsequent video guide and read from the VBI as each subsequent guide is displayed.

Figure 27:
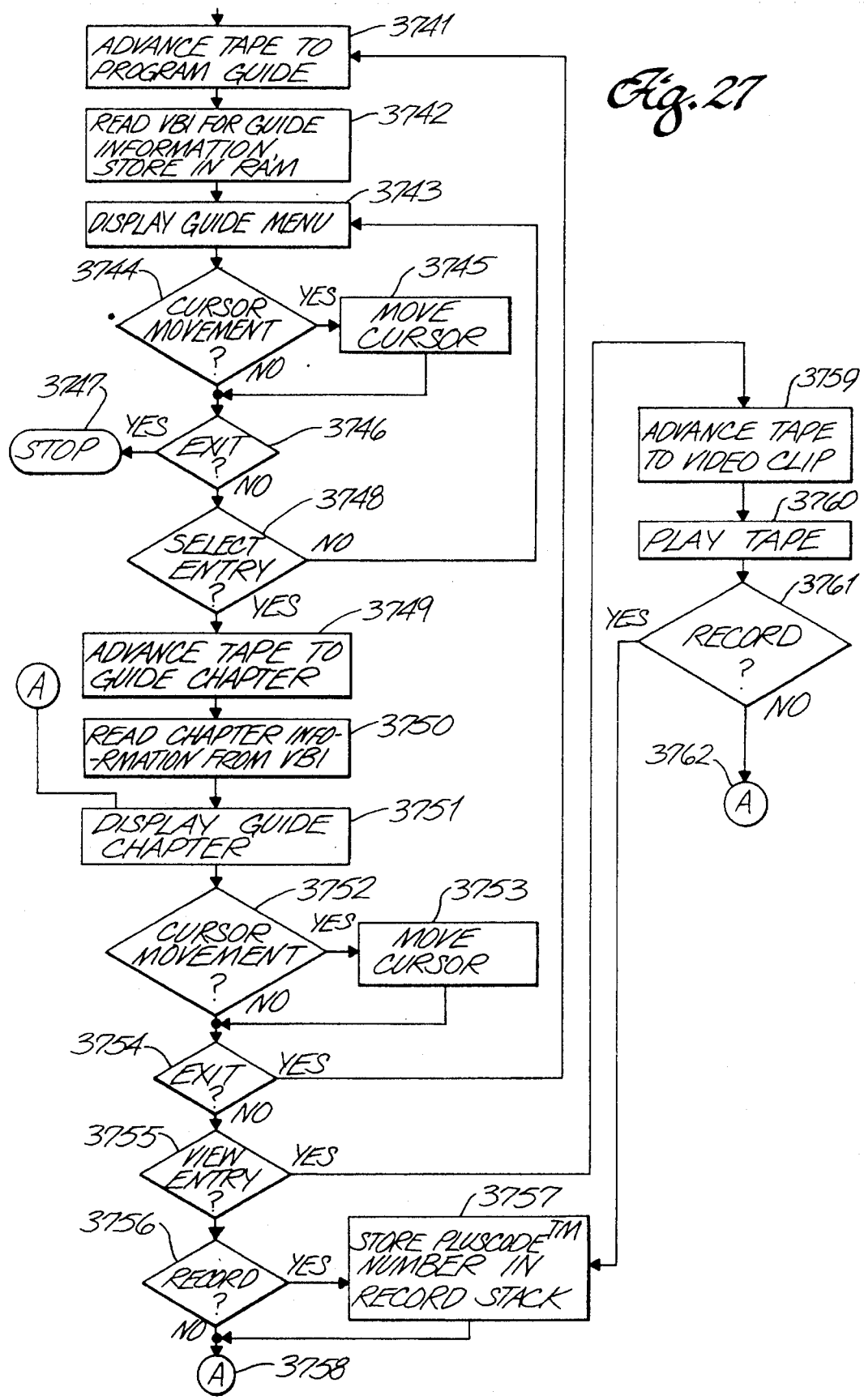
FIG. 27 is a flow chart showing the steps employed in the operation of the indexing VCR for an electronic program guide using a video grid and video clips

FIG. 27 is a flow chart showing the steps employed in the operation of the indexing VCR for an electronic program guide using a video grid and video clips. As a precursor to beginning the operation in FIG. 27, in a manner similar to steps 8211–8217 of FIG. 23, the user has selected the indexing function of the VCR and from the displayed directory selected the entry on the directory corresponding to the electronic program guide with video grids and video clips. In response to the user having selected the electronic program guide, the indexing VCR advances the tape to the beginning of the program guide, using the tape directory (step 3741). The VCR reads the vertical blanking interval for the guide information and stores it in the RAM 33 (step 3742). The guide information includes the start and stop addresses and the cursor location for each of the video sections. The guide information functions as the directory information. The indexing VCR reads the category guide menu from the video tape and displays it on the screen (step 3743). The length of the guide menu on the tape may be a single frame or frames covering several minutes. For guide menus having a few frames, the VCR is in the play and still frame mode allowing the user to browse the guide menu. Alternatively, the images of the still frame may be stored digitally and then displayed. If the guide menu contains multiple pages, the user advances pages by commanding the VCR to advance by using the frame advance button, or alternatively, a page button. In this mode, the VCR responds to a page command as it would a frame advance command. By using the cursor buttons on the remote controller (step 3744), the user can move the cursor on the screen (step 3745). By pressing the exit button (step 3746), the user may return to the directory of the entire video tape (step 3747). Otherwise, the user selects from the category guide menu using the enter button to select the highlighted menu entry (step 3748). As an illustrative example, the selected entry will be described in view of the movie guide shown in FIG. 26. While discussed as a movie guide, this description also pertains to the other guides. After the user selects the movie guide, using the addressing information, the VCR fast forwards the tape to the position for the movie guide grid which it knows from the information read from the VBI after the tape advances to the program guide (step 3749). The VCR reads the chapter information from the VBI where the chapter corresponds to the information for the movie video section (step 3750). As noted above, this information relates the position of each cell, the start and stop addresses, and the "PLUSCODE™" numbers for the corresponding video clip to the title of the program. The VCR stores this information in the RAM 33. As described above for the displaying the category guide menu, the VCR similarly displays the chapter guide for the movie video section (step 3751). As with the guide menu, by using the cursor keys (step 3752), the user moves the cursor through the chapter guide (steps 3753). Alternatively, the user may exit the chapter guide and return to the guide menu as described above (step 3754). If the user elects to view an entry from the movie guide (step 3755), the VCR reads from the RAM 33 the start address for the selected program and advances the tape to the video clip (step 3759). The VCR then enters the play mode and plays the video clip (step 3760). If the viewer wishes to record the program associated with the clip that he is viewing, the user presses the record button (step 3761). In response thereto, the VCR reads from the RAM 33 the "PLUSCODE™" number associated with the video clip and stores the number in the record stack for later recording (step 3757). The VCR then advances to the guide chapter. If the viewer does not record a selection after the video clip, the video clip ends and by detecting the stop address of the video clip (step 3762), the VCR knows the detected video from the video tape is a movie guide and displays the guide chapter at step 3751.

From the guide chapter menu, the viewer may record the program without viewing the video tape (step 3756). In response to a record command, the VCR reads from the RAM 33 the corresponding "PLUSCODE™" number, stores it in the record stack (step 3757), and continues to display the guide chapter at step 3751.

In various alternate embodiments, the number of grid cells displayed for the program guide or the guide chapter may be variable with the number of grid cells transmitted in the VBI data. In other embodiments, the layout of the video tape may have one movie guide section with video clips following serially on the tape. Upon the end of each video clip the VCR having detected the stop address then advances the tape to the corresponding movie guide. In yet another embodiment, several chapter guide menus may be dispersed throughout the tape so that access time of these menus is reduced.

Other Features

Figure 28:
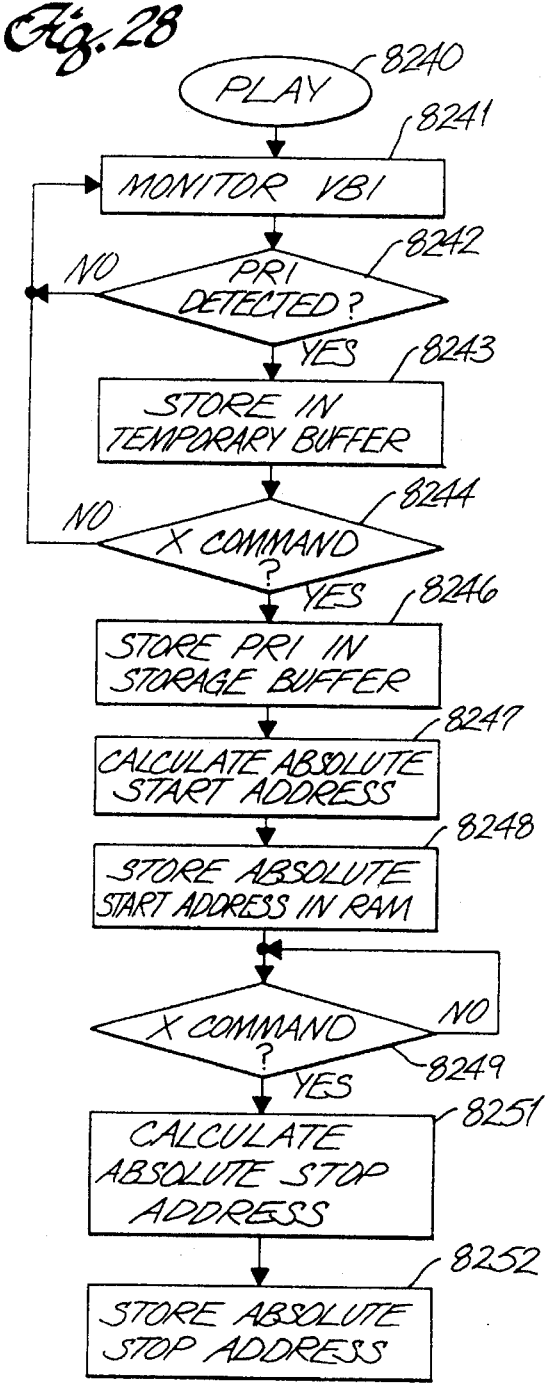
FIG. 28 is a flow chart showing the steps employed in the operation of temporarily indexing portions of a video tape between VISS marks.
Figure 29:
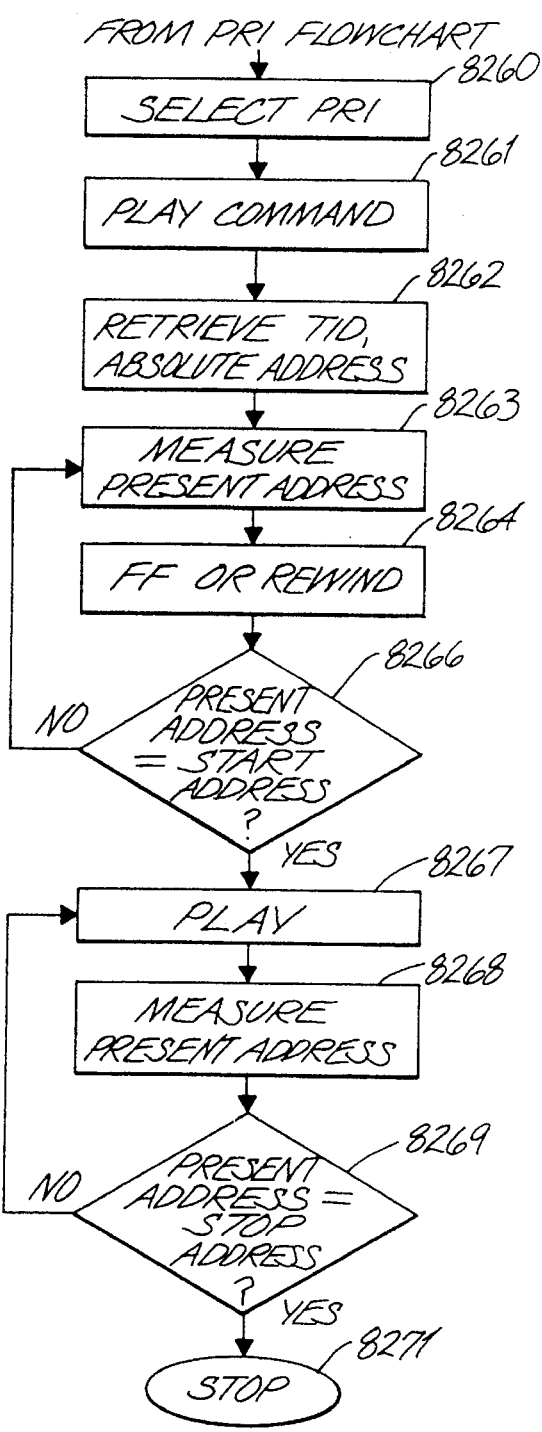
FIG. 29 is a flow chart showing the steps employed in the operation of playing temporarily indexed portions of a video tape between VISS marks.

FIG. 28 is a flow chart showing the steps employed in the operation of temporarily indexing portions of a video tape between VISS marks. FIG. 29 is a flow chart showing the steps employed in the operation of playing temporarily indexed portions of a video tape between VISS marks. As an overview, a user may wish to access video information recorded between VISS marks. As an alternative to marking the selected portion with an additional VISS mark or another type of mark, the indexing VCR 10 stores the absolute addresses of the selected video portion in response to user selected commands. This feature may be used for example when one VISS mark in a real estate magazine designates the start of homes for sale in Pasadena, while the next VISS mark designates the start of homes in La Canada. After viewing the recording of the houses in Pasadena and the PRI accompanying the video, the user may want to show his wife one particular house at a later time. Referring now to FIG. 28, while the user is playing a tape (step 8240), the indexing VCR 10 monitors the VBI for the presence of a PRI (step 8241). When a PRI is detected (step 8242), the PRI is stored in the temporary buffer (step 8243). Steps 8241–8243 correspond to the monitoring steps described above for the PRI. When the user wants to mark the video for later viewing, he presses button X on the remote controller. Button X may be any button, such as the VCRPLUS+™ button, on the remote controller that is not used in the PRI processing routine. When button X is pressed (step 8244), the indexing VCR 10 stores the current PRI in the storage buffer (8246). The indexing VCR calculates the absolute start address of the location of the tape indicated (step 8247) and stores the absolute start address in the RAM 33 (step 8248). The indexing VCR 10 then waits for a second X command to indicate the end of the selected video portion (step 8249). In response to the X command, the indexing VCR 10 calculates the absolute stop address (step 8251) and stores it in the RAM 33 (step 8252).

When the user wishes to later find the temporary indexed video portion, referring now to FIG. 29, the user pulls up the stored PRI menu as described above in connection with FIG. 19. The user selects the PRI (step 8260) and transmits a play command (step 8261). The indexing VCR 10 retrieves the TID and the absolute addresses from the memory (step 8262). The indexing VCR 10 measures the present address of the tape (step 8263) and depending on the direction to the selected video portion, fast forwards or rewinds the tape (step 8264) until the measured present address equals the start address retrieved from memory (step 8266). The indexing VCR 10 then starts playing the tape (step 8267) and measures the present address of the tape (step 8268), and when the present address equals the stop address (step 8269), the VCR stops the tape (step 8271).

A portion of the auxiliary information changes infrequently. For example, in the program ID, the broadcast channel call letters may change only as often as every several years. By storing these relatively time independent variables in the RAM 33, the access time to this portion of the auxiliary information is reduced.

With the channel call letters stored in memory, the indexing VCR 10 retrieves the call letters when the user changes the television to a new channel and displays the new channel call letters on the television without retrieving or having to wait to retrieve the new program ID information from the VBI. The channel call letter library may be collected either during an initial set-up procedure of the indexing VCR 10 by scanning all channels and reading the program ID from line 21 for each channel or, alternatively, the program ID may be read during the first use of each channel and the channel call letters stored in the RAM 33.

By way of background, the "VCR PLUS+™" video programmer uses a channel mapping system in which the channel numbers are assigned to certain cable channels in each area of the country which differ from the received channel number. For example, the cable channel HBO may be assigned channel 33. Further broadcast channel frequencies are often mapped to different cable channel frequencies by the local cable operators, for example, the broadcast channel 28 for station KCET may appear as cable channel 6. The channel map relates the guide channel numbers to the received channel numbers. Similar to channel call letters, the channel mapping numbers are changed infrequently. Thus, in a similar manner, the indexing VCR 10 can automatically collect a channel map data, either after first use of each channel or during an initial set-up routine in which all channels are scanned. The "PLUSCODE™" numbers used by a VCR PLUS+™ video programmer inherently include the guide channel numbers as part of the encode channel-date-time-length data. The broadcast stations, as part of the program related information or the channel specific program guide, may broadcast the "PLUSCODE™" numbers. The indexing VCR 10 reads these numbers, decodes them, and establishes the relationship of the decoded channel numbers with the received channel numbers.

Another parameter that changes infrequently are the pointer attributes, such as line number, data rate, error correction, and encryption, of VBI lines for CSPG. Although CSPG may be transmitted more or less continuously on one or more VBI lines, the pointers to such lines may not be repeated at a high rate on line 21, because other fields of data are present. As a result, when a user switches to a new channel and requests the CSPG, he may have to wait until the next CSPG pointer appears on line 21. By storing the pointer attributes for the CSPG lines in memory, the indexing VCR 10 can reads those lines immediately after the user has switched the channel.

Format for Data Received on the VBI

The auxiliary information (program ID, CSPG, PRI) described above is broadcasted on line 21, field 2 of the VBI, according to the specification proposed by the EIA. This information shall be decoded by the indexing VCR 10 according to the specifications.

The channel specific program guide and the program related information are broadcast as text data on some VBI lines, which are referenced by pointers on line 1, field 2. The recording waveform is identical to the E.I.A., line 21, field 1–2 waveform. The text data format is similar to the E.I.A., line 21 Text Mode Data Services and the Extended Data Services. However, the data is encrypted before being sent. The following data format allows for future expansion.

Pointer

FIG. 30 is a schematic view showing the format for the pointer packet data broadcasted in the VBI for auxiliary information. The pointer packet is similar to the E.I.A. line 21 field 2 Supplemental Data Location packet. It is used as a pointer to point to another VBI line. Four to thirty-two informational characters are used to indicate the line number where the information is located. A pointer packet data packet 2605 has the following symbols: start code, type, additional ID, pointer description (1) and pointer (1) through pointer description(m) and pointer (m), stop code and check sum.

Table VIII shows the length in bytes and the value for each symbol. The start code indicates the packet is either a new pointer packet (by the value 07 hex) or a continuation packet of the prior packet (by the value 08 hex). The pointer description and the pointer for each of the m pointers have the same data format. The additional number ID symbol further identifies that the packet is an indexing pointer packet to further distinguish it from other data service systems that may co-exist on line 21, field 2. For multiple line application, the sequence of the Pointers within a given kind of packet indicates the VBI data sequence to be used to re-assemble the data at the receiving end. The checksum is the modulo 128 sum of the packet from the start code to the stop code.

TABLE VII

| Symbol | Length (Bytes) | Value |
| --- | --- | --- |
| Start Code | 1 | 07 hex |
|  |  | 08 hex |
|  |  | (continuation packet) |
| Type | 1 | 7C hex |
| Additional ID | 2 | ASCII 'G'; ASCII 'S' |
| Pointer Description (1) | 1 | 61 hex D(N) |
|  |  | 62 hex TP |
|  |  | 63 hex PRI |
|  |  | 64 hex CSPG |
|  |  | 65 hex VM |
| Pointer (1) | 1 | bits 6-5 (Field): |
|  |  | 0 0 not used |
|  |  | 0 1 odd field |
|  |  | 1 0 even field |
|  |  | 1 1 both fields |
|  |  | bits 4-0 |
| (Line Number) |  | Lines 10–25 |
| * | * | * |
| * | * | * |
| * | * | * |
| Pointer Description (m) | 1 | Same as pointer description (1) |
| Pointer (m) | 1 | Same as pointer (1) |
| Stop code | 1 | 0F hex |
| Checksum | 2 | 00 hex - 7F hex |

CSPG/PRI Packet Data Format

FIG. 31 is a schematic view showing the format for the CSPG/PRI packet data recorded in the VBI as pointed to by the pointer in line 21 of the VBI. The CSPG and PRI packets are similar in structure and are differentiated by the type code. The packet 2606 comprises the symbols: start code, type, usage, information, stop code and check sum. Table VIII shows the length in bytes and the values for the symbols.

The CSPG and PRI packets are encrypted before they are encoded onto the VBI. The data stream contains an even number of bytes. An error correction code assures data integrity at the receiving end. A 4 byte long lead-in code on two consecutive VBI lines signifies the start of an encrypted data stream. The decryption circuitry may use it to either reset all or synchronize its decode circuitry or decode algorithm as necessary. Multiple packets may be cascaded back to back for encryption. The encrypted data stream is concluded by a 4 byte long termination code on two consecutive VBI lines. For the encrypted and error correction coded data stream, all 8 data bits may be used. The data slicer/decoder ignores the parity check error detected on the encrypted data.

The CSPG and PRI packets contain displayable text information. When received, these packets are stored according to their types in different locations of the memory. As described above in conjunction with FIG. 12, the RAM 33 contains a PRI packet data temporary buffer and a PRI packet data storage buffer. In addition, the RAM 33 has a CSPG buffer. The CSPG buffer preferably has at least 9600 bits of memory. The PRI storage buffer preferably has at least 7680 bits of memory. The PRI temporary buffer preferably has at least 15,360 bits of memory. As described above, both buffers operate as temporary buffers in a circular mode in which the old data packet data is overwritten by new packet data that is received. Similarly, the CSPG packet data buffer is also a temporary buffer wherein the old packet data is overwritten by new packet data received. Referring again to FIG. 31, the information field contains displayable text characters, non-displayable control characters and non-displayable attribute characters. The control characters and attribute characters are executed immediately upon receipt. A control character or an attribute character remain effective until it is overwritten by the same control character or an attribute character of a different value.

A default mode is defined for each type of control code and attribute. The default is effective at the start of a new data stream. Within the data stream, the default remains effective until it is overwritten by a control character or an attribute character.

The general form of the information field is as follows:
CRTL ATTR displayable . . . displayable ATTR displayable . . .

Table IX shows the control codes and attributes. The basis embodiment includes the default control codes and attributes. The control codes and attributes for the default mode are the basic types and preferably at least these types that are implemented. Alternately, the indexing VCR 10 may use the optional control codes and attributes.

Alternatively to Table VIII, the character generator may determine the number of rows and columns in the full page and half page mode.

The telephone number attribute indicates that the data is a telephone number. The microprocessor controller 31 transmits this number to a remote controller that has telephone capability. The user may press dial on the remote controller and automatically call the goods or service provider. The product description attribute indicates that the associated text is a description of the product including a phone number that may be used to describe the product when calling a provider of the product. The question number attribute indicates that the associated text is a number for the question of a game show. The number is in a coded format. The VCR stores in the RAM the question number with the user's answer. This information is transferred at a later time to a contest coordinator who determines from the user's answer the user's score or prize.

Other miscellaneous text display related control codes include a Tab code for causing the cursor to shift right three spaces until it reaches the right most column. An indent control code causes the cursor to shift three spaces from the beginning of a new line. A new line control code causes the cursor to go to the beginning of the next line. A CSPGEra control code causes the CSPG packet to be erased from the memory buffer. A PRIEra control code causes the last received PRI packet to be erased from the memory buffer.

TABLE VII

| Symbol | Length (bytes) | Value |
|---|---|---|
| Start Code | 1 | 0D hex |
| | | 0E hex for continuation packets. |
| Type | 1 | 7B hex CSPG |
| | | 7A hex PRI |
| Usage | 2 | Byte 1 |
| | | bit 0: 0 storable |
| | | 1 non-storable |
| | | bit 1: 0 store in temporary buffer. |
| | | 1 store in external RAM |
| | | bit 2: 0 print to printer |
| | | 1 print to IR |
| | | bits 3–5: expansion |
| | | bit 6: 1 |
| | | Byte 2 |
| | | bits 0–5: expansion |
| | | bit 6: 1 |
| Information | 2–128 | 00 hex: no-operation byte |
| Stop Code | 1 | 0F hex |
| Checksum | 2 | 00 hex - 7F hex |

TABLE IX

Control and attribute codes

Control codes

Test display size

| | |
|---|---|
| 10r × 24c (Default) | 1D 5C |
| 15r × 32c | 1D 5D |
| don't care | 1D 5E |

Text page size

| | |
|---|---|
| Full page (Default) | 1D 40 |
| Half page | 1D 42 |

Test display mode

| | |
|---|---|
| Pop-on style (Default) | 1D 43 |
| Scroll up style | 1D 44 |
| Single line "crawl" style | 1D 45 |

Character set:

| | |
|---|---|
| Standard line 21 character set (default) | 1D 46 |
| Extended character set (as defined in the Draft EIA-60B) | 1D 47 |
| Japanese Character set I. | 1D 48 |
| Japanese Character set II. | 1D 49 |
| PRC Character set GB 2312-80. | 1D 4A |
| Korean Standard Character set: KSC 5601-1987 | 1D 4B |

Print Destination

TABLE IX-continued

Control and attribute codes

Control codes

| | |
|---|---|
| Disable (Default) | 1D 4E |
| Print to IR port. | 1D 4F |
| Print to serial port. | 1D 50 |
| Print to IR and serial port. | 1D 51 |

Miscellaneous

| | |
|---|---|
| Tab (3 spaces) | 1D 52 |
| Indent (3 spaces) | 1D 53 |
| Newline | 1D 54 |
| CSPGEra | 1D 55 |
| PRIEra | 1D 56 |

Attribute codes

Color

| | |
|---|---|
| Blue background white characters. (Default) | 1C 40 |
| Optional background and foreground color (color combination: broadcaster selectable) | 1C 41 |
| | **** |
| | 1C 4A |

Character set

| | |
|---|---|
| Normal size (Default) | 1C 4B |
| Double size | 1C 4C |

Printable

| | |
|---|---|
| Printable (Default) | 1C 4D |
| Non-printable (hidden). | 1C 4E |

"PLUSCODE ™" Number

| | |
|---|---|
| Non-"PLUSCODE ™" Number (Default) | 1C 4F |
| "PLUSCODE ™" Number | 1C 50 |

Telephone Number

| | |
|---|---|
| Non-telephone number (Default) | 1C 51 |
| Telephone number | 1C 52 |

Product description

| | |
|---|---|
| Non-product description (default) | 1C 53 |
| Product description | 1C 54 |

Question number

| | |
|---|---|
| Non-question number (Default) | 1C 55 |
| Question number | 1C 56 |

Electronic coupon

| | |
|---|---|
| Non-electronic coupon (Default) | 1C 57 |
| Electronic coupon | 1C 58 |

Keyword

| | |
|---|---|
| Not keyword (Default) | 1C 59 |
| Keyword | 1C 5A |

Others

Reserved

VM Packet

FIG. 32 is a schematic view showing the VM packet used for video magazines. A VM packet 2607 comprises the symbols: start code, type, PID, stop code, and check sum. Table X shows the length in bytes and values for the symbols. As described above, in connection with FIG. 21, during the broadcast of video magazines, a set of VM packets are transmitted in the VBI within the program to trigger the indexing VCR 10 to record VISS marks on the control track and TP packets on line 19 of the VBI and create a corresponding directory that is stored in the RAM 33. The VM packets are located on at least one VBI line which is referenced by a pointer on line 21, field 2 of the VBI. The pointer packet data format is described above in connection with FIG. 30 where the pointer description equals 65 hex, which indicates a VM packet. The checksum is the modulo 128 sum of the packet from the start code to the stop code.

TABLE X

VM PACKET

| Symbol | Length (Bytes) | Value |
| --- | --- | --- |
| Start Code | 1 | 0D hex |
| Type | 1 | 79 |
| PID |  | same as line 21, field 2 ID packet less start code, type code, end code and checksum |
| Stop Code | 1 | 0F hex |
| Checksum | 2 | 00 hex - 7F hex |

In an alternate embodiment, the VM packet does not include a PID symbol. Instead, the directory is transmitted as a D(N) data packet in the VBI. Consequently, the video magazine is transmitted as a PR tape except that the indexing VCR adds the VISS marks in response to the detection of the VM packet.

Operation

Referring to the flow-chart shown in FIG. 33, when a cassette tape 40 is loaded into the VCR 1, the microprocessor controller 31 is interrupted (step 2710). The microprocessor controller 31 then performs a check to see whether the inserted cassette tape is an enhanced cassette or a standard cassette (step 2711). An enhanced cassette is a cassette provided with a secondary memory for storing directory information; however, if the VCR is implemented in such a way that directory information is stored on the cassette tape (e.g. control track or VBI), step 2711 can be skipped. Depending upon the implementation, the secondary memory can either be a semiconductor memory or a magnetic strip carried by the cassette. The test can be performed in any one of many techniques, including the techniques described above, i.e. detecting for presence of an electrical conductor or a light-reflective material on the cassette, or reading a predefined code on the magnetic strip.

If the cassette is an enhanced cassette, the feature control field FTCNTL 1013 in the operation flags of the RAM 33 is filled. Other control parameters, such as the length of the cassette tape 1012, and access parameters (e.g. bit density of a magnetic strip) of the secondary memory is read and stored in appropriate fields in the operation flags (step 2712).

The microprocessor controller 31 then locates a directory from the secondary memory (step 2713). If the VCR is implemented in such a way that directory information is stored on the cassette tape, or in a library stored in the RAM indexed by a volume number stored on the cassette tape, as previously described, the microprocessor controller 31 may have to activate the motor and mechanical control logic circuit 5 as well as the control and audio track head logic circuit 11 to search for the directory. If the directory information is found (step 2714), it is read into the in-use directory area 1021 (see FIG. 2) in the RAM 33 (step 2715). The directory information is used to fill a screen such as the one shown in FIG. 34a (step 2716). If the cassette is not an enhanced cassette, the microprocessor controller 31 runs the routine shown in FIG. 15 for identifying the tape. (step 2717) If the directory is not found, a blank screen or a warning screen may be shown.

Referring to FIG. 34a, the enhanced screen contains a listing of the titles and lengths of the programs recorded on the cassette. In one implementation, six programs are displayed each time. The programs not shown can be accessed by scrolling or paging, using either the "PG DN" key for scrolling or paging forward or the "PG UP" key for scrolling or paging backward. The enhanced directory screen 1101 comprises several columns. The first column contains the indexes of the displayed programs, each represented by a number of 1–2 digits, with no leading zeros.

In a first embodiment, the index number (or program number) is generated by the microprocessor controller 31. In a second embodiment, the indexing VCR 10 does not generate the index number. The index number is part of the text title. For PR tapes or video magazines, the program or section numbers are included as part of the text. This allows the publisher to control the layout of the display. In a third embodiment, the indexing VCR 10 generates the index number for HR tapes and the broadcaster/publisher generates them for video magazines and PR tapes. Alternatively, a "bullet" symbol may be used instead of a program number.

The second column contains the titles of the programs. A title can have a length of up to 32 characters. Valid characters are alphabets from A–Z in upper case, numerals 0–9, and punctuation marks such as

| | |
| --- | --- |
| comma (",") | period (".") |
| semicolon (";") | colon (":") |
| exclamation mark ("!") | at/each ("@") |
| pound sign ("#") | slash ("/") |
| question mark ("?") | space (" ") |

The title may be obtained from the VBI. Optionally, it may be input by the user (e.g. entry #3). If a recorded program has no accompanying title information broadcasted in the VBI, the broadcast date and time of the program are used as the title (e.g. entry #4). When a tape segment has no program recorded thereon, the corresponding second column shows the word "BLANK" (e.g. entry #2). The last entry of the second column has an entry with the word "END" in the title field (entry #5). If the tape is a blank tape, "END" would be the only entry on the screen.

The third column contains the lengths of the corresponding programs, each represented by a number (1–3 digits long) indicating the number of minutes of the corresponding program. If the cassette is blank, the screen would show a single "END" entry and the corresponding length field would equal the total length of the cassette. If there is no blank space between the last program on the tape and the end of the tape, a zero will be displayed in the length field of the "END" entry.

Optionally but advantageously, the screen also shows the current operating speed of the VCR; that is, whether the VCR is set at SP, LP, SLP, etc. Moreover, in one implementation of the present invention, if the operating speed of the VCR is changed, respective lengths of the programs will be recalculated and displayed with the recalculated value.

Identifying A Recorded Program

The enhanced tape allows a user to select a program from the directory screen for playback by entering the corresponding number of the program as displayed on the first column of the enhanced screen and then press the "PLAY"

key. For example, to watch program number #3, the "3" key and the "PLAY" key are pressed in sequence.

Figure 33A:
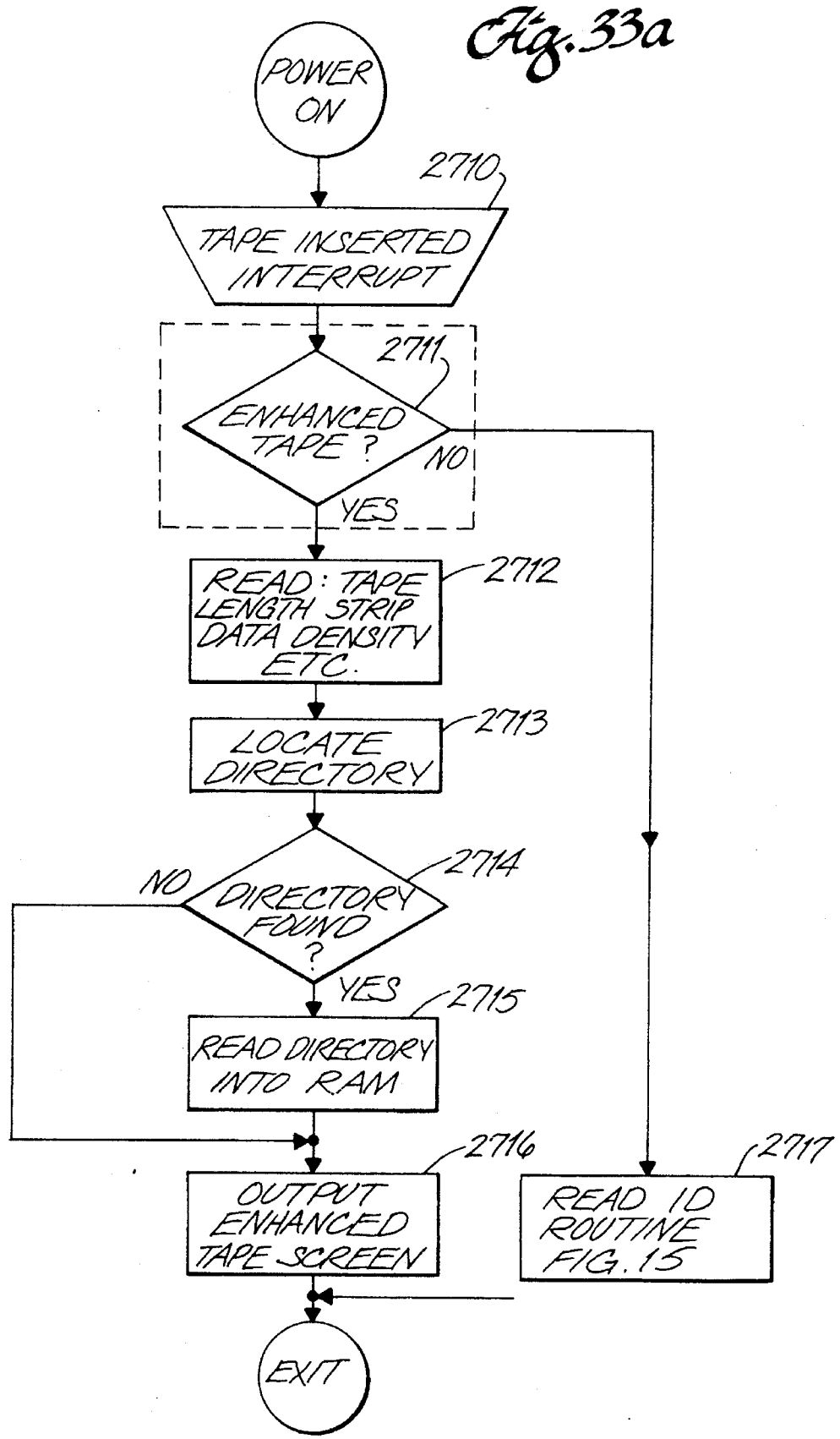
FIG. 33a is a flow chart showing the steps performed by the controller when an enhanced tape is inserted into the VCR embodying the present invention.
Figure 33B:
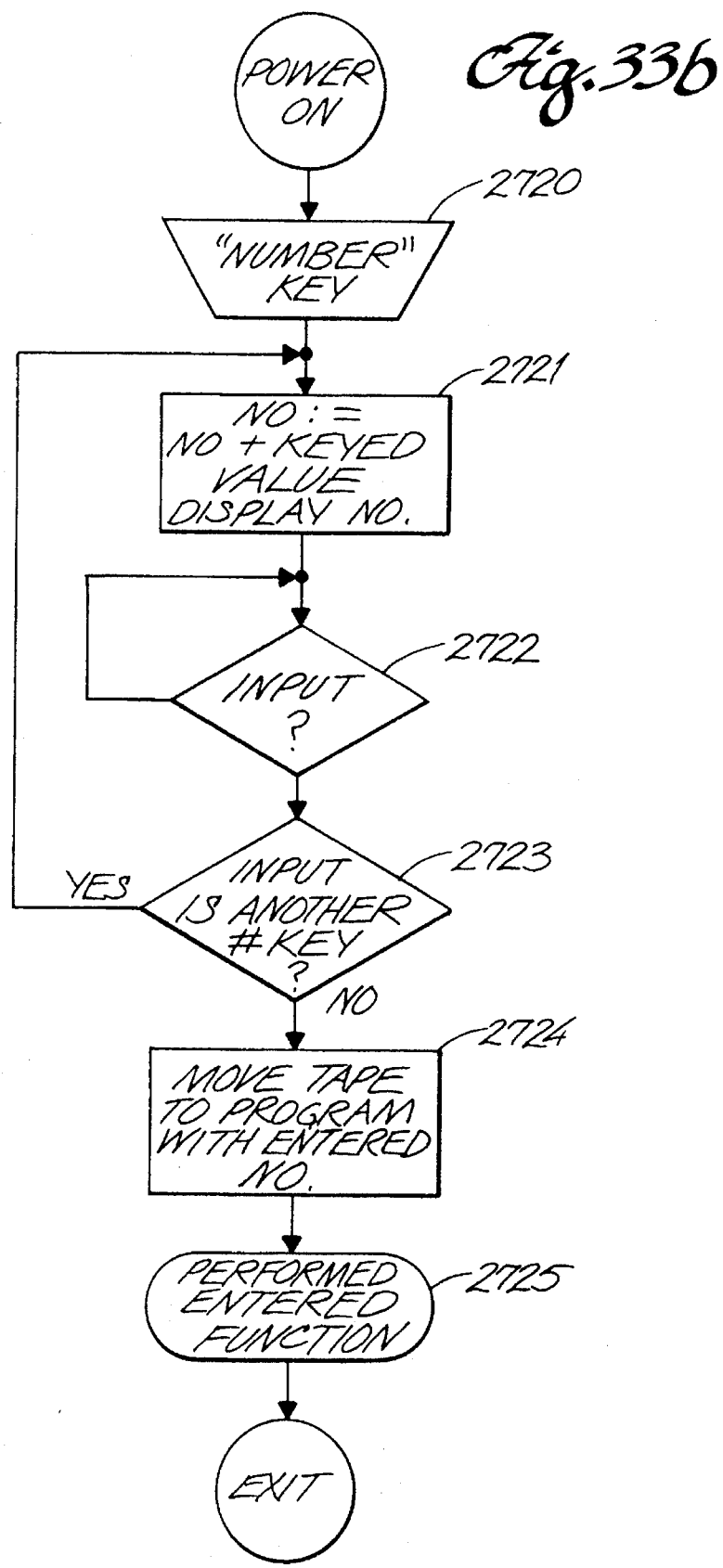

Referring to FIG. 33b, when the microprocessor controller 31 receives a number key (step 2720), it retrieves a variable ("NO.") and adds the entered number by concatenating it to that variable (step 2721). The microprocessor controller 31 then waits for another key input (step 2722). When a key is entered, the microprocessor controller checks to see if the newly-entered key is another number key (step 2723). If the newly-entered key is another number key, its value is again added to the variable "NO." Typically, the number is added by shifting "NO." by one digit and adds the newly-entered number thereto (step 2721). The microprocessor controller 31 waits for a non-number key (e.g. "PLAY", "RECORD") to be entered (step 2722). When a non-number key is received, the microprocessor controller 31 checks to see if the tape is positioned at the program with the input number. If the tape is not positioned at the selected program, either a rewind or a fast forward operation is performed, depending on the current position of the tape, to move the tape to the beginning of the program having the input number, and a screen, such as FIG. 34b, is displayed (step 2724).

After the tape is moved to the selected program, the function specified by the non-number key is then performed (step 2725).

Playing A Recorded Program

Figure 33C:
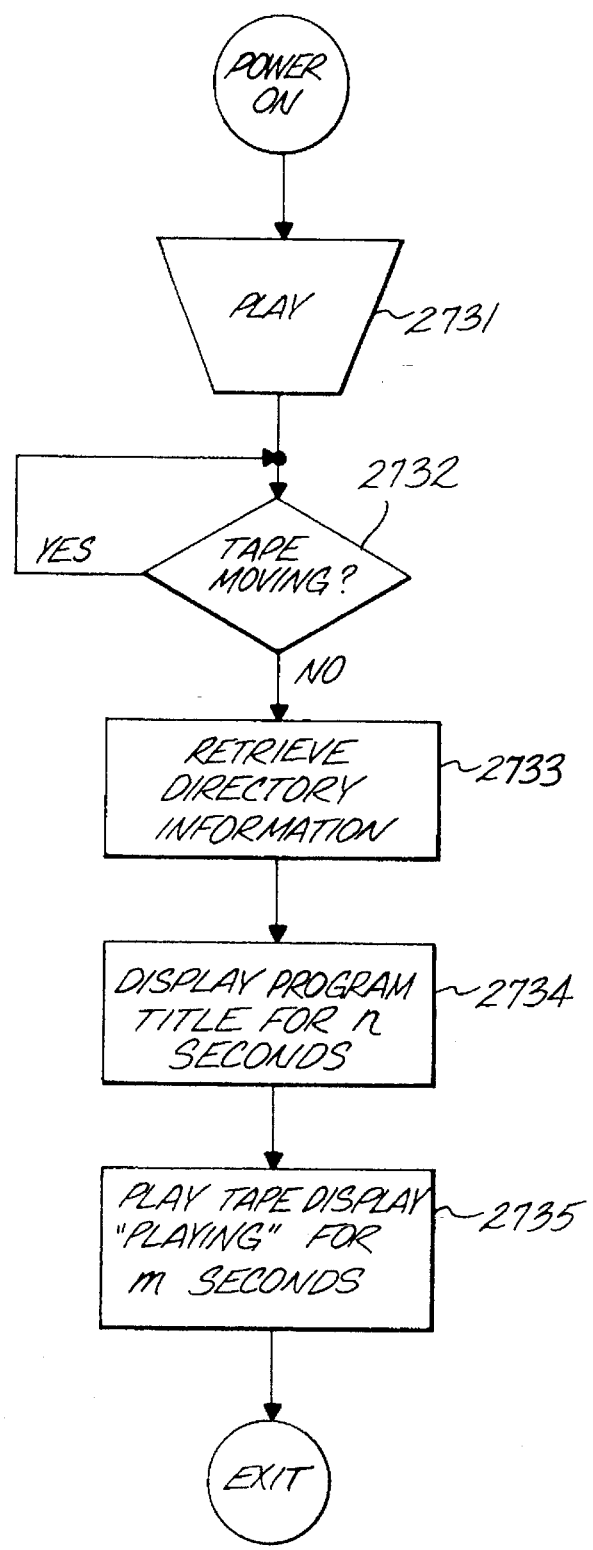

Referring to FIG. 33c, when the "PLAY" key is pressed (step 2731), the microprocessor controller 31 waits until the tape stops moving (step 2732). When the tape stops, the microprocessor controller 31 retrieves directory information of the program (step 2733) and displays it on a screen (step 2734) as shown in FIG. 34c for a few seconds. Thereafter, the microprocessor controller 31 initiates the VCR to play the cassette (step 2735). The time of occurrence of the play command and the title of the viewed program are stored in the monitoring data memory 33c of the RAM 33. Optionally, in the first few seconds after the tape is started, the word "PLAYING" is displayed on the screen (step 2735). The VCR continues to play the tape until it reaches the end or until it receives a STOP command. The time of the occurrence of the stop command is stored in the monitoring data memory 33c.

Instant Recording

Instant recording is an option which allows a user to record a program for a selected length of time. The option can be initiated at any time instant, whether the user is watching a television broadcast or a taped program. Referring to the flow-chart shown in FIG. 33d, when the microprocessor controller 31 is interrupted by the RECORD key (step 2741), it displays a screen, such as FIG. 34d, to prompt the user to enter the length of recording desired (step 2742). The length can be entered as a three-digit number representing the number of minutes desired (step 2743). Numbers with less than three digits are appended by leading zeros, either automatically or manually, depending on the implementation. The entered numbers are confirmed by the "ENTER" key (step 2744). If three zeros are entered, they are interpreted as a "CANCEL" command (step 2745).

Instant recording may be initiated when the tape is positioned within a recorded program, within a blank space, or at the end of the tape (step 2746). When the microprocessor controller 31 receives the "ENTER" key, it checks the current tape position against the tape directory (step 27410).

Figure 33E:
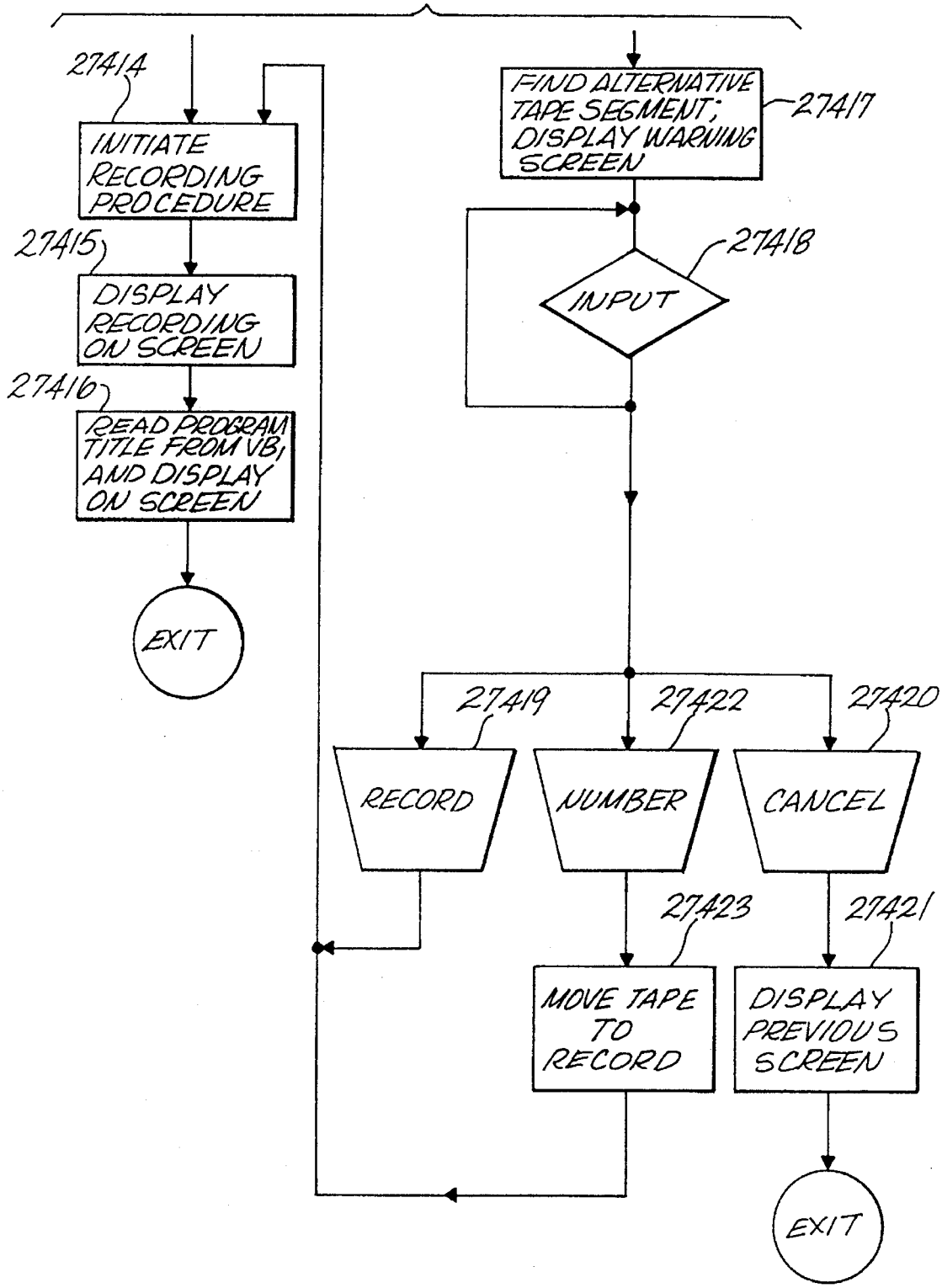

If the current tape position is at a blank area which has a length equal to or longer than the entered length of the recording (step 27411), the microprocessor controller 31 initiates a Recording Procedure to record the program (see FIG. 33e).

Referring now to FIG. 35a, there is shown a flow chart illustrating the general steps of the Recording Procedure. When an appropriate tape segment is found, the address of the segment is passed to the Recording Procedure. In step 3000, the microprocessor controller 31 stores the current value of the tape counter. In step 3001, the microprocessor controller 31 calls a VBI Decode Procedure to set up the VBI decoder 60a in order to obtain program information (e.g. title) from the VBI.

Referring now to FIG. 35b, there is shown a flow chart illustrating the general steps of the VBI Decode Procedure. The VBI Decode Procedure has two parameters, a VBI line number (LINE#) and a VBI field number (FIELD#). The microprocessor controller 31, in response to these parameters, sets the VBI decoder 60a to decode line 21 and field 2 of the VBI (step 3101).

When the VBI decoder 35a detects VBI line 21 and field 2, it interrupts the microprocessor controller 31 (step 3102) and passes the value of line 21 and field 2 of the VBI to it.

Referring back to FIG. 35a, after the microprocessor controller 31 initiates the VBI Decode Procedure, it sets the VCR 1 to record (step 3002). When the microprocessor controller 31 is interrupted by the VBI decoder 60a, it receives the output from the VBI decoder and checks the control code and type code of the output (steps 3003 and 3004). If the control code is "01" and the type code is "03", the microprocessor controller 31 reads the VBI output and puts it into the "program title" field of the corresponding directory entry (step 3005). If the control code is "01" and the type code is "04", the microprocessor controller 31 reads the VBI output and puts it into the "program type" field of the corresponding entry (step 3006). If the control code is "01" and the type code is "05", the microprocessor controller 31 reads the VBI output and puts it into the "program audience" field of the corresponding entry (step 3008). If the control code is "07" and the type code is "01", the microprocessor controller 31 reads the VBI output and stores it in a temporary time-of-day variable (step 3007).

The microprocessor controller 31 then checks to see if the program title from the VBI is a blank (step 3009). If so, then it puts the date, time and channel of the program into the program title field of the directory entry (step 3010). The time of occurrence of the recording and the title of the program being recorded (or date-time-channel if there is no title in the VBI) are recorded in the monitoring data 33c.

Figure 35C:
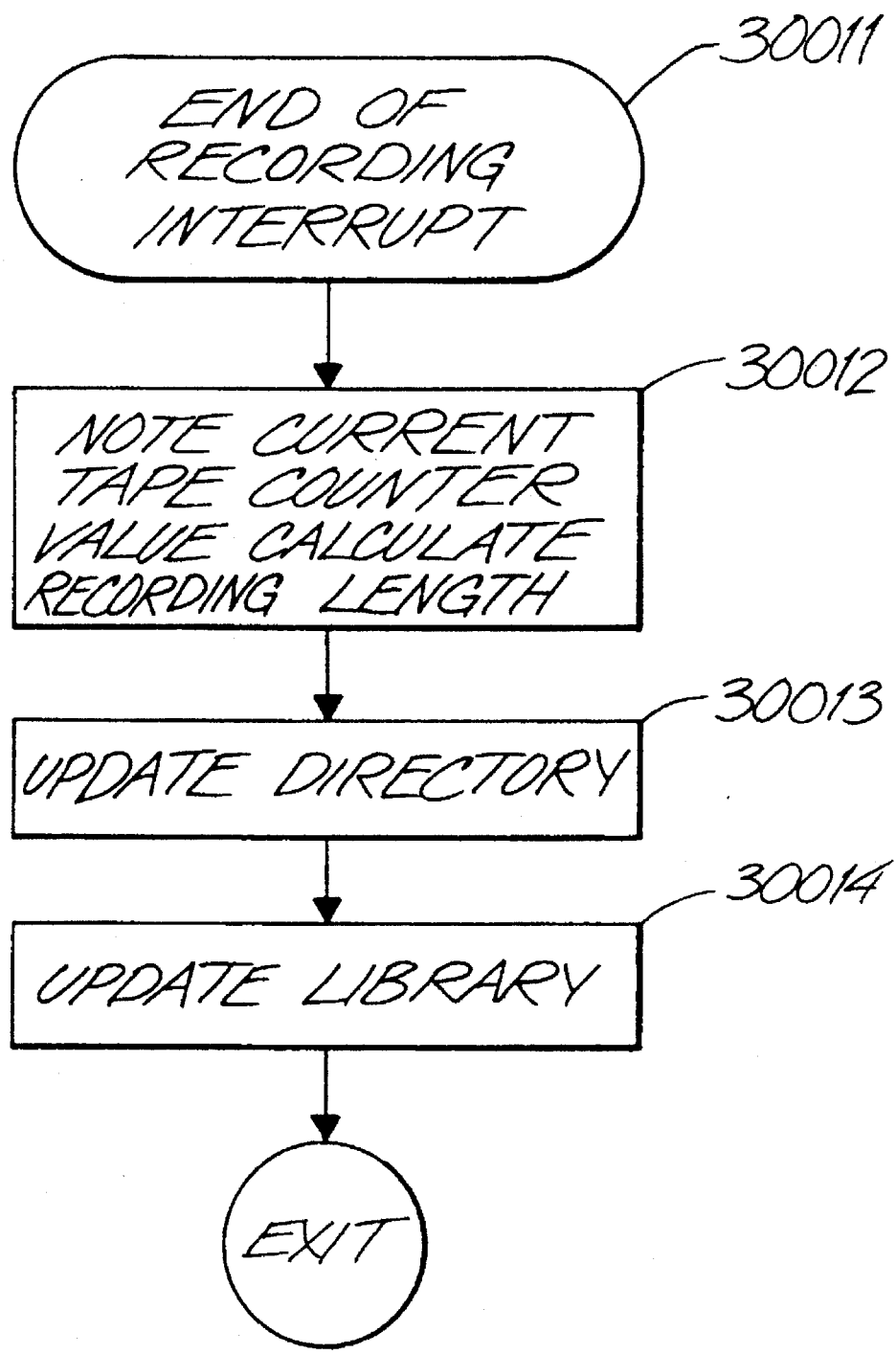

Referring to FIG. 35c, when the recording finishes, the microprocessor controller 31 is interrupted (step 30011). It then notes the current value of the tape counter and subtracts it from the value stored at the beginning of the recording to find the length of the recorded program (step 30012). In step 30013, the directory of the cassette is updated. In step 30014, if there is an entry in the VCR library for the tape (as will be described below), the library is updated.

Referring now to FIG. 33e, optionally, when the screen is showing a broadcast program, the microprocessor controller 31 indicates the recording procedure (step 27414) and displays the word "RECORDING" (step 27415) on the lower part of the screen. Moreover, if the program title is transmitted, it is read and displayed on the screen (step 27416) next to the word "RECORDING".

Referring back to FIG. 33d, if the current position of the tape is at a non-blank segment (step 27412) or if the current position is at a blank segment but the blank's length is shorter than the length of the desired recording (step 27413), the microprocessor controller 31 performs a search procedure to select the directory for an appropriate segment for performing the recording. The appropriate segment can be selected in several ways. One way is to search, starting from the beginning of the directory, for the first blank segment whose length is longer or equal to the requested length of the recording. If the programs recorded on the tape are as shown in FIG. 34f and the required length of the recording is 20 minutes, segment #4 (length=120 minutes) will be selected. However, such selection would cause inefficient use of the tape. Therefore, another way is to search the directory for the shortest blank segment whose length is longer or equal to the required length of the recording. Using the example of FIG. 34f, segment #6 (length=24 minutes) will be used. In this way, segment #4 can be used for recording a longer program.

Returning to FIG. 33e, after the microprocessor controller 31 searches for an appropriate segment, it displays a warning screen, such as the screen shown in FIG. 34e, on the screen (step 27417), suggesting to the user to perform the recording on segment #6.

After the warning screen of FIG. 34e is displayed, the microprocessor controller 31 monitors for an input from the user (step 27418). If the user presses the RECORD key (step 27419), the microprocessor controller 31 then performs operations described in steps 27414, 27415 and 27416 described above. If the user presses the CANCEL key (step 27420), the recording is cancelled and the previous screen is displayed (step 27421). If the user presses the number key that corresponds to the number shown on the screen (step 27422), the microprocessor controller 31 moves the tape to the position corresponding to the entered number (step 27423) and starts recording. When the tape is moved, a screen such as FIG. 34b is shown.

In any of the various modes of instant recording, the microprocessor controller 31 stores in the monitoring data 33c the title of the program and the time of the record command and the stop command.

VCR PLUS+™ Recording

The VCR can optionally be initiated to perform a "PLUSCODE™" number recording, in a similar way as a VCR PLUS+™ remote controller from Gemstar Development Corporation of California. "PLUSCODE™" number recording is also described in U.S. patent application Ser. No. 07/676,934 filed Mar. 27, 1991 and is incorporated herein by reference. "PLUSCODE™" and VCR PLUS+™ are trademarks of Gemstar Development Corporation. "PLUSCODE™" number recording is initiated by a "VCR PLUS+™" key, which can be performed at any time, even when a broadcast or a recording is being watched, or when a rewind or fast forward operation is in progress, or when there is no cassette tape loaded in the VCR.

Figure 33F:
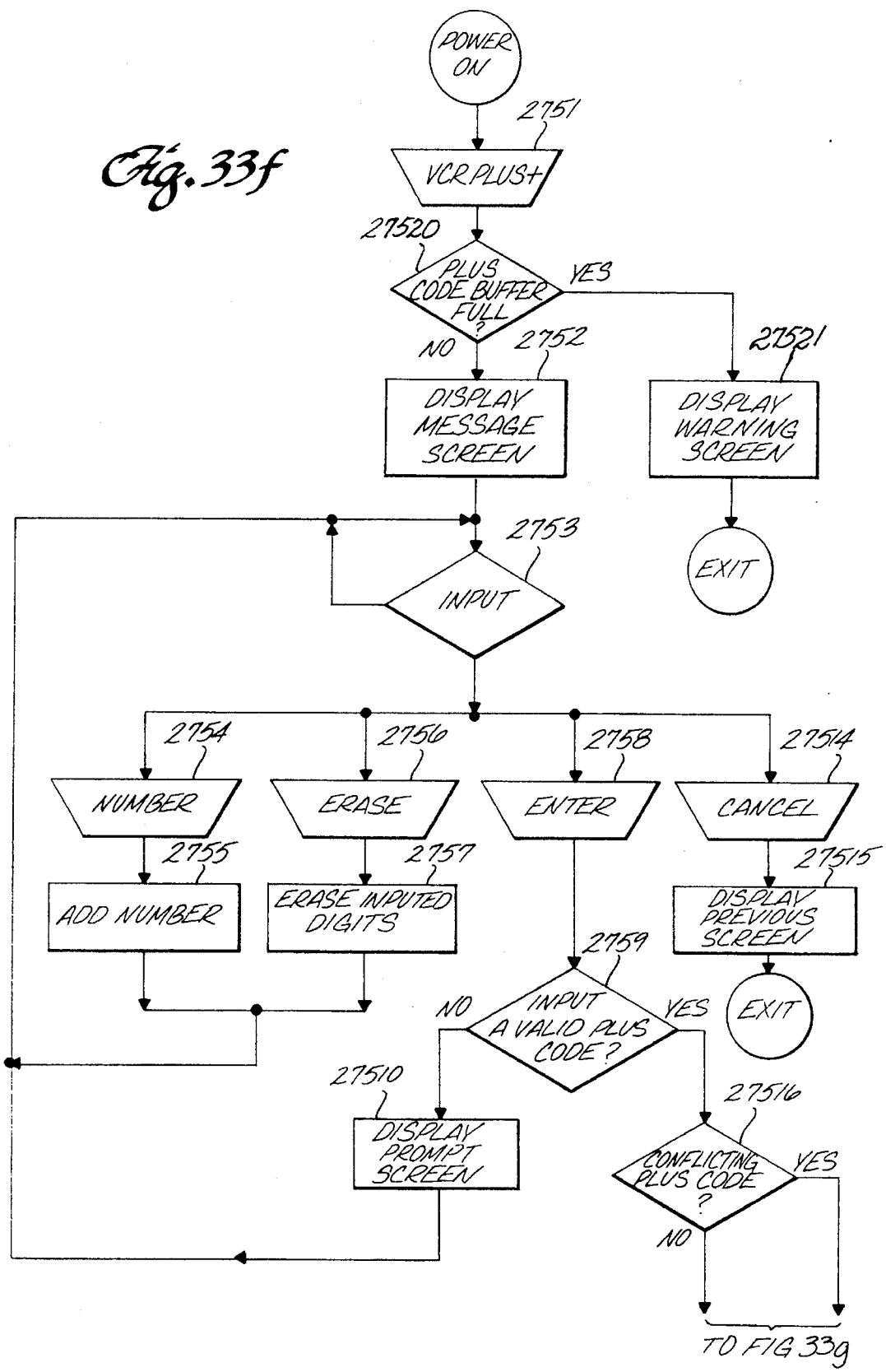

In a specific implementation, enough memory space is provided in the CDTL buffer 1024 for storing eight "PLUSCODE™" number settings. Referring to FIG. 33f, when the microprocessor controller 31 is interrupted by the VCR PLUS+™ key (step 2751), it first checks whether the CDTL buffer 1024 is full (step 27520). If the buffer is not full, the microprocessor controller 31 displays a screen, such as FIG. 34g, on the television screen (step 2752). The microprocessor controller 31 then waits for an input from the user (step 2753). If the input is a number key (step 2754), it is added to the entered digits (step 2755). If the input is the ERASE key (step 2756), the already-received digits are erased (step 2757). If the input is the ENTER key (step 2758), the microprocessor controller 31 checks whether the input is a valid "PLUSCODE™" number (step 2759).

If the input is an invalid "PLUSCODE™" number, a screen such as FIG. 34h is displayed to prompt the user to re-enter the "PLUSCODE™" number (step 27510). If the "CANCEL" key is pressed (step 27514) under that screen, the "PLUSCODE™" number recording is cancelled (step 27515).

If the "PLUSCODE™" number is valid at step 2759, a check is made to determine whether there is a "PLUSCODE™" number conflict (step 27516). A conflict occurs when the "PLUSCODE™" number setting is for a recording which will occur at the same time as another scheduled recording. Referring to FIG. 33g, if there is no conflict, a prompt screen such as FIG. 34i is displayed (step 27511). The user can then press:

"1" to set the recording for once only;

"2" to set the recording weekly;

"3" to set the recording every weekday.

Pressing any key other than these three keys would have no effect (step 27512).

Upon receiving one of these three keys, the input is saved (step 27513), a confirmation screen is displayed for confirming the recording data, such as channel number Date (MM/DD/YR)

Start Time (in either 24-hour or in 12-hour AM/PM format)

Stop Time (in either 24-hour or in 12-hour AM/PM format)

Recording option, that is, whether the recording is to be performed once, weekly or daily.

If the data on the confirming screen is correct, the user presses the "ENTER" key and the recording is set. The time of occurrence of the enter command for the "VCR PLUS+™" programmer recording and the "PLUSCODE™ number are stored in the monitoring data 33c. If the data is incorrect, the user can press the "CANCEL" key to re-enter the "PLUSCODE™" number.

If the CDTL buffer 1024 is already full when the "VCR Plus+™" key is pressed, a warning screen such as FIG. 34j is displayed (step 27521). The warning screen advises the user that the buffer is full and that he needs to delete a program from the buffer before another program can be added. Under FIG. 34j, the user is advised that he review the list of programs stored in the CDTL buffer 1024 so that he/she can delete one or more setting to make room for the new setting. The user is also advised that he can press the "CANCEL"" key to exit "PLUSCODE™ number recording.

"PLUSCODE™" number settings can be reviewed by pressing the "REVIEW" key. A review operation can be performed at any time and can even be performed when there is no tape in the video player. With reference to FIG. 33k, when the microprocessor controller 31 is interrupted by the REVIEW key (step 2761), it retrieves all the "PLUSCODE™" number settings (step 2762) from the CDTL buffer 1024. Based upon the data, a screen such as FIG. 34k is displayed (step 2763).

If the REVIEW option is entered as a result of a full CDTL buffer 1024 during the VCR Plus+™ operation, the screen of FIG. 34k would list eight programs.

On a review screen, each entry would comprise the following columns:

Number of the entry. This number is used for ordering and reference. "PLUSCODE™" number settings are listed in chronological order so that the program to be recorded first will appear at the top of the screen and the programs to be recorded last will appear at the bottom of the screen.

Channel number of the program to be recorded.

Date of the program, expressed in MM-DD format. If the program is to be recorded daily (i.e. Monday to Friday), the letter "D" would appear immediately to the right of the date. If the program is to be recorded weekly, a letter "W" would appear immediately to the right of the date.

Time of the program. This information is expressed in 24-hour clock and in HH:MM format. Alternatively, the information may be expressed in 12-hour AM/PM clock format.

Length of the set recording. This information is expressed in number of minutes.

Tape status. This information is displayed when a tape having the enhanced features is used. The microprocessor controller 31 checks the feature control field (FTCNTL) to see if an enhanced tape is inserted (step 2764). If the inserted tape is an enhanced tape, the microprocessor controller 31 searches the directory to see if there is a blank segment for each setting (step 2765). If there is enough blank space on the tape to accommodate a setting, the word "OK" is written in the sixth column of the corresponding entry (step 2766). If there is not enough blank space on the inserted tape for the corresponding setting, the word "NO" will appear in this field. The value in this field may change if a different tape is inserted for the new tape has different amount of blank space.

After the review screen is displayed, the microprocessor controller 31 waits for an input from the user (step 2767). Referring now to FIG. 33l, when the user enters a number key (1–8 in the example of a full CDTL buffer noted above) (step 2768), the corresponding entry is selected (step 2769). If the user then presses the ERASE key (step 27610), the selected entry is deleted from the CDTL buffer 1024 (step 27611). If the "REVIEW" key is pressed again under the review screen (step 27612) or if the tape is ejected from the VCR, the review operation is terminated.

Referring back to step 27516 of FIGS. 33f and 33g, if the newly-entered "PLUSCODE™" number conflicts with an existing "PLUSCODE™" number, a screen such as FIG. 34l is displayed which shows such data as the channel, date, start time and stop time of both the new setting and the existing setting (step 27517). The microprocessor controller 31 then waits for the user to press the CANCEL key (steps 27518 and 27519). If the "CANCEL" is entered, the new "PLUSCODE™" number is erased and the "VCR Plus+™" programmer recording operation is re-started (by going back to step 2753). The time of occurrence of the cancel command and the "PLUSCODE™" number are stored in the monitoring data 33c.

A timer is kept in the indexing VCR. Whenever the timer is empty, the microprocessor controller 31 puts the starting time of the first "PLUSCODE™" number entry (if one exists) into the timer. When the timer equals to the time-of-day clock 31a, the microprocessor controller 31 is interrupted, which will then execute the Recording Procedure described above.

Library

In the specific embodiment of the present invention, a user is given the option to create a library of the directories for a set of selected tapes. Storage space is created in the RAM 33 for storing the library. The storage space of the library is divided into more than one group of entries, each for storing the directory of a tape (or a volume). A volume ID of the corresponding tape is stored in a predetermined location of each entry.

The library option is initiated when the "LIBRARY" key or the index key is pressed. The key can be pressed at anytime, such as when the user is recording a broadcast program or watching a recorded program from a cassette. Moreover, the key can be pressed when there is no cassette in the VCR.

Figure 33H:
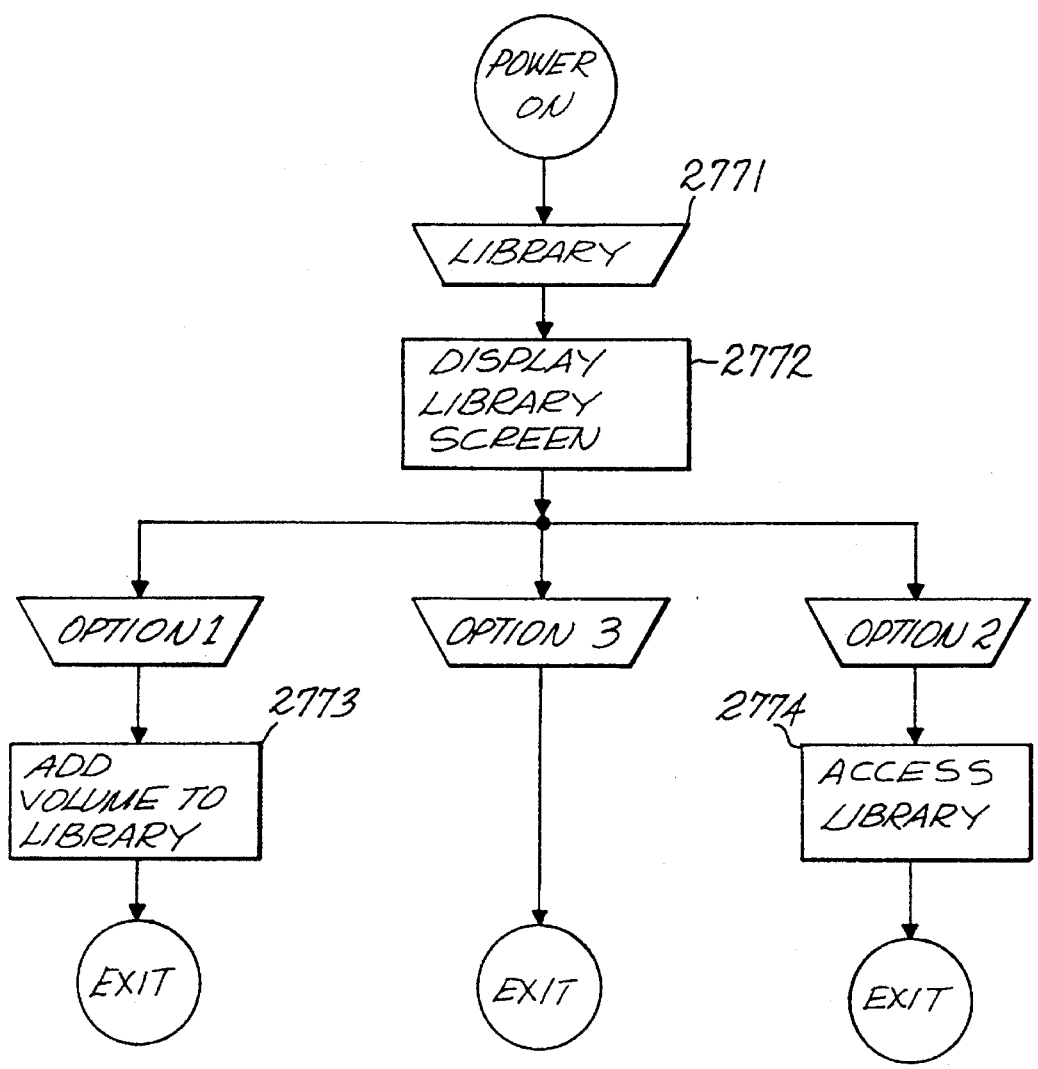

Refer to FIG. 33h, when the microprocessor controller 31 is interrupted by the LIBRARY key (step 2771), it displays a screen such as FIG. 34o to prompt the user to enter one of two options (step 2772). Option 1 is an option to add a tape directory into the library, it can be selected only when a enhanced cassette is loaded in the VCR (step 2773). The option is typically used when a user adopts an indexed tape from a friend or wants to add a PR tape to the directory stored in the RAM 33. Option 2 is an option which allows the user to access content of the library and is typically selected by the user to search for a special program or a special type of program (step 2774).

Figure 33I:
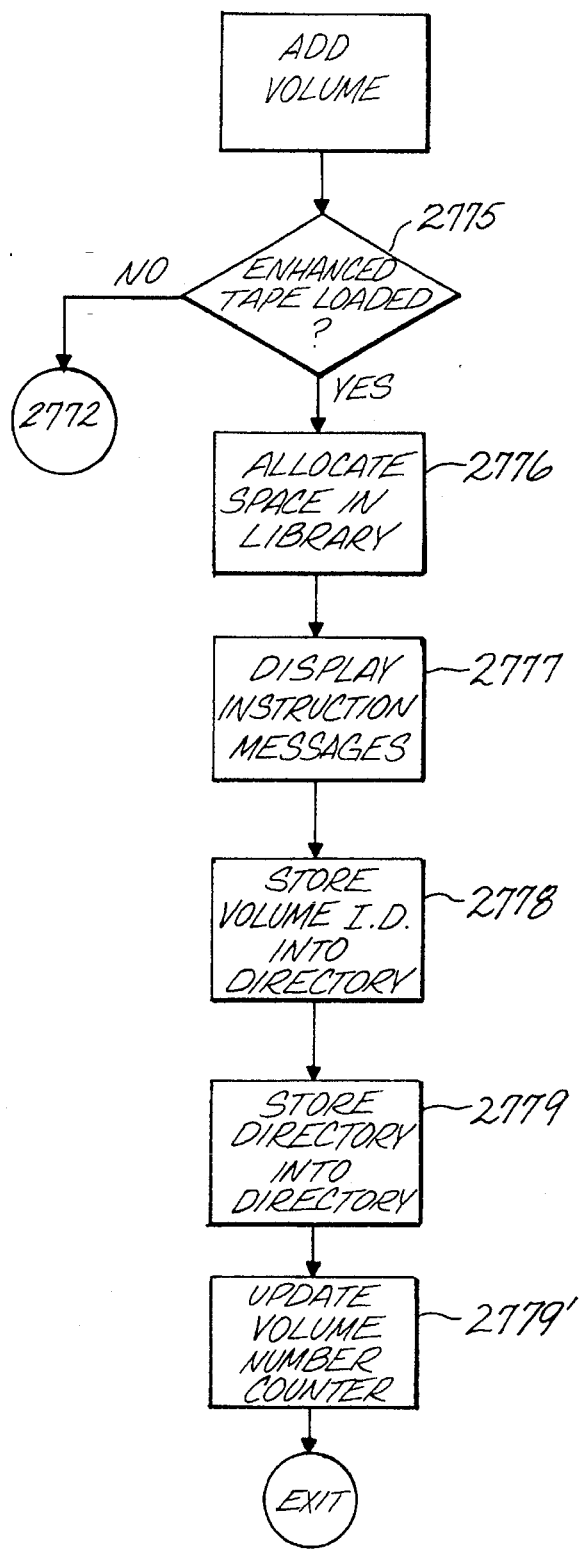

With reference to FIG. 33i, when Option 1 is selected, the microprocessor controller 31 detects whether a cassette is loaded in the VCR (step 2775). If no cassette is loaded, the microprocessor controller 31 displays a message, such as:

"THIS OPTION NEEDS AN INDEXED TAPE"

on the screen and returns to step 2772 of FIG. 33h. If an enhanced cassette is loaded in the VCR, the microprocessor controller 31 will allocate space in the library area for adding the directory (step 2776). In one implementation, the microprocessor controller 31 then prompts the user to enter an volume label. In a preferred implementation, a Volume Number Counter 1016 is kept in the RAM 33, (e.g. inside the operation flags area). This counter 1016 stores the next volume number to be assigned to a newly-added tape. When execution of the add option begins, the microprocessor controller 31 takes the next volume number (assuming for purposes of illustration that it is 59) from the Volume Number Counter and assigns this volume number to the tape. Advantageously, if the library is implemented in such a way that each directory has a fixed amount of memory space, the volume number of a tape can be used as index to address the corresponding directory from the library.

In step 2777, the assigned volume number is displayed on the screen, accompanied by a message such as:

"THE VOLUME NUMBER ASSIGNED TO THIS TAPE IS 59"

"PLEASE AFFIX LABEL TO CASSETTE WITH THIS NUMBER"

For convenience, numbered stickers are provided from cassette manufactures and packaged with a new cassette. The user can then use the appropriate sticker(s) to label the cassette and/or its case.

The microprocessor controller 31 then stores the assigned volume number into a predetermined location (VOL ID) of the cassette's directory (step 2778). The VOL ID field in a directory can be used as an indication to the microprocessor controller 31 that such directory is stored in the library, so that the library can be updated if the directory is changed (e.g. when a recording is performed). The microprocessor controller 31 then writes the directory into the allocated library area (step 2779) and increments the volume number counter as the directory is successfully added to the library (Step 2779').

Although the indexing VCR 10 assigns tape numbers, the user can renumber the tapes. In an alternate implementation, the microprocessor controller 31 displays as part of the library menu an option entitled Change Tape Number. Using the cursor and the enter keys, the user renumbers selected tapes. The microprocessor controller 31 verifies that there is no number duplication. This number is preferably changed before recording the program. This feature is useful when multiple tapes are required for a single show, such as a three part mini-series that is recorded on different tapes.

Figure 33J:
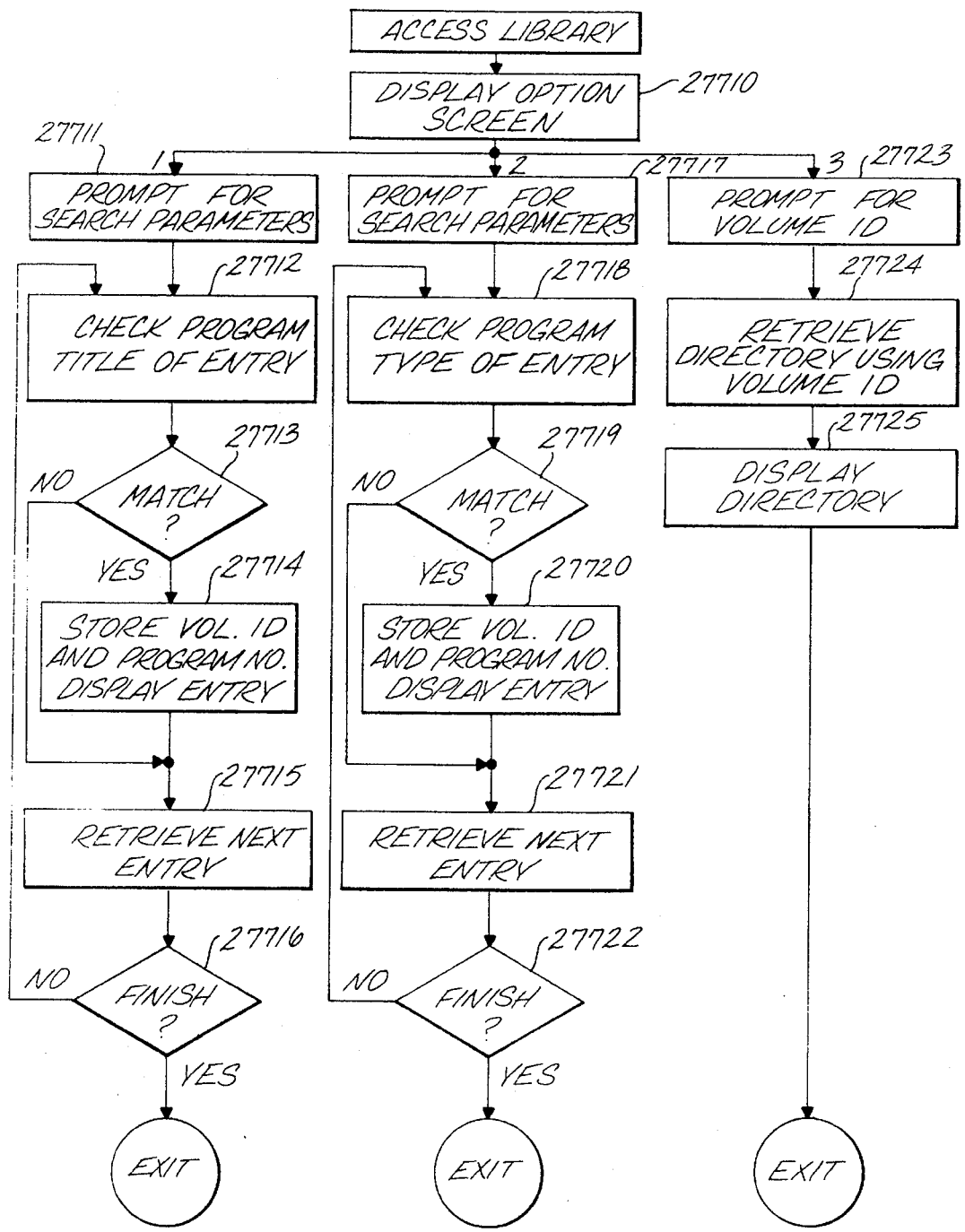

When Option 2 is selected at step 2774 and referring now to FIG. 33j, a screen such as FIG. 34p is displayed (step 27710). The user is given three options. Under the first option of FIG. 34p, the user can search for programs with specific program titles or subtitles (for example, programs which have a title containing the word "Yankee" or which has a letter "Z" "CA", etc.) (step 27711). Under the second option of FIG. 34p, the user can search a specific type of programs (e.g. a sports program) (step 27717). Under the third option of FIG. 34p, the user can display the directory of a particular tape volume (step 27723).

When option 1 of FIG. 34p is selected, the microprocessor controller 31 prompts the user for the search parameters by displaying the following message on the screen:

"PLEASE ENTER THE SEARCH TITLE/CHARACTERS"

Upon receiving the input, the microprocessor controller 31 searches through the directories of the library (step 27712). For each entry that matches the search request (step 27713), the microprocessor controller 31 displays the entry's program title and volume number (step 27714). The entry's volume number and program number within the directory are stored in a search buffer. The microprocessor controller 31 retrieves the next entry (step 27715) until it finishes (step 27716)

When option 2 of FIG. 34p is selected, the microprocessor controller 31 prompts the user for search parameters by displaying the following message on the screen:

"PLEASE ENTER THE TYPE OF PROGRAMS FOR THE SEARCH"

Advantageously, if the user does not remember the type classification, he can press a HELP key and all the available types are listed on the screen. When the user enters the type, the microprocessor controller 31 searches through the directories of the library. For each entry which matches the search request (step 27719), the microprocessor controller 31 displays the entry's program title and volume number (step 27720). The entry's volume number and program number are stored in a search buffer. The microprocessor controller 31 retrieves the next entry (step 27721) until it finishes (step 27722).

Option 1 and option 2 can be combined. When an option is finished, the user can press the "C" key before he selects the next option. The microprocessor controller 31, in response to such key sequence, performs the search using the content in the search buffer, removing from the search buffer those entries that do not match the parameters of the second search. For example, if the first search is for sports programs and results in filling the search buffer with address of entries that have a program type of "sports". If the user then press the "C" key and then selects option (1) to search of the word "YANKEE" in the program titles, the entries stored in the search buffer that do not have the word "Yankee" in the program title field are deleted. The user can continue the search for several times. When the second search is completed, the entries that remain in the search buffer are displayed.

When option 3 of FIG. 34p is selected, the microprocessor controller 31 prompts the user for the volume number by displaying the following message on the screen:

"PLEASE ENTER THE VOLUME NUMBER"

When the volume number is entered, the microprocessor controller 31 uses the volume number as index to retrieve the corresponding directory (step 27724). When the directory is retrieved, its entries are displayed on the screen (step 27725).

Auxiliary Information

In one specific implementation of the present invention, the VBI is used to transmit auxiliary information relating to a program being broadcasted. One example of the auxiliary information is the channel-date-time-length (CDTL) information or "PLUSCODE™" number information of a related program. Another example of the auxiliary information is ordering information and/or more detail description of a product shown in a commercial.

The use of the auxiliary information is now illustrated with reference to FIG. 36. Assume that a network 3201 is broadcasting a prime time movie. At certain intermissions of the movie, the network introduces an upcoming program (e.g. a miniseries). Assuming that the upcoming show will be broadcasted for three consecutive days starting two weeks later (say, January 1) and will be broadcast at 9:00 pm for two hours each day. Normally, excerpts of miniseries are shown during the intermissions. When the excerpts 3202 are broadcasted, the VBI 3203 of the broadcasted signals would contain the CDTL or "PLUSCODE™" number information of the miniseries. The CDTL information or the "PLUSCODE™" number can be put, for example, in the composite packet-1 (i.e. line 21, field 2, control code=01, type code= 0C). A mark, such as a character "I" 3204 flashing at the lower right hand corner of the screen 3205, is shown when the excerpts are shown. The flashing "I" 3204 informs a user that, if the user is interested in recording the miniseries, he can press an I-key and the VCR will be automatically set to record the miniseries using the information broadcasted in the VBI. The VCR indicates to the user that the information has been stored by either stopping the flashing of the "I" or by displaying a message, such as "SAVED"on the screen. Other prompts and the variations in the timing relationship with the program may be used as described above for auxiliary information.

Figure 33M:
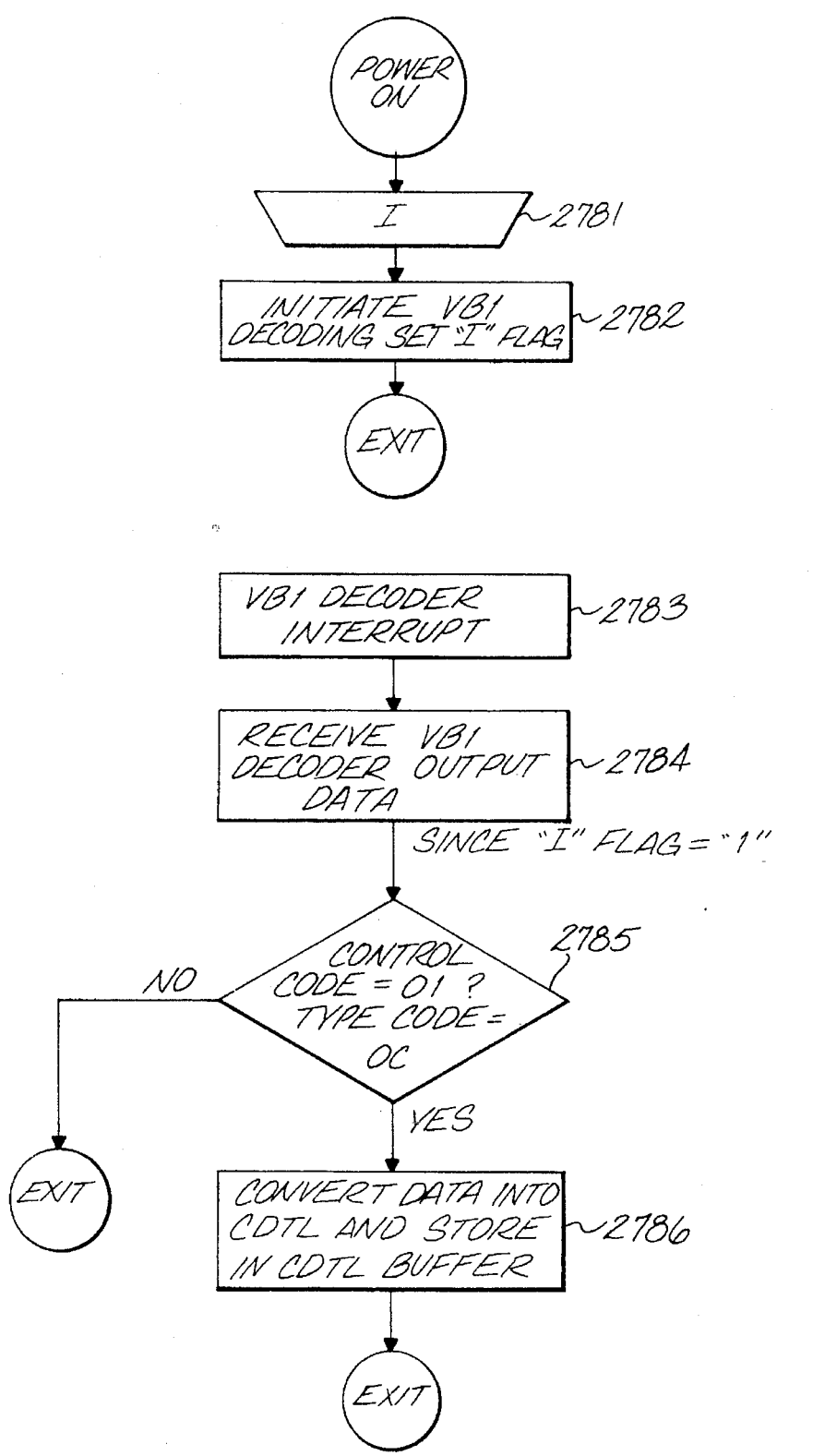

Referring to the flow chart of FIG. 33m, the microprocessor controller 31, upon interruption by the I-key (step 2781), executes the VBI Decode procedure to set the VBI decoder to decode the VBI (step 2782). When the VBI decoder detects VBI line 21, field 2, it interrupts the microprocessor controller 31.

When the microprocessor controller 31 is interrupted (step 2783), it receives the VBI data (step 2784). Since the I-key was pressed, the microprocessor controller 31 checks to see if the control code is equal to 01 and the type code is equal to 0C (step 2785). If so, the VBI decoder output is converted into CDTL data and stored into the CDTL buffer (step 2786).

As another example of the use of the VBI, assume an advertiser would like to present 30 minutes of commercial, including one minute of introductory information and 29 minutes of auxiliary information (e.g. such as ordering instructions) to the audience. While prime time airing may be more effective, its cost is usually high. The present invention allows the advertiser to air the one minute of introductory information at prime time, but provides easy access of the auxiliary information at a less expensive time slot. In the specific implementation of the present invention, the CDTL of the less expensive time slot in which the auxiliary information will be shown is broadcasted in the VBI. When the introductory information is aired at prime time, a flashing "i" is shown on the screen. Responsive to the flashing "i", an interested user can press the i-key and the VCR will be automatically set to record the auxiliary information in the RAM. At a later time, the user can retrieve the auxiliary information and display it on the television. The time of occurrence of both the command to record and to view the auxiliary information and the channel-date-time of the auxiliary information are stored in the monitoring data 33*c*.

Figure 33N:
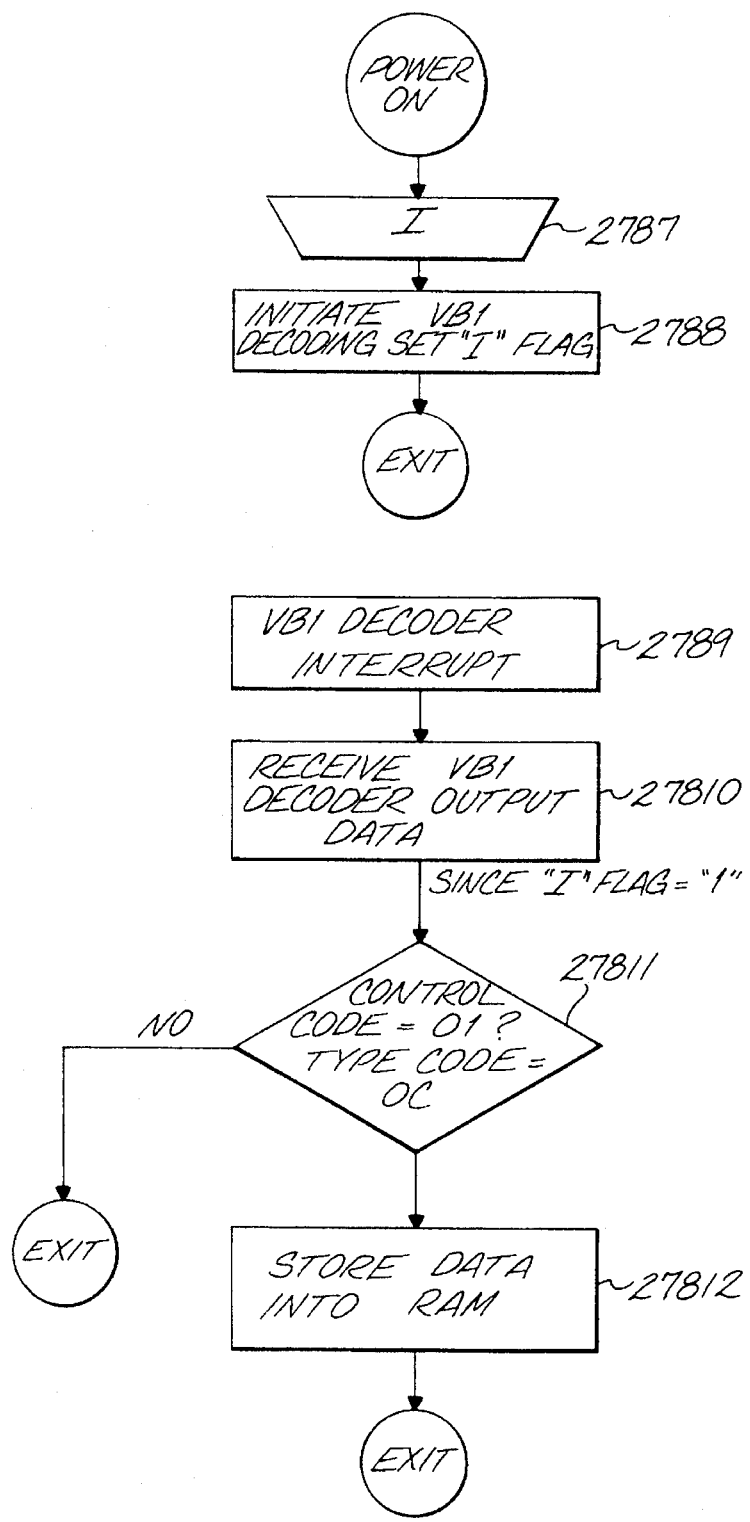

Referring to the flow chart of FIG. 33*n*, the microprocessor controller 31, upon interruption by the i-key (step 2787), executes the VBI Decode procedure to set the VBI decoder 60*a* to decode the VBI (step 2788). When the VBI decoder 60*a* detects VBI line 21 field 2, it interrupts the microprocessor controller 31.

When the microprocessor controller 31 is interrupted (step 2789), it receives the VBI data (step 27810). Since the i-key was received, the microprocessor controller 31 checks to see if the control code is equal to 01 and the type code is equal to 0C (step 27811). If so, the VBI decoder output is stored into the RAM 33 (step 27812). In one implementation, the text information is put in the composite packets 1 and/or 2 of line 21, field 2 of the VBI. In another implementation, the text information is put in the composite packet 1. However, when the text is too long for the packet, a pointer is set in composite packet 2 pointing to the location of the other parts of the text.

Timer Programming

Timer programming allows a show to be recorded on any channel at a later time using the traditional recording features built into the video player. Before programming the VCR with its traditional programming functions, the directory information can be used to set the tape at a specific blank segment. This is accomplished by entering the number corresponding to the blank space and then pressing the "STOP" key. After the user enters the segment number, he can also wait for a time-out, the effects of which is the same as though the STOP key is pressed. In response to the key sequences, the microprocessor controller 31 sets the VCR to rewind or fast forward the tape to the selected position. The user can then set the VCR to conventional timer recording.

Erasing Programs From The Tape

A program can be erased by deleting its entry from the directory. When the tape directory is displayed on the screen, the user enters the number of the program to be erased and then presses "ERASE". The key sequence causes the microprocessor controller 31 to display a screen as shown in FIG. 34*m*. A confirmation screen, such as the one shown in FIG. 34*n*, is displayed whereby the user is asked to confirm the erasure. The user can press "ENTER" to confirm the erasure or "CANCEL" to cancel the erasure. After the program entry is deleted from the directory, the word "BLANK" is filled into the title field. If the newly erased program is preceded and/or followed by a blank segment, the length of this segment will be merged into the newly created blank segment, and the corresponding entry or entries will be merged into one. In one implementation, the program is not actually erased from the tape, but it is only removed from the directory.

The title of the erased program and the time of such erasure are stored in the monitoring data 33*c*.

Positioning The Tape

From the directory screen, the position of the tape can be set in several ways. One way is to enter the number corresponding to the desired position of the tape and then press "STOP". Another way is to enter the number corresponding to the desired position of the tape. If no input is made in a predetermined time interval (e.g. 5 seconds), a timeout will occur and the results are the same as if the user has pressed "STOP". The words "XX STOP" will be displayed on the screen next to the word "COMMAND:". The words "MOVING TO XX" are also displayed (where XX is the number of the selected program). The tape will either rewind or fast forward, depending upon its current position relative the selected position. If the tape is already at the selected position, only the word "XX STOP" will be displayed.

Editing A Program Title

The title of a recorded program can be edited under the directory screen. To edit a program title, the corresponding number of the program is first entered and the "EDIT" key is then pressed. An edit screen is displayed in which the title of the selected program is displayed at the top of the edit screen. Underneath the title are a cursor (represented by a "+" sign) and one or more underscore characters representing the new title. The cursor can be moved backward within the title by pressing the "REWIND" key and forward by pressing the "FF" key. A character in the title can be changed by pressing a key such as the "CH UP" key to scroll the current character forward, for example, from "R" to "S", then to "T", or by pressing a key such as the "CH DN" key to scroll the current character backward, for example, from "Q" to "P" and then to "0". A blank space can be inserted into the title at the cursor position by pressing the "ERASE" key. A character or a character can be deleted from the title by pressing the "" key. When the editing is complete, the "ENTER" key can be pressed so that the new title is stored. After the "ENTER" key is pressed, the directory screen is re-displayed and the new title is displayed in the corresponding entry. To cancel any changes in the program title, the "CANCEL" key can be pressed, whereby the directory screen re-appears and the title of the corresponding program remain unchanged.

Recording Extension

When the VCR is recording a program, there is a possibility that duration of the program may be extended. One obvious example is when the broadcast program is a sports event (e.g. a football game) which goes into overtime. According to one optional improvement of the present invention, when the time of recording, as set by the user, is reached, the VBI is checked to see if the show is extended. The check can be performed in several ways.

By way of example, refer to FIG. 37, when the VCR is recording a program as set, the content of the program title field in the VBI is registered by the microprocessor controller 31 (step 4301). The program title of the program being received is retrieved from the VBI at predefined time intervals (e.g. 15 minutes) (step 4302) and compared against the title previously registered (step 4303). If the scheduled termination time of recording is reached and if the title received from the VBI is not the same as the registered title (step 4304), recording is terminated (step 4305). Otherwise recording continues.

In another implementation, a special code, used for representing whether a show is extended is added to the VBI along with the newly scheduled ending time. These data can then be monitored to detect an extension of the program being recorded.

In yet another implementation, the VCR constantly monitors the program I.D. which contains the program length. The broadcaster updates the program length which the VCR then uses to automatically extend the recording.

Advantageously, the user is provided with an option of whether to use the extension feature.

Most modern video players provide a user with an option of selecting a tape speed for recording and playing operations. The speeds commonly provided are Standard Play (SP), Long Play (LP) and Super Long Play (SLP). A higher speed may provide better recording quality but uses up more tape space. According to another feature of the present invention, the recording speed of the VCR is automatically changed to a lower value when the length of the recording space is less than the length of the desired program. Specifically, when a recording is assigned to a designated tape location, a determination is made on the lengths which the assigned space can record under different speed, as follows:

Length of selected segment/speed(SP)=available time(SP)

Length of selected segment/speed(LP)=available time(LP)

Length of selected segment/speed(SLP)=available time(SLP)

Recording of a program will then be performed in a speed at which the available time is greater than the specified time of recording. If more than one speed is possible, the user is notified and allowed to select the speed of recording. Under another implementation, the highest speed in which complete recording is possible is automatically selected so as to achieve the best recording quality. In another optional implementation, a list of the available blank segments is displayed and the user can then select the segment he wants for recording a program.

Parental Control

FIG. 38 is a flowchart showing the steps employed in the operation of the parental control feature of the indexing VCR. Because programs may be broadcasted that parents do not want their children to view or record, the indexing VCR 10 uses the program category information in the VBI to institute a Parental Control Program for screening out program categories not deemed desirable for the children in the household. The program category may include categories, such as adult shows, that parents do not want their children to view or record. By selecting these categories, the indexing VCR 10 prevents children from viewing or recording these shows. Alternatively, the program category may be recorded in the VBI of a prerecorded tape which when selected by parental control prevents the tape from being played in the VCR. Alternatively, the TID of the PR tape may be flagged in the RAM 33 as being restricted.

During a set up mode of the indexing VCR, the user may impose parental control to prevent a viewer from watching or recording particular television programs or a selected channel. This mode may be entered by selecting from a menu display on the screen 50a, or, alternatively, by pressing a Parental Control Key on the remote controller. As part of the initial set up of the indexing VCR 10, the parent sets a unique password to allow access to setting parental control commands. When the user presses the Parental Control Key and enters the correct password, the indexing VCR 10 displays a list of categories. As the user scrolls through the list, the indexing VCR 10 highlights the selection. By pressing the Parental Control key, the user toggles the category as being restricted (i.e. under parental control) or unrestricted. A restricted program requires the user to enter a password to gain access to the program.

Referring in particular to FIG. 38, the indexing VCR periodically monitors the program being viewed or recorded to prevent access to the restricted categories of shows. The microprocessor controller 31 periodically reads the category code in the program I.D. (step 9802) and compares it to the stored parental control category list. If there is not a match between the category of the program being watched or recorded and the restricted list, the VCR returns to step 9802 to continue monitoring the VBI (step 9804). Otherwise, if the category is restricted, the VCR checks to see if the password flag allows access to the program (step 9806). The password flag is set when the proper password is entered by the user. If the flag allows access, the VCR returns to step 9802 to continue monitoring the VBI (step 9806). The compare between the program being viewed and the parental control flag is done periodically, for example every minute, to prevent long periods of unauthorized viewing before the next comparison.

If the program is restricted, the microprocessor controller 31 stops and disables the VCR (step 9808) and displays on the screen 50a the message "parental control: please enter password to reset" (step 9810). The microprocessor controller 31 ignores VCR control commands and channel number commands. The VCR continuously requests the password to be entered until a proper password is entered (step 9812). Alternatively, the VCR may allow a fixed number of incorrect passwords before ignoring all passwords for a predetermined time. When the correct password has been entered, the VCR restores control to the user (step 9814) and sets the password flag (step 9816). Setting the password flag allows the authorized viewer to continue watching the show or recording it without being periodically interrupted for a password request.

In an alternate embodiment, the controller 31 allows the user to select channels other than those that are forbidden. Alternatively, different passwords allow television shows to be blocked for some viewers such as children under age 13 but allows others, such as children above age 13, to view the shows, while restricting the children above age 13 from watching another show.

The title or program category and the time of the restriction is stored in the monitoring data 33c. In addition, the time of any failed access to a parental controlled program or channel is stored in the monitoring data 33c.

Other Embodiments for Storing the Directory

In two other specific embodiments, directory information are recorded on a secondary memory carried by the cassette. The secondary memory can be a magnetic strip carried on the exterior of the cassette housing. In one such embodiment, the content of the magnetic strip is read/written by a magnetic head that is stationary. In another such embodiment, the magnetic strip is read/written by a magnetic head that is movable over the magnetic track(s) on the strip or alternatively the magnetic track(s) on the strip are movable over the magnetic head. Exemplary implementations of such secondary memories are disclosed in the parent patent application Ser. No. 08/066,666.

Viewing Habit Monitoring Operation

As an overview of the monitoring of user selections, the microprocessor controller 31 constantly monitors the remote signal detector 29 for signals received from the remote controller 75. As described above, commands from the remote controller 75 control the operations of the VCR including tape movement and indexing functions. The microprocessor controller 31 detects the commands from the remote controller 75, processes them, and, for many commands, records the time of occurrence of such commands.

After power turn on and system boot up, during the operations described above, the microprocessor controller 31 continuously monitors the remote signal receiver 29 for the occurrence of an electrical signal representative of user inputted commands and generated in response to detected infrared signals from the remote controller 75. FIG. 39a, (step 3901) Alternatively, the command may be generated by the microprocessor controller 31, in response to an earlier user inputted command. For example, in timer programming of the VCR described above, the VCR is programmed to turn on at a later time to record a program. In the description of FIG. 39, the microprocessor controller command to turn on the VCR is treated as though the command was a record command at that later turn on time. In addition to storing the time of that record command, the microprocessor controller 31 stores the time of the request for timer programming along with the record data as described below. When a remote control command is received (step 3902), the microprocessor controller 31 identifies the received command. As described above, the indexing VCR 10 responds to the received command. In addition, the time of occurrence of the command is monitored and stored in the monitoring data 33c portion of the RAM 33. Yet, some commands that do not affect what the user is watching, such as volume control, are only processed and not recorded. The monitoring of the timer programming command and time of the command for recording from the microprocessor controller to turn the VCR on at the later time are done separately.

Referring again to FIG. 39a, if a record command is detected from the remote control 75 or generated by the indexing VCR 10 (step 3903), the microprocessor controller 31 reads the title of the new program and its channel from the VBI as described above and stores it in the monitoring data 33c portion of the RAM 33 (step 3904). If there is no title in the VBI, the channel-date-time are stored in the monitoring data 33c. The microprocessor controller 31 also reads the clock 31a for the time of the occurrence of the record command and stores such record start time in the monitoring data 33c portion of the RAM 33. In addition, if a program that is previously recorded on the tape is being overwritten by the new recording, the microprocessor controller 31 reads the title of the overwritten program from the directory 33a and stores such title in the monitoring data 33c along with the title of the new program. This provides data on the longevity of programs in the viewer's library.

While the indexing VCR 10 is recording a program, the program being recorded may change during the recording. For example, a viewer may record two consecutive half hour programs. Consequently, thirty minutes into the recording the title of the broadcasted program changes when the second program starts. The microprocessor controller 31 monitors the title of the program being recorded (step 3905). If a new title is detected (step 3906), at step 3904, the microprocessor controller 31 stores the title of the new program, its channel, the start time of the new program, and the title of an overwritten program on the video tape.

If a new program is not detected (step 3906), the microprocessor controller 31 also monitors whether a remote control command has been sent, such as STOP (step 3907). If a remote control command has not been sent, the microprocessor controller continues to monitor the title of the recorded program at step 3905. Otherwise, the microprocessor controller 31 determines the type of remote control command by returning to step 3903 (step 3908).

On the other hand, if the remote control command is a PLAY command from the remote control 75 or commanded by the microprocessor controller 31 in response to a selection made by the viewer while the indexing VCR 10 is in the indexing mode, the microprocessor controller 31 reads the TP data packet (TP data packet plus absolute address in some embodiments) from the VBI of the video tape. From this data packet, the microprocessor controller 31 knows the tape identification number and the program number. For pre-recorded tapes, this information is sufficient for analyzing the program being watched. For home recorded tapes, the microprocessor controller 31 retrieves the title of the program from the directory stored in the RAM 33. The microprocessor controller 31 stores in the monitoring data 33c the title for home recorded tapes for either tape and the tape identification number and program number for pre-recorded tapes and the start play time (step 3910). Alternatively, for prerecorded tapes, the UPC number, which is contained in the TID, may be stored in the monitoring data 33c.

As the tape is being played, the program being viewed may extend beyond the first program into a second program. While the tape is playing, the microprocessor controller 31 monitors the VBI for the program number (step 3911). When a new program number is reached (step 3912), the microprocessor controller 31 stores in the monitoring data 33c the start time of the new program number and the title for home recorded tapes or the program number for pre-recorded tapes at step 3910. Alternatively, by monitoring the time duration, the microprocessor controller 31 determines whether a new program is being played by comparing the elapsed time with the length of the program being viewed.

If a new program number is not detected at step 3912 and neither a remote control nor a microprocessor control command is detected (step 3913), the microprocessor controller 31 continues to monitor the program number at step 3911.

Otherwise if a STOP command is received (step 3914), the microprocessor controller 31 stores in the monitoring data 33c portion of the RAM 33 the time of the command which corresponds to the stop time for viewing the program (step 3915).

If a movement command is received (step 3916), such as fast forward, rewind, pause or slow motion, the tape is still being played but at a different speed or direction. The microprocessor controller 31 stores the time of the command and the TID and program number for PR tapes or title for HR tapes at step 3910.

Otherwise, if a movement command is not received at step 3916, the microprocessor controller 31 returns to monitoring the program number at step 3911 (step 3917).

If the detected command is a stop command from the remote control 75 or the microprocessor controller 31 (step 3918), the microprocessor controller 31 stores in the monitoring data 33c the time of the stop command which corresponds to the stop time for viewing or recording the program at step 3915. Otherwise, the control command is a timer programming command (step 3919), the microprocessor controller 31 stores in the monitoring data 33c the CDTL of the program to be recorded and the time of occurrence of the commands. As part of the timer programming command, the command may be either a record command to program the VCR to record a later viewed program or a cancel command for cancelling the timer program as described above for FIG. 33f (step 3920). The record of the cancelling of the recording is retained in the memory for marketing purposes. For example, this information may be useful to determine the impact of a negative movie review.

Referring now to FIG. 39b, if the remote control command is a PRI command, which is typically initiated by a review command (step 3921), the microprocessor controller 31 determines the type of PRI command.

If the command is a store command (step 3922), the microprocessor controller 31 stores in the monitoring data 33c the time of the store command and the title of the PRI or its date-time-channel (step 3923).

If the command is a play PRI command (step 3924), the microprocessor controller stores in the monitoring data 33c the identification title or number of the PRI and the time of the occurrence of the play PRI command (step 3925). As described above, the viewer may erase the PRI (step 3926) in which case the microprocessor controller 31 stores in the monitoring data 33c the erase time (step 3927). If the viewer's request is to store the PRI (step 3928), the microprocessor controller stores in the monitoring data 33c the time of the store command (step 3929).

Otherwise, if the command is a print PRI command (step 3930), the microprocessor controller 31 stores in the monitoring data 33c the identification number or title of the PRI and the time of the print (step 3931).

Otherwise, if the command is to record the PRI (step 3932), i.e., store the CDTL number corresponding to the advertised program in the commercial, the microprocessor controller 31 stores in the monitoring data 33c the identification number or title of the PRI, for example, the "PLUS-CODE™" number and the time of the record command (step 3933).

If the command is a command that alters the contents of the directory, such as erase a program or tape from the directory (step 3934), the microprocessor controller 31 stores in a monitoring data 33c the title of the erased program or tape and the time of the erase command (step 3935).

Parental control commands as described above in FIG. 38 are also monitored (step 3936). The type of command, the title of the program, or program category for restricted categories, such as adult movies, and the time of the command are stored in the monitoring data 33c (step 3937).

Otherwise, the time of other remote control commands that do not effect the movement of the tape or change the direction, such as volume, is not recorded. Accordingly, the remote command is ignored and the microprocessor controller returns to monitoring for the next remote command at step 3901 (step 3938).

The operation of monitoring viewing and recording video magazines, including program guides, is similar to prerecorded tapes except, as described above in FIG. 23, that the subtitle directory of the magazine is read from the tape into the RAM 33 after the tape is advanced to the magazine. Accordingly, the microprocessor controller 31 executes the routine of FIG. 39 once the directory of the video magazine is read from the tape.

The structure of the monitoring data may include, for each viewed or recorded program, a title, a viewed flag, a record flag, a start time flag, a stop time flag, a select time flag for timer recording, and a cancel time flag for recording.

The structure of the monitoring data for auxiliary information may include flags for title, a PRI type, a store time, a play time, an erase time, a print time, and a timer record time.

The flag system comprises multiple bits that are encoded to indicate the frequency of selection, recording, viewing. Alternatively, the flags may be multiple bits where the extra, parental control, daily recording, weekly recording, and a single recording are each represented by a single bit. Again, this data is recorded for marketing information.

Viewer Habit Data Collection

As described above, the microprocessor controller 31 monitors which programs are viewed and recorded on video tape and stores in the RAM 33 such monitored data. The microprocessor controller 31 is capable of recording all user commands and selections. When the user records a tape on a first day, the microprocessor controller 31 stores such viewing information. When the viewer watches the tape on a subsequent day which may be months or years later, the microprocessor controller 31 monitors and records the time of such viewing. Various methods for collecting this information may be used.

In one embodiment, the microprocessor controller 31 is programmed to output the viewing habit data on a periodic basis. For example, the data may be outputted on a daily basis. The microprocessor controller 31 determines whether the audit period has ended. At the end of each audit period, the microprocessor controller 31 retrieves a telephone number from the RAM 33 and provides it to the output interface 72.

In one embodiment, the output interface 72 comprises a modem and DTMF tone generator. The output interface 72 provides DTMF tones corresponding to the telephone number over a telephone line in a manner well known in the art. Upon receipt at a remote analyzing site 73, the remote site 73 provides commands, such as DTMF signals or fax tones, to indicate to the indexing VCR that a hand shaking is occurring. In response thereto, the microprocessor controller 31 commands the output interface 72 to respond with appropriate handshaking signals. After handshaking is completed, the microprocessor controller 31 recovers the viewing habit data from the RAM 33 and provides it to the output interface 72, which in turn provides the habit data over the telephone line to the external site 73.

If a dedicated telephone line is not used and the telephone is being used at the end of the audit period, the microprocessor controller 31 periodically checks the telephone line, such as every 15 minutes, to determine whether the line is available. When the line becomes available, the microprocessor controller 31 commences the hand shake and data transmission steps described above.

Alternatively, the external device 73 may be a floppy disk drive on which the habit data is recorded. The microprocessor controller 31 then instructs the viewer, by displaying on the video screen 50, instructions for returning the disk physically to either a collection point, such as a video rental store, or to mail the disk to the response center.

In interconnected indexing VCR systems, one VCR may be designated as a master VCR. At the end of each audit period, the master VCR sends commands over the bus to the other VCR commanding the other VCR to retrieve the habit data from its RAM 33 and send such data over the bus back to the master VCR. The master VCR executes the download of data to the viewing habit response data collection system as described above.

In yet another alternative embodiment, the microprocessor controller 31 can provide the habit data to a printer for making hard copies of such data.

Although the collection of the habit data has been discussed in terms of marketing use, the information may be used for other purposes. For example, parents may want to know the viewing habits of their children. By reading the data from the RAM 33, the microprocessor controller 31 displays the times that the VCR was operated or the particular programs that were being watched. By using unique passwords for individual children, the parents can track the viewing habits of each child.

Automatic Time Setting

As described above, the monitoring system records the time of occurrence of predetermined remote control commands. Consequently, the clock of the indexing VCR 10 must be properly set for the time data to be of value to the analysts. To set the clock, the indexing VCR 10 constantly monitors line 21 field 2 of the VBI—the designated line by Extended Data Services for broadcasting the date and time—for the date and time broadcasted therein. The indexing VCR 10 resets the clock to the received date and time. Clock resetting for changes between standard time and daylight time is done automatically. The indexing VCR 10 also detects power interruptions. After the occurrence of a power interruption, the indexing VCR 10 also resets the clock.

Alternatively, the monitoring does not have to be constant, but can be done periodically, such as once a day, once a week, or once a month.

Alternatively, the clock may be reset by a telephone call that provides the current time.

Although the embodiment of the indexing VCR 10 is described in terms of the components thereof as being included in the indexing VCR, the invention is not so limited. Various components of the indexing VCR may be integral to the VCR, a television, a cable box, separate therefrom or any combination.

While the invention has been described and preferred embodiments disclosed, it is anticipated that other modifications and adaptations will occur to those skilled in the art. It is intended therefore, that the invention be limited only by the claims appended hereto.

What is claimed is:

1. A video tape player for monitoring user selection habits of a plurality of video tapes, each video tape containing a plurality of programs, a first type of video tapes having a title information symbol on a predetermined interval of the tape for each program on the tape, the video tape player comprising:

a clock for providing a time;

means for moving the video tape;

a magnetic head for detecting the plurality of programs recorded on the video tape and the title information symbols on the first type of video tape and a plurality of programs recorded on a second type of video tape;

a detector for receiving user inputted commands for controlling the movement of the video tape, the user inputted commands comprising a start play command to start moving, in a longitudinal direction, the video tape proximate to the magnetic head so that the magnetic head can detect said programs on the video tape and a stop play command to stop moving the tape;

a controller coupled to said detector for commanding the moving means in response to said detected user inputted commands and reading the time of occurrence of said detected user inputted commands;

a first memory for storing a title information symbol for each program on the second type of video tape;

a second memory for storing the title information symbol and the time of occurrence of said detected user inputted commands; and means for providing the contents of the second memory to an external analyzer in response to a download command.

2. The video tape player of claim 1 wherein said predetermined interval of said video tape signals comprises a vertical blanking interval of said broadcast video tape.

3. The video tape player of claim 1 further comprising:

a receiver capable of receiving broadcast video signals;

a decoder coupled to said receiver for decoding signals contained in a predetermined interval of said broadcast video signals to produce information signals;

means for displaying on a TV receiver an icon to alert a user to the presence of information signals and for displaying a code to be entered by a user for storing the information signals;

a third memory;

means, responsive to the user entered code, for storing in the third memory the information signals; and, means responsive to a user input for displaying for review the stored information from the information signal; and means for storing in the second memory the time of occurrence of any of said user inputs.

4. The video tape player of claim 1 further comprising a controller for providing the download command upon a match between the clock time and a predetermined time.

5. The video tape player of claim 1, wherein the providing means is a telephone interface.

6. The video tape player of claim 1, wherein the title information symbol on the first type of tape is a UPC number.

7. A method for monitoring information for analyzing user selection habits of viewing programs recorded on video tape, the method comprising the steps of:

(a) monitoring for record or play commands from either user inputted commands or a microprocessor controller in an indexing VCR;

(b) if a play command is detected,
  (1) reading from a directory, a title of a program retrieved from the video tape;
  (2) reading the time of the receipt of the play command;

(c) if a record command is detected,
  (1) reading from a video signal a title of a program being broadcasted that is to be recorded on the tape;

(2) reading the time of the receipt of the record command;

(d) monitoring for a stop play or stop record command from either user inputted commands or the microprocessor controller;

(e) reading the time of the receipt of the stop play or stop record command;

(f) storing in a memory the title, start time, stop time, and either a play flag or a record flag corresponding to whether a play or record command was received; and (g) providing to an information analyzer the stored information contents of the memory.

8. A method for monitoring information for analyzing user selection habits of viewing a program on a plurality of video tapes played on a VCR having stored in a memory a directory of the programs corresponding to the plurality of video tapes, the method comprising the steps of, (a) monitoring for record or play commands from either user inputted commands or a microprocessor controller in an indexing VCR;

(b) if a play command is detected, flagging in the directory the time that the program was played;

(c) if a record command is detected, flagging in the directory the time that the program was recorded;

(d) providing the contents of the memory to an information analyzer; and (e) determining user selection habits from the contents of the memory.

9. A method for monitoring user habits of viewing an electronic television guide with video clips, the television guide comprising a list of broadcasted programs as a video picture in the form of a grid recorded in repeating frames on the video track of a tape at selected intervals, a plurality of full motion picture video clips, single video clips associated with one of the listed programs recorded in an interval between frames of listed programs, and information recorded in the VBI of the video picture of the list of programs on the video track, the information recorded in the VBI including information for locating on a display a cursor for highlighting a listed program, an address on the tape of the video clip associated with the highlighted program, and a code associated with the highlighted program for preprogramming a VCR for recording the highlighted program, the method comprising the steps of:

detecting a user selection command;

if the user selection command is a preprogramming command, storing in a memory the code and the time of the user selection command; and if the user selection command is a play command, storing in the memory the address associated with the highlighted program and the time of the user selection command.

10. An interconnected video tape player system for monitoring user selection habits of a plurality of video tapes, each video tape containing a plurality of programs, a first type of video tapes having for each program on the tape a title information symbol on a predetermined interval of the tape, the system comprising:

a bus;

a plurality of video tape players, each being coupled to the bus for receiving and sending data and commands between players, one of the players being designated as a master player and the other players being designated as slave players, each player being identified by a unique player identifier, each player comprising:

a clock for providing a time;

means for moving the video tape;

a magnetic head for detecting the plurality of programs recorded on the video tape and the title information symbols on the first type of video tape and a plurality of programs recorded on a second type of video tape;

a detector for receiving user inputted commands for controlling the movement of the video tape, the user inputted commands comprising a start play command to start moving, in a longitudinal direction, the video tape proximate to the magnetic head so that the magnetic head can detect said programs on the video tape and a stop play command to stop moving the tape;

a controller coupled to said detector for commanding the moving means in response to said detected user inputted commands and for reading the time of occurrence of said detected user inputted commands;

a first memory for storing a title information symbol for each program on the second type of video tape; and a second memory for storing the title information symbol and the time of occurrence of said detected user inputted commands;

the master player further comprising:

means for providing the contents of the second memory to an external analyzer in response to a download command, and a second controller for providing bus commands to the bus, the bus commands including a memory transfer command and a player identifier, and for storing in the second memory of the master player data received on the bus in response to the memory transfer command;

each slave player further comprising means for providing to the bus the contents of the second memory in response to said memory transfer command and said player identifier when said identifier matches the unique identifier of the player.

11. A method for monitoring information for analyzing user selection habits of viewing programs recorded on a video tape comprising the steps of:

a) monitoring user inputted commands;

b) when a play command is detected;
1) storing an identifier of the program being retrieved from the video tape; and
2) storing the time of the play command;

c) when a stop command is detected after a start command is detected storing the time of the stop command; and d) providing to an information analyzer the stored information.

12. A method for monitoring information for analyzing user selection habits of viewing programs recorded on a video tape comprising the steps of:

a) monitoring for play and stop commands a microprocessor controller in a VCR;

b) when a play command is detected;
1) storing an identifier of the program being retrieved from the video tape; and
2) storing the time of the play command;

c) when a stop command is detected after a start command is detected storing the time of the stop command; and d) providing to an information analyzer the stored information.

13. A method for monitoring information for analyzing user selection habits of viewing programs recorded on a video tape comprising the steps of:

a) monitoring user inputted commands;

b) when a record command is detected;
1) storing an identifier of the program being broadcasted that is being recorded on the tape;
2) storing the time of the record command;

c) when a stop command is detected after a start command is detected storing the time of the stop command; and d) providing to an information analyzer the stored information.

14. A method for monitoring information for analyzing user selection habits of viewing programs recorded on a video tape comprising the steps of:

a) monitoring for record and stop commands a microprocessor controller in a VCR;

b) when a record command is detected;
1) storing an identifier of the program being broadcasted that is being recorded on the tape;
2) storing the time of the record command;

c) when a stop command is detected after a start command is detected storing the time of the stop command; and d) providing to an information analyzer the stored information.

* * * * *